(12) United States Patent
Shinozaki et al.

(10) Patent No.: US 6,537,942 B2
(45) Date of Patent: Mar. 25, 2003

(54) OLEFIN POLYMERIZATION CATALYST AND PROCESS FOR PREPARING POLYPROPYLENE AND PROPYLENE BLOCK COPOLYMER

(75) Inventors: Tetsunori Shinozaki, Waki-cho (JP); Mamoru Kioka, Waki-cho (JP)

(73) Assignee: Mitsui Chemicals INC, Tokyo (JP)

( * ) Notice: Subject to any disclaimer, the term of this patent is extended or adjusted under 35 U.S.C. 154(b) by 0 days.

(21) Appl. No.: 09/878,426

(22) Filed: Jun. 12, 2001

(65) Prior Publication Data

US 2001/0044375 A1 Nov. 22, 2001

Related U.S. Application Data

(62) Division of application No. 08/730,930, filed on Oct. 16, 1996, now Pat. No. 6,271,166, which is a division of application No. 08/690,054, filed on Jul. 31, 1996, now Pat. No. 5,618,886, which is a continuation of application No. 08/289,635, filed on Aug. 12, 1994, now abandoned.

(30) Foreign Application Priority Data

| Aug. 13, 1993 | (JP) | 5-201388 |
|---|---|---|
| Aug. 13, 1993 | (JP) | 5-201389 |
| Aug. 18, 1993 | (JP) | 5-204309 |
| Aug. 18, 1993 | (JP) | 5-204310 |
| Aug. 18, 1993 | (JP) | 5-204311 |

(51) Int. Cl.⁷ ............... B01J 31/00; C08F 4/44
(52) U.S. Cl. ............ 502/125; 502/126; 502/104; 502/114; 502/110; 526/124.8; 526/125.3; 526/142
(58) Field of Search ............ 502/126, 104, 502/114, 125, 110; 526/124.8, 125.3, 142

(56) References Cited

U.S. PATENT DOCUMENTS

| 4,522,982 A | 6/1985 | Ewen |
| 4,739,015 A | 4/1988 | Toyota et al. |
| 4,971,937 A | 11/1990 | Albizatti et al. |
| 4,978,648 A | 12/1990 | Barbe et al. |
| 4,990,477 A | 2/1991 | Kioka et al. |
| 4,990,479 A | 2/1991 | Ishimaru et al. |
| 5,028,671 A | 7/1991 | Kioka et al. |
| 5,244,854 A | 9/1993 | Norista et al. |
| 5,308,818 A | 5/1994 | Shamshoum et al. |
| 5,948,872 A | 9/1999 | Kioka et al. |

FOREIGN PATENT DOCUMENTS

| DE | 4114833 | 11/1991 |
| EP | 0451645 | 10/1991 |
| EP | 0452156 | 10/1991 |
| EP | 0 452 156 | * 10/1991 |
| EP | 0560035 | 9/1993 |

* cited by examiner

Primary Examiner—David W. Wu
Assistant Examiner—Ling-Siu Choi
(74) Attorney, Agent, or Firm—Sherman & Shalloway

(57) ABSTRACT

Olefin polymerization catalyests are formed from:

(I-2) a contact product obtained by contacting
  (A) a solid titanium catalyst component,
  (B) an organometallic compound catalyst component, and
  (D) a specific polyether compounds,
(II-2)(C) a specific organosilicon compound, and, optionally,
(III-2) an organometallic compound catalyst component; or the contact product (I-2) may be replaced by one which is obtained by prepolymerizing an olefin of 2 or more carbon atoms in the presence of the catalyst components for the contact product (I-2).

6 Claims, 5 Drawing Sheets

OLEFIN POLYMERIZATION CATALYST AND PROCESS FOR PREPARING POLYPROPYLENE AND PROPYLENE BLOCK COPOLYMER

CROSS REFERENCE TO RELATED APPLICATIONS

This is a division of application Ser. No. 08/730,930, filed Oct. 16, 1996, now U.S. Pat. No. 6,271,166; which is a division of application Ser. No. 08/690,054, filed Jul. 31, 1996, which issued as U.S. Pat. No. 5,618,886; which is a continuation of application Ser. No. 08/289,635, filed Aug. 12, 1994 now abandoned.

FIELD OF THE INVENTION

The present invention relates to novel olefin polymerization catalysts and processes for preparing polypropylenes and propylene block copolymers using the novel catalysts. The present invention also relates to processes for preparing propylene block copolymers using specific olefin polymerization catalysts.

The polypropylene according to the present invention has a high isotacticity. The propylene block copolymer according to the present invention contains a polypropylene component having a high isotacticity and a rubber component having a high intrinsic viscosity [η].

BACKGROUND OF THE INVENTION

There have been known homopolypropylene generally having excellent rigidity and heat resistance, and propylene block copolymers comprising both polypropylene component and a rubber component and having excellent rigidity and heat resistance as well as excellent impact resistance.

Propylene polymers have also a low specific gravity and can be easily recycled, and therefore, they have been paid much attention with respect to environmental protection and are now desired to be more extensively utilized.

Such propylene polymers are prepared using so-called a Ziegler-Natta catalyst comprising a compound containing a transition metal of Group IV to VI of the periodic table and an organometallic compound containing a metal of Group I to III, and they are widely used.

However, the propylene polymers obtained by the prior art techniques have not always sufficient rigidity and heat resistance in some uses, so that they have limited uses for some purposes.

It is known that the rigidity and the heat resistance of propylene polymers can be further improved by increasing the isotacticity of homopolypropylene or a polypropylene component in a propylene block copolymer, in other words, these properties can be improved by the use of a catalyst capable of providing a high isotacticity for the propylene polymers in the preparation thereof.

However, a polymer of an olefin such as propylene obtained by the use of such a catalyst capable of providing a high isotacticity tends to have a molecular weight higher than that those obtained by using conventional catalysts. Accordingly, it has generally been necessary to add hydrogen as a chain transfer agent in a large amount to the polymerization system in order to regulate a molecular weight and a melt flow rate (MFR) of the resulting polymer. Such a large amount of hydrogen present in the polymerization system, especially when the propylene is per se used as the polymerization solvent, increases the pressure of polymerization system, so that a polymerization reactor may need reinforcing its pressure resistance.

Propylene block copolymers can be prepared by a multi-step polymerization (so-called block copolymerization) process which generally comprises initially polymerizing propylene to form a polypropylene component and then copolymerizing ethylene and an α-olefin to form a rubber component. If this polymerization process is carried out continuously (or in one batch) using the above-mentioned catalyst capable of providing a high isotacticity, a large amount of hydrogen gives rise to a problem. That is, the hydrogen added in the initial step to prepare the polypropylene component remains unreacted in a large amount and then, in the subsequent step, prevents the rubber component from attaining a high molecular weight (instrinsic viscosity [η].

Accordingly, it has been desired that a catalyst system used for the preparation of a polypropylene and a propylene block copolymer be developed, which makes it possible not only to readily regulate the molecular weight and the melt flow rate (MFR) of the resulting polymers using a small amount of hydrogen, but also provide a high isotacticity for the resulting polypropylene and the propylene component of the resulting propylene block copolymer.

Further, it has also been desired that a process for preparing a propylene block copolymer by which the molecular weight and the melt flow rate (MFR) of the resulting copolymer can be easily regulated even with a small amount of hydrogen, isotacticity of a polypropylene component in the resulting copolymer can be heightened, and a molecular weight of a rubber component in the resulting copolymer can also be increased.

OBJECT OF THE INVENTION

The present invention has been made in the light of the foregoing prior art technique, and it is an object of the invention to provide olefin polymerization catalysts by the use of which the molecular weight and the melt flow rate (MFR) of the resulting polypropylene can be easily regulated even with a small amount of hydrogen and highly isotactic polypropylene can be prepared, and to provide processes for preparing polypropylene using said olefin polymerization catalysts.

It is another object of the invention to provide processes for preparing a propylene block copolymer by which the molecular weight and the melt flow rate (MFR) of the resulting copolymer can be easily regulated even with a small amount of hydrogen, isotacticity of the polypropylene component in the resulting copolymer can be heightened, and the molecular weight of the rubber composition in the resulting copolymer can also be increased.

SUMMARY OF THE INVENTION

The olefin polymerization catalyst (1) according to the invention is a novel catalyst and formed from:

[I-1] a contact product obtained by contacting:
  (A) a solid titanium catalyst component comprising magnesium, titanium, halogen and an electron donor,
  (B) an organometallic compound catalyst component, and
  (C) an organosilicon compound represented by the following formula (c-i)

$$R^a{}_n Si(OR^b)_{4-n} \qquad \text{(c-i)}$$

wherein n is 1, 2 or 3; when n is 1, $R^a$ is a secondary or tertiary hydrocarbon group; when n is 2 or 3, at least one of $R^a$ is a secondary or tertiary hydrocarbon group, and plural $R^a$ may be the same or different; $R^b$ is a hydrocarbon group of 1 to 4 carbon atoms; and when 4-n is 2 or 3, plural $OR^b$ may be the same or different;

[II-1] (D) a compound having at least two ether linkages spaced by plural atoms; and optionally,

[III] an organometallic compound catalyst component.

The contact product [I-1] in the catalyst (1) may be replaced by a prepolymerized catalyst component [Ia-1] which is obtained by prepolymerizing an olefin of 2 or more carbon atoms in the presence of the catalyst components for forming the contact product [I-1] in such a way that the amount of the prepolymer formed is 0.01 to 2,000 g based on 1 g of the solid titanium catalyst component (A).

The olefin polymerization catalyst (2) according to the invention is formed from:

[I-2] a contact product obtained by contacting:
  (A) a solid titanium catalyst component,
  (B) an organometallic compound catalyst component, and
  (D) compound having at least two ether linkages spaced by plural atoms;

[II-2] (C) an organosilicon compound represented by the above formula (c-i); and optionally,

[III] an organometallic compound catalyst component.

The contact product [I-2] in the catalyst (2) may be replaced by a prepolymerized catalyst component [Ia-2] which is obtained by prepolymerizing an olefin of 2 or more carbon atoms in the presence of the catalyst components for forming the contact product [I-2] in such a way that the amount of the prepolymer formed is 0.01 to 2,000 g based on 1 g of the solid titanium catalyst component (A).

The process for preparing a polypropylene according to the invention comprises polymerizing propylene in the presence of the above-mentioned olefin polymerization catalyst (1) or (2).

The polypropylene prepared by the process of the invention preferably has the following properties:

(i) a boiling heptane-insoluble component is contained in said polypropylene in an amount of not less than 80% by weight, a pentad isotacticity $[M_g]$ of the boiling heptane-insoluble component determined by the following formula (1) using a $^{13}$C-NMR spectrum is not less than 0.97:

$$[M_5] = \frac{[Pmmmm]}{[Pw] - 2([S\alpha\gamma] + [S\alpha\delta^+]) + 3[T\delta^+\delta^+]} \quad (1)$$

wherein

[Pmmmm] is absorption intensity of methyl groups on third propylene units in five propylene unit sequences where the five units are bonded isotactically to each other,

[Pw] is absorption intensity of all methyl groups in propylene units,

[Sαγ] is absorption intensity of secondary carbons in a main chain, with the proviso that one of two tertiary carbons nearest to each of said secondary carbons is situated at the α position and the other is situated at the γ position,

[Sαδ⁺] is absorption intensity of secondary carbons in a main chain, with the proviso that one of two tertiary carbons nearest to each of said secondary carbons is situated at the α position and the other is situated at the δ or farther position, and

[Tδ⁺δ⁺] is absorption intensity of tertiary carbons in a main chain, with the proviso that one of two tertiary carbons nearest to each of said tertiary carbons is situated at the δ or farther position and the other is also situated at the δ or farther position;

a pentad tacticity $[M_3]$ of the boiling heptane-insoluble component determined by the following formula (2) using a $^{13}$C-NMR spectrum is in the range of 0.0020 to 0.0050:

$$[M_3] = \frac{[Pmmrm] + [Pmrmr] + [Pmrrr] + [Prmrr] + [Prmmr] + [Prrrr]}{[Pw] - 2([S\alpha\gamma] + [S\alpha\delta^+]) + 3[T\delta^+\delta^+]} \quad (2)$$

wherein [Pw], [Sαγ], [Sαδ⁺] and [Tδ⁺δ⁺] have the meanings as defined in the formula (1),

[Pmmrm] is absorption intensity of methyl groups on third propylene units in five propylene unit sequences represented by ] ] ] ] ] in which ] and ] are each a propylene unit,

[Pmrmr] is absorption intensity of methyl groups on third propylene units in five propylene unit sequences represented by ] ] ] ] ] in which ] and ] are each a propylene unit,

[Pmrrr] is absorption intensity of methyl groups on third propylene units in five propylene unit sequences represented by ] ] ] ] ] in which ] and ] are each a propylene unit,

[Prmrr] is absorption intensity of methyl groups on third propylene units in five propylene unit sequences represented by ] ] ] ] ] in which ] and ] are each a propylene unit,

[Prmmr] is absorption intensity of methyl groups on third propylene units in five propylene unit sequences represented by ] ] ] ] in which ] and ] are each a propylene unit,

[Prrrr] is absorption intensity of methyl groups on third propylene units in five propylene unit sequences represented by ] ] ] ] ] in which ] and ] are each a propylene unit.

The first process for preparing a propylene block copolymer according to the invention comprises the steps of polymerizing propylene to form a polypropylene component and copolymerizing ethylene and an α-olefin of 3 to 20 carbon atoms to form an ethylene/α-olefin copolymer component, in optional order, wherein both of the polymerizing and copolymerizing steps are carried out in the presence of the above-mentioned olefin polymerization catalyst (1).

The second process for preparing a propylene block copolymer according to the invention comprises steps of polymerizing propylene to form a polypropylene component and copolymerizing ethylene and an α-olefin of 3 to 20 carbon atoms to form an ethylene/α-olefin copolymer component, in optional order, wherein both of the polymerizing and copolymerizing steps are carried out in the presence of the above-mentioned olefin polymerization catalyst (2).

The third process for preparing a propylene block copolymer according to the invention comprises steps of polymerizing propylene to form a polypropylene component and copolymerizing ethylene and an α-olefin of 3 to 20 carbon atoms to form an ethylene/α-olefin copolymer component, in optional order, wherein both of the polymerizing and copolymerizing steps are carried out in the presence of an olefin polymerization catalyst (3) formed from:

[I-3] a contact product obtained by contacting:
(A) a solid titanium catalyst component,
(B) an organometallic compound catalyst component, and optionally,
(D) a compound having at least two ether linkages spaced plural atoms;

[II-3] (D) a compound having at least two ether linkages spaced by plural atoms; and optionally,

[III] an organometallic compound catalyst component.

In the third process for preparing a propylene block copolymer according to the invention, the contact product [I-3] in the catalyst (3) may be replaced by a prepolymerized catalyst component [Ia-3] which is obtained by prepolymerizing an olefin of 2 or more carbon atoms in the presence of the catalyst components for forming the contact product [I-3] in such a way that the amount of the prepolymer formed is 0.01 to 2,000 g based on 1 g of the solid titanium catalyst component (A).

The fourth process for preparing a propylene block copolymer according to the invention comprises steps of polymerizing propylene to form a polypropylene component and copolymerizing ethylene and an α-olefin of 3 to 20 carbon atoms to form an ethylene/α-olefin copolymer component, in optional order, wherein both of the polymerizing and copolymerizing steps are carried out in the presence of an olefin polymerization catalyst (4) formed from:

[I-4] (A-2) a solid titanium catalyst component comprising magnesium, titanium, halogen and (D) a compound having at least two ether linkages spaced by plural atoms;

[II-4] (C) an organosilicon compound represented by the above formula (c-i) and/or (D) a compound having at least two ether linkages spaced by plural atoms; and.

[III] an organometallic compound catalyst component.

In the fourth process for preparing a propylene block copolymer, the olefin polymerization catalyst (4) may be replaced by an olefin polymerization catalyst (4a) formed from:

[Ia-4] a prepolymerized catalyst component obtained by prepolymerizing an olefin of 2 or more carbon atoms in the presence of
(A-2) a solid titanium catalyst component containing magnesium, titanium, halogen and (D) a compound having at least two ether linkages spaced by plural atoms, and
(B) an organometallic compound catalyst component,
in such a way that the amount of the prepolymer formed is 0.01 to 2,000 g based on 1 g of the solid titanium catalyst component (A-2);

[II-4] (C) an organosilicon compound represented by the above formula (c-i) and/or (D) the compound having at least two ether linkages spaced by plural atoms; and optionally,

[III] the organometallic compound catalyst component.

The fifth process for preparing a propylene block copolymer according to the invention comprises steps of polymerizing propylene to form a polypropylene component and copolymerizing ethylene and an α-olefin of 3 to 20 carbon atoms to form an ethylene/α-olefin copolymer component, in an optional order, wherein both of the polymerizing and copolymerizing steps are carried out in the presence of an olefin polymerization catalyst (5a) formed from:

[Ia-5] a prepolymerized catalyst component which is obtained by prepolymerizing an olefin of 2 or more carbon atoms in the presence of
(A) a solid titanium catalyst, (B) an organometallic compound catalyst component, and
(E) an organosilicon compound represented by the following formula (c-iii)

wherein R and R' are each a hydrocarbon group, and n is a number satisfying the condition of 0<n <4;
in such a way that the amount of the prepolymer formed is 0.01 to 2,000 g based on 1 g of the following solid titanium catalyst component (A);

[II-5] (C) an organosilicon compound represented by the above formula (c-i); and optionally,

[III] an organometallic compound catalyst component.

In the present invention, the compound (D) having at least two ether linkages spaced by plural atoms is preferably represented by the following formula:

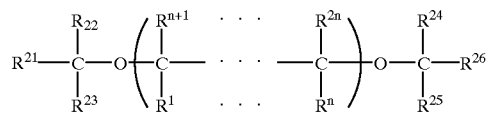

wherein n is an integer satisfying the condition of 2≦n≦10; $R^{21}$ to $R^{26}$ are each a substituent having at least one atom selected from the group consisting of carbon, hydrogen, oxygen, halogen, nitrogen, sulfur, phosphorus, boron and silicon; any optional combination of from $R^1$ to $R^{26}$, preferably from $R^1$ to $R^{2n}$, may form together a ring other than a benzene ring; and the main chain of the compound may contain atoms other than carbon.

In the present invention, the organosilicon compound (C) is preferably represented by the following formula (c-ii):

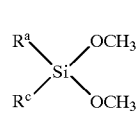

wherein $R^a$ and $R^c$ are each independently a cyclopentyl group, a substituted cyclopentyl group, a cyclopentenyl group, a substituted cyclopentenyl group, a cyclopentadienyl group, a substituted cyclopentadienyl group or a hydrocarbon group whose carbon adjacent to Si is secondary or tertiary carbon.

According to the processes for preparing a propylene block copolymer of the invention, a propylene block copolymer having the following properties can be prepared.

(i) A boiling heptane-insoluble component in the propylene block copolymer has a pentad isotacticity [$M_g$], obtained from the above formula (1) using a $^{13}$C-NMR spectrum, of not less than 0.97, and has a pentad tacticity [$M_g$], obtained from the above formula (2) using a $^{13}$C-NMR spectrum, of 0.0020 to 0.0050.

(ii) A 23° C. n-decane-soluble component in the propylene block copolymer has an intrinsic viscosity [η], as measured in decahydronaphthalene at 135° C., of not less than 2 dl/g.

DETAILED DESCRIPTION OF THE INVENTION

The novel olefin polymerization catalysts according to the invention, the processes for preparing a polypropylene or a propylene block copolymer using said catalysts, and the processes for preparing a propylene block copolymer using specific catalysts according to the invention will be described in detail hereinafter.

The meaning of the term "polymerization" used herein is not limited to "homopolymerization" but may comprehend "copolymerization". Also, the meaning of the term "polymer" used herein is not limited to "homopolymer" but may comprehend "copolymer".

The novel olefin polymerization catalysts according to the invention are first described.

The olefin polymerization catalyst (1) according to the invention is formed from:
  [I-1] a contact product obtained by contacting:
    (A) a solid titanium catalyst component comprising magnesium, titanium, halogen and an electron donor,
    (B) an organometallic compound catalyst component, and
    (C) an organosilicon compound represented by the following formula (c-i):

$R^a{}_n Si(OR^b)_{4-n}$     (c-i)

wherein n is 1, 2 or 3; when n is 1, $R^a$ is a secondary or tertiary hydrocarbon group; when n is 2 or 3, at least one of $R^a$ is a secondary or tertiary hydrocarbon group, and plural $R^a$ may be the same or different; $R^b$ is a hydrocarbon group of 1 to 4 carbon atoms; and when 4-n is 2 or 3, plural $OR^b$ may be the same or different;
  [II-1] (D) a compound having at least two ether linkages spaced by plural atoms; and optionally,
  [III] an organometallic compound catalyst component.

The contact product [I-1] in the catalyst (1) may be replaced by a prepolymerized catalyst component [Ia-1] which is obtained by prepolymerizing an olefin of 2 or more carbon atoms in the presence of the catalyst components for forming the contact product [I-1] in such a way that the amount of the prepolymer formed is 0.01 to 2,000 g based on 1 g of the solid titanium catalyst component (A).

In more detail, the olefin polymerization catalyst (1a) according to the invention is formed from:
  [Ia-1] a prepolymerized catalyst component which is obtained by prepolymerizing an olefin of 2 or more carbon atoms in the presence of the catalyst components for forming the contact product [I-1] in such a way that the amount of the prepolymer formed is 0.01 to 2,000 g based on 1 g of the solid titanium catalyst component (A);
  [II-1] (D) the polyether compound; and optionally,
  [III] the organometallic compound catalyst component.

Figure 1:
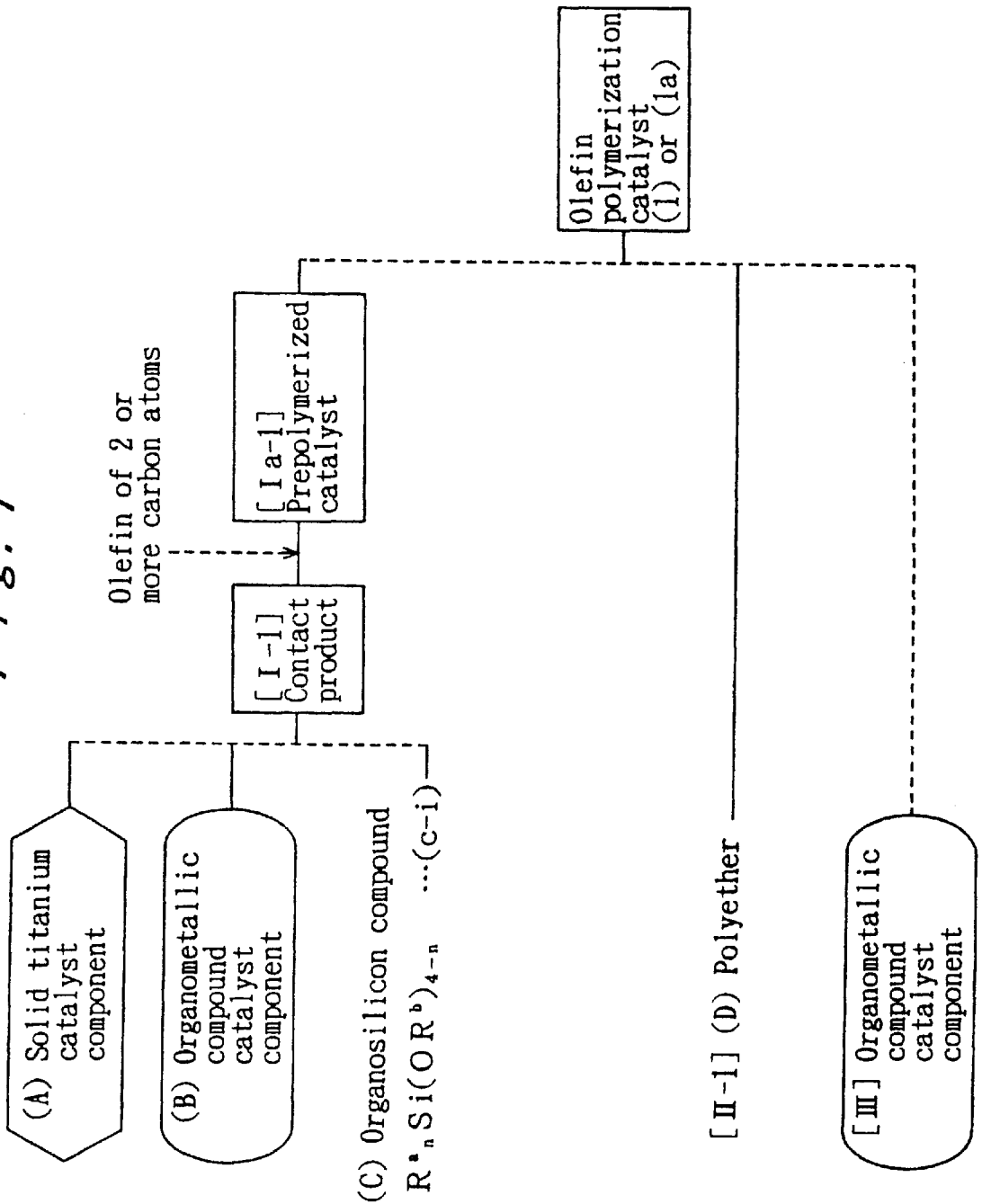
FIG. 1 is given to illustrate an exmple of steps of a process for preparing a novel olefin polymerization catalyst (1) or (1a) according to the invention.

FIG. 1 is given to illustrate an example of steps of a process for preparing the olefin polymerization catalyst (1) or (1a) of the invention.

The olefin polymerization catalyst (2) according to the invention is formed from:
  [I-2] a contact product obtained by contacting:
    (A) a solid titanium catalyst component,
    (B) an organometallic compound catalyst component, and
    (D) an compound having at least two ether linkages spaced by plural atoms;
  [II-2] (C) an organosilicon compound represented by the above formula (c-i); and optionally,
  [III] an organometallic compound catalyst component.

The olefin polymerization catalyst (2a) according to the invention is formed from:
  [Ia-2] a prepolymerized catalyst which is obtained by prepolymerizing an olefin of 2 or more carbon atoms in the presence of the catalyst components for forming the contact product [I-1] in such a way that the amount of the prepolymer formed is 0.01 to 2,000 g based on 1 g of the solid titanium catalyst component (A).
  [II-2] (C) the organosilicon compound represented by the above formula (c-i); and optionally,
  [III] the organometallic compound catalyst component.

Figure 2:
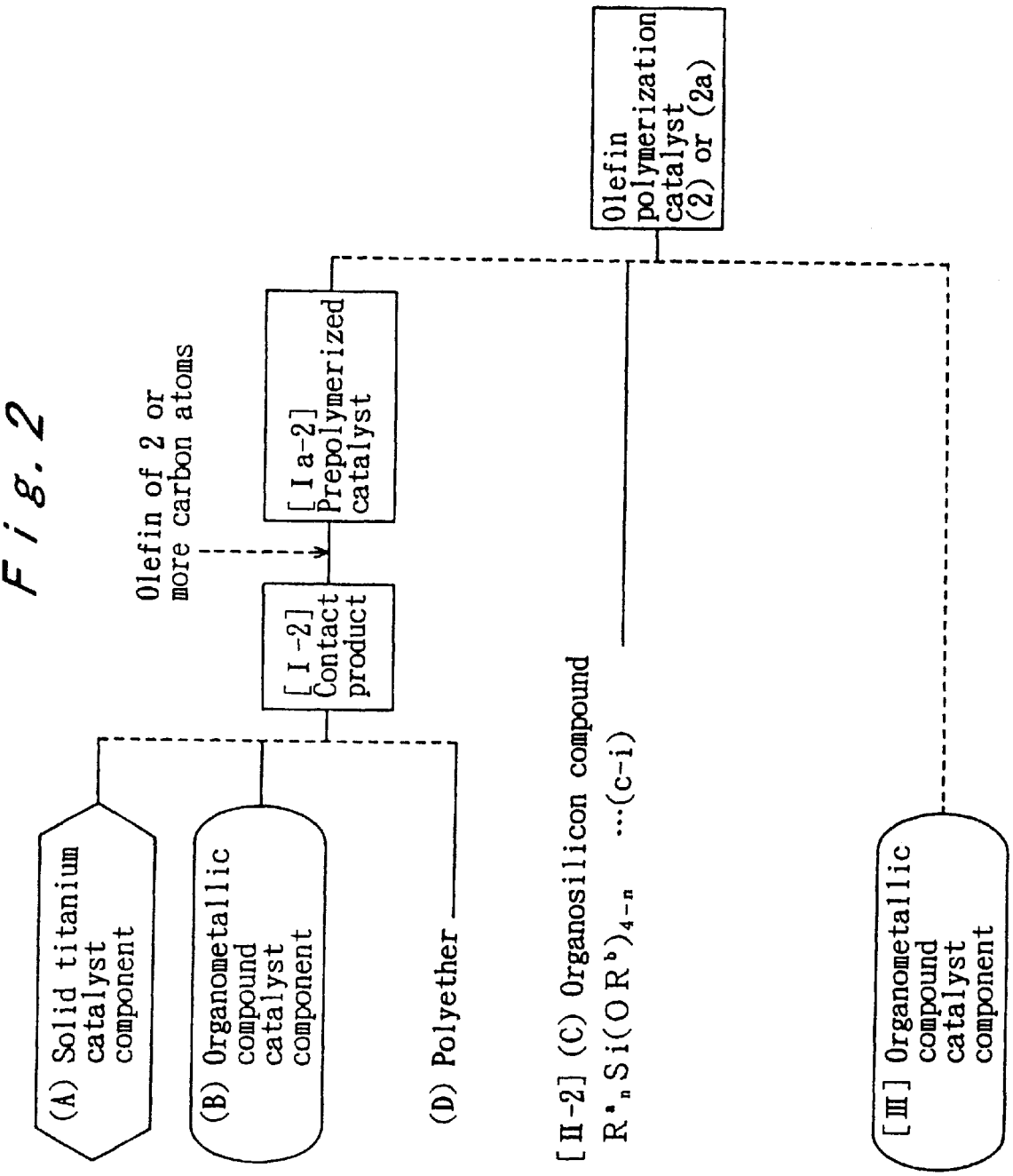
FIG. 2 is given to illustrate an exmaple of steps of a process for preparing a novel olefin polymerization catalyst (2) or (2a) according to the invention.
Figure 3:
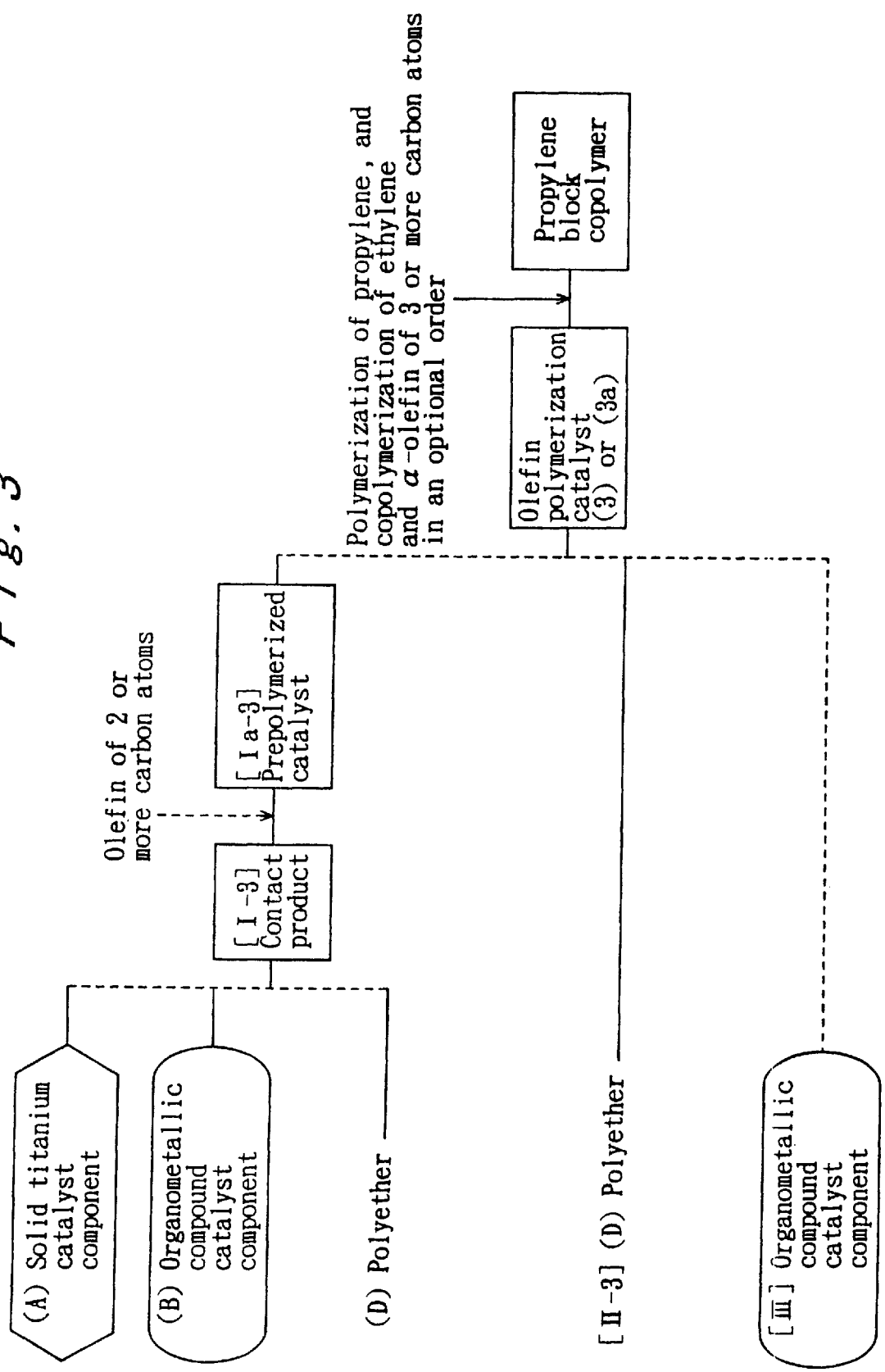
FIG. 3 is given to illustrate an exmaple of steps of a process for preparing an olefin polymerization catalyst which is used in the third process for preparing a propylene block copolymer according to the invention, together with steps of a process for preparing a propylene block copolymer using said catalyst.
Figure 4:
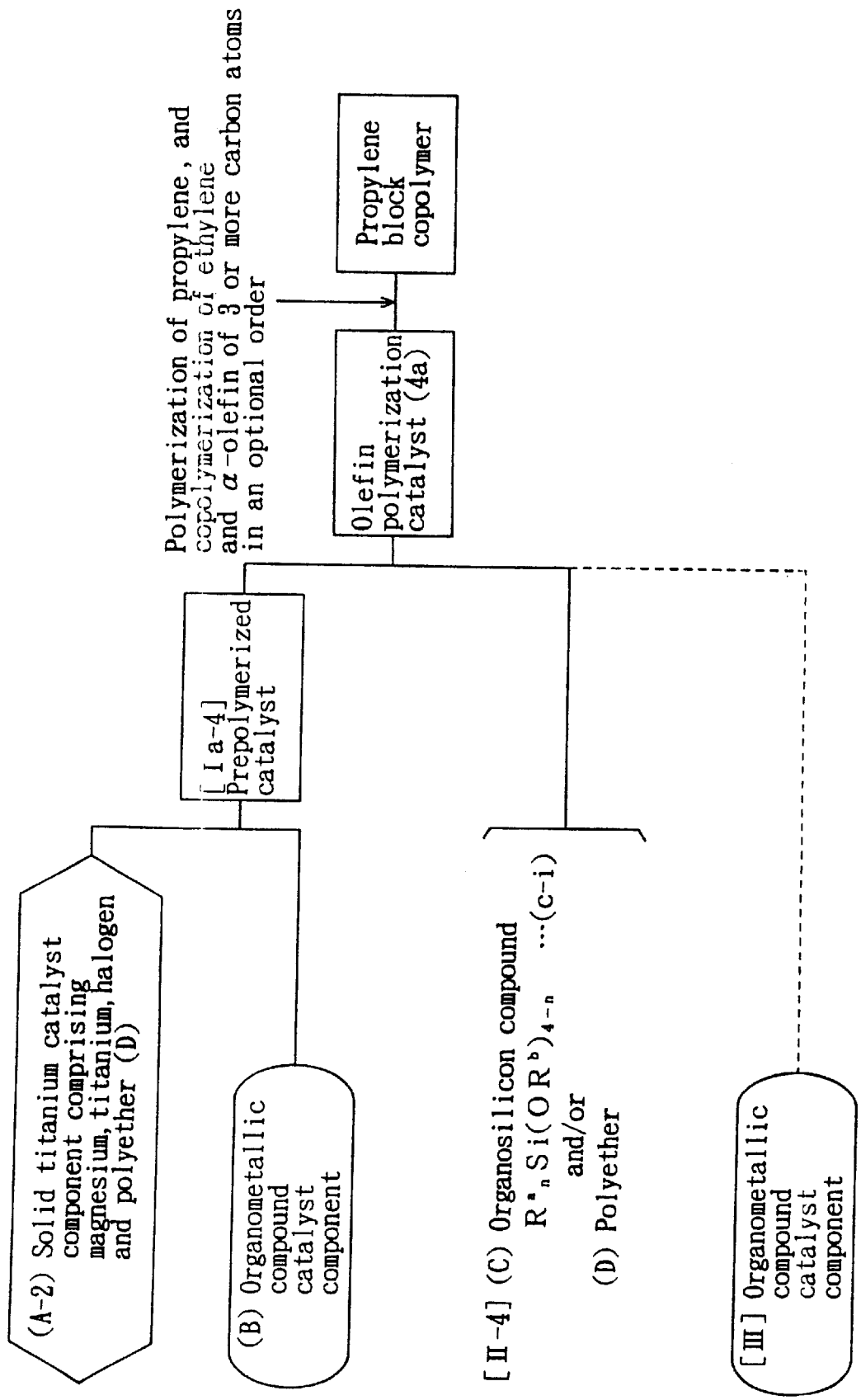
FIG. 4 is given to illustrate an example of steps of a process for preparing an olefin polymerization catalyst which is used in the fourth process for preparing a propylene block copolymer according to the invention, together with steps of a process for preparing a propylene block copolymer using said catalyst.
Figure 5:
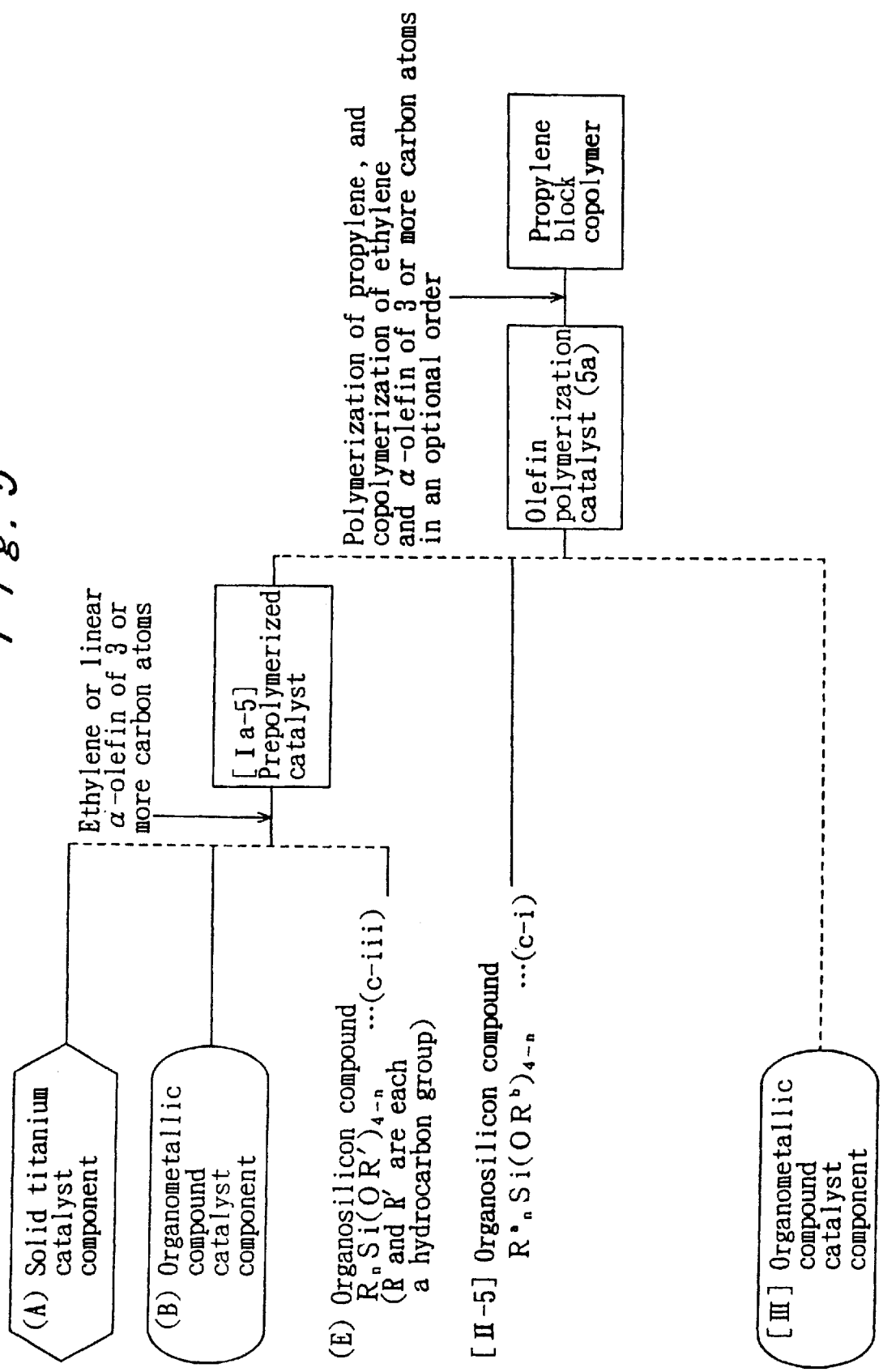
FIG. 5 is given to illustrate an example of steps of a process for preparing an olefin polymerization catalyst which is used in the fifth process for preparing a propylene block copolymer according to the invention, together with steps of a process for preparing a propylene block copolymer using said catalyst.

FIG. 2 is given to illustrate an example of steps of a process for preparing the olefin polymerization catalyst (2) or (2a) of the invention.

Each of the components for forming the olefin polymerization catalysts of the invention is described below in detail.

(A) Solid Titanium Catalyst Component

The solid titanium catalyst component (A) can be prepared by bringing a magnesium compound, a titanium compound and an electron donor described below into contact with each other.

The titanium compound used for preparing the solid titanium catalyst component (A) includes, for example, tetravalent titanium compounds represented by the following formula:

$Ti(OR)_g X_{4-g}$ wherein R is a hydrocarbon group, X is a halogen atom, and g is a number satisfying the condition of $0 \leq g \leq 4$.

Specifically, the titanium compounds include:
  titanium tetrahalides, such as $TiCl_4$, $TiBr_4$ and $TiI_4$;
  alkoxytitanium trihalides, such as $Ti(OCH_3)Cl_3$, $Ti(OC_2H_5)Cl_3$, $Ti(O\text{-}n\text{-}C_4H_9)Cl_3$, $Ti(OC_2H_5)Br_3$ and $Ti(O\text{-}iso\text{-}C_4H_9)Br_3$;
  dialkoxytitanium dihalides, such as $Ti(OCH_3)_2Cl_2$, $Ti(OC_2H_5)_2Cl_2$, $Ti(O\text{-}n\text{-}C_4H_9)_2Cl_2$ and $Ti(OC_2H_5)_2Br_2$;
  trialkoxytitanium monohalides, such as $Ti(OCH_3)_3Cl$, $Ti(OC_2H_5)_3Cl$, $Ti(O\text{-}n\text{-}C_4H_9)_3Cl$ and $Ti(OC_2H_5)_3Br$; and
  tetraalkoxytitaniums, such as $Ti(OCH_3)_4$, $Ti(OC_2H_5)_4$, $Ti(O\text{-}n\text{-}C_4H_9)_4$, $Ti(O\text{-}iso\text{-}C_4H_9)_4$ and $Ti(O\text{-}2\text{-}ethylhexyl)$.

Of these, preferred are halogen-containing compounds, more preferred are titanium tetrahalides, and particularly preferred is titanium tetrachloride. These titanium compounds may be used singly or in combination. Further, they may be diluted with hydrocarbon compounds or halogenated hydrocarbon compounds.

The magnesium compound used for preparing the solid titanium catalyst component (A) includes those having reducing property as well as those not having reducing property.

The magnesium compound having reducing property may have a magnesium-to-carbon bond or a magnesium-to-hydrogen bond. Specifically, the magnesium compounds having reducing property include dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxylmagnesium, ethylbutylmagnesium and butylmagnesium hydride. These magnesium compounds may be used singly or in combination, or may be used in the form of complex compounds with organometallic compounds described later. Further, these magnesium compounds may be liquid or solid, and may be derived by the reaction of metallic magnesium with a corresponding compound. Furthermore, they may be derived from metallic magnesium during the preparation of the catalyst using the above method.

Examples of the magnesium compounds not having reducing property include magnesium halides such as magnesium chloride, magnesium bromide, magnesium iodide and magnesium fluoride; alkoxymagnesium halides such as methoxymagnesium chloride, ethoxymagnesium chloride, isopropoxymagnesium chloride, butoxymagnesium chloride and octoxymagnesium chloride; aryloxymagnesium halides such as phenoxymagnesium chloride and methylphenoxymagnesium chloride; alkoxymagnesiums such as ethoxymagnesium, isopropoxymagnesium, butoxymagnesium, n-octoxymagnesium and 2-ethylhexoxymagnesium; aryloxymagnesiums such as phenoxymagnesium and dimethylphenoxymagnesium; and magnesium carboxylates such as magnesium laurate and magnesium stearate.

These magnesium compounds not having reducing property may be those derived from the above-mentioned magnesium compounds having reducing property or those derived during the preparation of the catalyst component. In order to derive the magnesium compound not having reducing property, the magnesium compound having reducing property may be brought into contact with a halogen or a compound having an active carbon-to-oxygen bond such as a polysiloxane compound, a halogen-containing silane compound, a halogen-containing aluminum compound, alcohol, ester, ketone and aldehyde.

Besides those magnesium compounds mentioned above, there can be used complex compounds or double compounds of these magnesium compounds with other metals, or mixtures of these magnesium compounds with other metallic compounds. The magnesium compounds may be used in combination of two or more kinds.

Various magnesium compounds other than those mentioned above can also be used for preparing the solid titanium catalyst component (A), but it is preferred that the magnesium compound is present in the form of a halogen-containing magnesium compound in the solid titanium catalyst component (A) finally obtained. Accordingly, if a magnesium compound not containing halogen is used, the compound is preferably brought into contact with a halogen-containing compound in the course of the catalyst preparation.

Of the above-mentioned magnesium compounds, preferred are magnesium compounds not having reducing property. More preferred are halogen-containing magnesium compounds. Particularly preferred are magnesium chloride, alkoxymagnesium chloride and aryloxymagnesium chloride.

The solid titanium catalyst component (A) used in the invention is formed by bringing such a magnesium compound as mentioned above into contact with the aforesaid titanium compound and an electron donor (a).

Examples of the electron donor (a) used for preparing the solid titanium catalyst component (A) include alcohols, phenols, ketones, aldehydes, carboxylic acids, halides of organic acids, and ethers, esters, amides or anhydrides of organic and inorganic acids, ammonia, amines, nitriles, isocyanates, nitrogen-containing cyclic compounds and oxygen-containing cyclic compounds, excepting the polyether compounds (D) as described later.

Specifically, the electron donor compounds include:

alcohols of 1 to 18 carbon atoms, such as methanol, ethanol, propanol, pentanol, hexanol, octanol, 2-ethylhexanol, dodecanol, octadecyl alcohol, oleyl alcohol, benzyl alcohol, phenylethyl alcohol, cumyl alcohol, isopropyl alcohol and isopropylbenzyl alcohol;

halogen-containing alcohols of 1–18 carbon atoms such as trichloromethanol, trichloroethanol and trichlorohexanol;

phenols of 6 to 20 carbon atoms which may have lower alkyl group, such as phenol, cresol, xylenol, ethylphenol, propylphenol, nonylphenol, cumylphenol and naphthol;

ketones of 3 to 15 carbon atoms, such as acetone, methyl ethyl ketone, methyl isobutyl ketone, acetophenone, benzophenone, acetylacetone and benzoquinone;

aldehydes of 2 to 15 carbon atoms, such as acetaldehyde, propionaldehyde, octylaldehyde, benzaldehyde, tolualdehyde and naphthaldehyde;

organic esters of 2 to 30 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, n-butyl maleate, diisobutyl methylmalonate, di-n-hexyl cyclohexenecarboxylate, diethyl nadiate, diisopropyl tetrahydrophthalate, diethyl phthalate, diisobutyl phthalate, di-n-butyl phthalate, di-2-ethylhexyl phthalate, γ-butyrolactone, δ-valerolactone, coumarin, phthalide and ethyl carbonate;

ethers of 2 to 20 carbon atoms, such as methyl ether, ethyl ether, isopropyl ether, butyl ether, amyl ether, anisole and diphenyl ether epoxy-p-menthane;

acid amides such as N,N-dimethylacetamide, N,N-dimethylbenzamide and N,N-dimethyltoluamide;

amines, such as methylamine, ethylamine, dimethylamine, diethylamine, ethylenediamine, tetramethylenediamine, hexamethylenediamine, tributylamine and tribenzylamine;

nitriles such as acetonitrile, benzonitrile and trinitrile;

acid anhydrides, such as acetic anhydrides, phthalic anhydride and benzoic anhydride;

pyrroles, such as pyrrole, methylpyrrole and dimethylpyrrole;

pyrroline;

pyrrolidine;

indole;

pyridines, such as pyridine, methylpyridine, ethylpyridine, propylpyridine, dimethylpyridine, ethylmethylpyridine, trimethylpyridine, phenylpyridine, benzylpyridine and pyridine chloride;

nitrogen-containing cyclic compounds, such as piperidines, quinolines and isoquinolines;

oxygen-containing cyclic compounds, such as tetrahydrofuran, 1,4-cineol, 1,8-cineol, pinolfuran, methylfuran, dimethylfuran, diphenylfuran, benzofuran, coumaran, phthalan, tetrahydropyran, pyran and dihydropyran.

Other than those compounds, water and surface active agents of anionic type, cationic type and nonionic type can be employed.

Further, particularly preferred examples of the organic esters are polycarboxylic esters having skeletons represented by the following formulas:

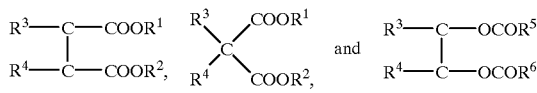

In the above formulas, $R^1$ is a substituted or unsubstituted hydrocarbon group, $R^2$, $R^5$ and $R^6$ are each hydrogen or a substituted or unsubstituted hydrocarbon group, and $R^3$ and $R^4$ are each hydrogen or a substituted or unsubstituted hydrocarbon group, preferably at least one of $R^3$ and $R^4$ being a substituted or unsubstituted hydrocarbon group. $R^3$ and $R^4$ may be linked to each other to form a cyclic structure. When any of the hydrocarbon groups indicated by $R^1$ to $R^6$ is substituted, the substituent group contains a heteroatom such as N, O or S, and it has a group such as C—O—C, COOR, COCH, OH, SO$_3$H, —C—N—C— or NH$_2$.

Examples of the polycarboxylic esters include:

aliphatic polycarboxylic esters, such as diethyl succinate, dibutyl succinate, diethyl methylsuccinate, diisobutyl α-methylglutarate, diethyl methylmalonate, diethyl ethylmalonate, diethyl isopropylmalonate, diethyl butylmalonate, diethyl phenylmalonate, diethyl diethylmalonate, diethyl dibutylmalonate, monooctyl maleate, dioctyl maleate, dibutyl maleate, dibutyl butylmaleate, diethyl butylmaleate, diisopropyl β-methylglutarate, diallyl ethylsuccinate, di-2-ethylhexyl fumarate, diethyl itaconate and dioctyl citraconate;

alicyclic polycarboxylic esters, such as diethyl 1,2-cyclohexanecarboxylate, diisobutyl 1,2-cyclohexanecarboxylate, diethyl tetrahydrophthalate and diethyl nadiate;

aromatic polycarboxylic esters, such as monoethyl phthalate, dimethyl phthalate, methylethyl phthalate, monoisobutyl phthalate, diethyl phthalate, ethylisobutyl phthalate, di-n-propyl phthalate, diisopropyl phthalate, di-n-butyl phthalate, diisobutyl phthalate, di-n-heptyl phthalate, di-2-ethylhexyl phthalate, di-n-octyl phthalate, dineopentyl phthalate, didecyl phthalate, benzylbutyl phthalate, diphenyl phthalate, diethyl naphthalenedicarboxylate, dibutyl naphthalenedicarboxylate, triethyl trimellitate and dibutyl trimellitate; and heterocyclic polycarboxylic esters, such as 3,4-furandicarboxylate.

Other examples of the polycarboxylic esters are esters of long chain dicarboxylic acids, such as diethyl adipate, diisobutyl adipate, diisopropyl sebacate, di-n-butyl sebacate, di-n-octyl sebacate and di-2-ethylhexyl sebacate.

Of the above compounds, preferably used as the electron donor (a) in the invention are carboxylic esters, more preferably used are polycarboxylic esters, and particularly preferably used are phthalic esters.

These compounds can be used in combination of two or more kinds.

Also employable as the electron donor (a) is a silicon compound represented by the formula (c-iii) described later.

When the titanium compound, the magnesium compound and the electron donor are brought into contact with each other, a carrier compound may be used to prepare a solid titanium catalyst component (A) supported on a carrier.

Examples of the carrier compounds include Al$_2$O$_3$, SiO$_2$, B$_2$O$_3$, MgO, CaO, TiO$_2$, ZnO, Zn$_2$O, SnO$_2$, BaO, ThO and resins such as a styrene/divinylbenzene copolymer. Of these carrier compounds, preferred are SiO$_2$, Al$_2$O$_3$, MgO, ZnO and Zn$_2$O.

The above-mentioned components may be contacted in the presence of other reagents such as silicon, phosphorus and aluminum.

The solid titanium catalyst component (A) can be prepared by bringing the titanium compound, the magnesium compound and the electron donor into contact with each other, wherein any one of conventionally known processes may be employed.

Some examples of the known processes for preparing the solid titanium catalyst component (A) are briefly described below.

(1) A process comprising contacting a solution consisting of a magnesium compound, an electron donor and a hydrocarbon solvent with a titanium compound after or simultaneously with precipitating a solid by contacting the solution with an organometallic compound.

(2) A process comprising contacting a complex composed of a magnesium compound and an electron donor with an organometallic compound and then contacting the reaction product with a titanium compound.

(3) A process comprising contacting a reaction product of an inorganic carrier and an organomagnesium compound with a titanium compound and preferably together with an electron donor. In this process, the reaction product may be beforehand contacted with a halogen-containing compound and/or an organometallic compound.

(4) A process comprising obtaining an inorganic or organic carrier on which a magnesium compound is supported from a mixture of an inorganic or organic carrier and a solution containing a magnesium compound and an electron donor, and optionally a hydrocarbon solvent, and then contacting the resulting carrier with a titanium compound.

(5) A process comprising contacting a solution containing a magnesium compound and an electron donor, and optionally a hydrocarbon solvent, with an inorganic or organic carrier to obtain a solid titanium catalyst component on which magnesium and titanium are supported.

(6) A process comprising contacting a liquid organomagnesium compound with a halogen-containing titanium compound. In this process, an electron donor is used at least once.
(7) A process comprising contacting a liquid organomagnesium compound with a halogen-containing titanium compound and then contacting the reaction product with a titanium compound. In this process, an electron donor is used at least once.
(8) A process comprising contacting an alkoxy group-containing magnesium compound with a halogen-containing titanium compound. In this process, an electron donor is used at least once.
(9) A process comprising contacting a complex composed of an alkoxy group-containing magnesium compound and an electron donor with a titanium compound.
(10) A process comprising contacting a complex composed of an alkoxy group-containing magnesium compound and an electron donor with a titanium compound and then contacting the reaction product with a titanium compound.
(11) A process comprising contacting a magnesium compound, an electron donor and a titanium compound in an optional order. In this reaction, each components may be pretreated with an electron donor and/or a reaction assistant such as an organometallic compound or a halogen-containing silicon compound. In this process, it is preferred to use the electron donor at least once.
(12) A process comprising contacting a liquid magnesium compound having no reducing ability with a liquid titanium compound, preferably in the presence of an electron donor, to precipitate a solid magnesium/titanium complex compound.
(13) A process comprising further contacting the reaction product obtained in the process (12) with a titanium compound.
(14) A process comprising further contacting the reaction product obtained in the process (11) or (12) with an electron donor and a titanium compound.
(15) A process comprising pulverizing a magnesium compound and a titanium compound, and optionally an electron donor, to give a solid and treating the solid with either halogen, a halogen compound or aromatic hydrocarbon. This process may include a step of pulverizing only a magnesium compound, a step of pulverizing a complex composed of a magnesium compound and an electron donor, or a step of pulverizing a magnesium compound and a titanium compound. Further, after the pulverization, the solid may be pretreated with a reaction assistant and then treated with halogen or the like. Examples of the reaction assistants include an organometallic compound and a halogen-containing silicon compound.
(16) A process comprising pulverizing a magnesium compound and then contacting the pulverized compound with a titanium compound. In this process, an electron donor or a reaction assistant is preferably used in the pulverization stage and/or the contacting stage.
(17) A process comprising treating the compound obtained in any of the processes (11) to (16) with halogen, a halogen compound or aromatic hydrocarbon.
(18) A process comprising contacting the reaction product of a metal oxide, an organomagnesium compound and a halogen-containing compound with a titanium compound and if necessary an electron donor.
(19) A process comprising contacting a magnesium compound such as a magnesium salt of organic acid, alkoxymagnesium or aryloxymagnesium with a titanium compound and/or halogen-containing hydrocarbon and if necessary an electron donor.
(20) A process comprising contacting a hydrocarbon solution containing at least a magnesium compound and alkoxytitanium with a titanium compound and/or an electron donor. In this process, a halogen-containing compound such as a halogen-containing silicon compound is preferably allowed to coexist.
(21) A process comprising reacting a liquid magnesium compound having no reducing ability with an organometallic compound to precipitate a solid magnesium/metal (aluminum) complex compound and then contacting the resulting compound with an electron donor and a titanium compound.

The amounts of each components used for preparing the solid titanium catalyst component (A) vary depending on the process used, and cannot be defined in general. However, for example, the electron donor is used in an amount of 0.01 to 5 mol, preferably 0.1 to 1 mol, and the titanium compound is used in an amount of 0.01 to 1,000 mol, preferably 0.1 to 200 mol, both based on 1 mol of the magnesium compound.

The solid titanium catalyst component (A) obtained as above contains, as its essential ingredients, magnesium, titanium, halogen and an electron donor.

In this solid titanium catalyst component (A), an atomic ratio of halogen/titanium is about 2 to 200, preferably about 4 to 100; a molar ratio of the electron donor/titanium is about 0.01 to 100, preferably about 0.2 to 10; and an atomic ratio of magnesium/titanium is about 1 to 100, preferably about 2 to 50.

(B) Organometallic Catalyst Component

As the organometallic catalyst component (B), organometallic compounds of metals belonging to Group I to III of the periodic table are employable, and examples thereof include:

(B-1) organoaluminum compounds represented by the following formula

$R^1_m Al(OR^2)_n H_p X_q$ wherein $R^1$ and $R^2$ are each a hydrocarbon group having usually 1 to 15 carbon atoms, preferably 1 to 4 carbon atoms, $R^1$ and $R^2$ my be the same or different, X is a halogen atom, and m, n, p and q are numbers satisfying the conditions of $0<m \leq 3$, $0 \leq n<3$, $0 \leq p<3$, $0 \leq q<3$ and $m+n+p+q=3$;

[B-2] alkyl complex compounds of aluminum and Group I metals, represented by the following formula

$M^1 AlR^1_4$ wherein $M^1$ is Li, Na or K, and $R^1$ is the same as defined above; and

[B-3] dialkyl compounds of Group II or III metals, represented by the following formula

$R^1 R^2 M^2$ wherein R¹ and R² are the same as defined above, and M² is Mg, Zn or Cd.

Examples of the organoaluminum compounds (B-1) include:

compounds of the formula $R^1{}_m Al(OR^2)_{3-m}$ wherein R¹ and R² are the same as defined above, and m is preferably a number satisfying the condition of $1.5 \leq m \leq 3$;

compounds of the formula $R_m AlX_{3-m}$ wherein R¹ is the same as defined above, X is halogen, and m is preferably a number satisfying the condition of $0<m<3$;

compounds of the formula $R^1{}_m AlH_{3-m}$ wherein R¹ is the same as defined above, and m is preferably a number satisfying the condition of $2 \leq m<3$; and compounds of the formula $R^1{}_m Al(OR^2)_n X_q$ wherein R¹ and R² are the same as defined above, X is halogen, and m, n, and q are numbers satisfying the conditions of $0<m \leq 3$, $0 \leq n<3$, $0 \leq q<3$ and $m+n+q=3$.

More specifically, examples of the aluminum compounds (B-1) include:

trialkylaluminums, such as triethylaluminum and tributylaluminum;

trialkenylaluminums, such as triisoprenylaluminum;

dialkylaluminum alkoxides, such as diethylaluminum ethoxide and dibutylaluminum butoxide;

alkylaluminum sesquialkoxides, such as ethylaluminum sesquiethoxide and butylaluminum sesquibutoxide;

partially alkoxylated alkylaluminums, such as those having an average composition represented by, for example, the formula $R^1{}_{2.5}Al(OR^2)_{0.5}$;

dialkylaluminum halides, such as diethylaluminum chloride, dibutylaluminum chloride and diethylaluminum bromide;

alkylaluminum sesquihalides, such as ethylaluminum sesquichloride, butylaluminum sesquichloride and ethylaluminum sesquibromide;

partially halogenated alkylaluminums, such as alkylaluminum dihalides, e.g., ethylaluminum dichloride, propylaluminum dichloride and butylaluminum dibromide;

dialkylaluminum hydrides, such as diethylaluminum hydride and dibutylaluminum hydride;

partially hydrogenated alkylaluminums, such as alkylaluminum dihydrides, e.g., ethylaluminum dihydride and propylaluminum dihydride; and partially alkoxylated and halogenated alkylalumiums, such as ethylaluminum ethoxychloride, butylaluminum butoxychloride and ethylaluminum ethoxybromide.

Analogues to the aluminum compound (B-1) are organoaluminum compounds in which at least two aluminum atoms are linked to each other through an oxygen atom or a nitrogen atom.

Examples of such compounds include:

$(C_2H_5)_2AlOAl(C_2H_5)_2$, $(C_4H_9)_2AlOAl(C_4H_9)_2$, $(C_2H_5)_2AlN(C_2H_5)Al(C_2H_5)_2$, and aluminoxanes such as methylaluminoxane.

The compounds belonging to the compound (B-2) are, for example, $LiAl(C_2H_5)_4$ and $LiAl(C_7H_{15})_4$.

Of the above compounds, organoaluminum compounds are preferably employed.

(C) Organosilicon Compound

The organosilicon compound (C) is the compound represented by the following formula (c-i);

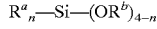

$R^a{}_n$—Si—$(OR^b)_{4-n}$ (c-i)

wherein, n is 1, 2 or 3; when n is 1, $R^a$ is a secondary or a tertiary hydrocarbon group; when n is 2 or 3, at least one of $R^a$ is a secondary or a tertiary hydrocarbon group, $R^a$ may be the same or different; and $R^b$ is a hydrocarbon group of 1 to 4 carbon atoms; and when 4−n is 2 or 3, $OR^b$ may be the same or different.

In the organosilicon compound represented by the formula (c-i), the secondary or the tertiary hydrocarbon group includes cyclopentyl, cyclopentenyl and cyclopentadienyl, and substituted thereof, and the hydrocarbon group in which the carbon adjacent to Si is a secondary or tertiary.

More specifically, the substituted cyclopentyl group includes cyclopentyl group having alkyl group such as 2-methylcyclopentyl, 3-methylcyclopentyl, 2-ethylcyclopentyl, 2-n-butylcyclopentyl, 2,3-dimethylcyclopentyl, 2,4-dimethylcyclopentyl, 2,5-dimethylcyclopentyl, 2,3-diethylcyclopentyl, 2,3,4-trimethylcyclopentyl, 2,3,5-trimethylcyclopentyl, 2,3,4-triethylcyclopentyl, tetramethylcyclopentyl and tetraethylcyclopentyl;

the substituted cyclopentenyl group includes cyclopentenyl group having alkyl group such as 2-methylcyclopentenyl, 3-methylcyclopentenyl, 2-ethylcyclopentenyl, 2-n-butylcyclopentenyl, 2,3-dimethylcyclopentenyl, 2,4-dimethylcyclopentenyl, 2,5-dimethylcyclopentenyl, 2,3,4-trimethylcyclopentenyl, 2,3,5-trimethylcyclopentenyl, 2,3,4-triethylcyclopentenyl, tetramethylcyclopentenyl and tetraethylcyclopentenyl;

the substituted cyclopentadienyl group includes cyclopentadienyl group having alkyl group such as 2-methylcyclopentadienyl, 3-methylcyclopentadienyl, 2-ethylcyclopentadienyl, 2-n-butylcyclopentadienyl, 2,3-dimethylcyclopentadienyl, 2,4-dimethylcyclopentadienyl, 2,5-dimethylcyclopentadienyl, 2,3-diethylcyclopentadienyl, 2,3,4-trimethylcyclopentadienyl, 2,3,5-trimethylcyclopentadienyl, 2,3,4-triethylcyclopentadienyl, 2,3,4,5-tetramethylcyclopentadienyl, 2,3,4,5-tetraethylcyclopentadienyl, 1,2,3,4,5-pentamethylcyclopentadienyl and 1,2,3,4,5-pentaethylcyclopentadienyl.

The hydrocarbon group in which the carbon adjacent to Si is a secondary includes i-propyl, s-butyl, s-amyl and α-benzyl; and the hydrocarbon group in which the carbon adjacent to Si is a tertiary includes t-butyl, t-amyl, α,α'-diemethylbenzyl and admantyl.

When n is 1, the organosilicon compound represented by the formula (c-i) includes trialkoxysilanes such as cyclopentyltrimethoxysilane, 2-methylcyclopentyltrimethoxysilane, 2,3-dimethylcyclopentyltrimethoxysilane, cyclopentyltriethoxysilane, iso-butyltriethoxysilane, t-butyltriethoxysilane, cyclohexyltrimethoxysilane, cyclohexyltriethoxysilane, 2-norbornanetrimethoxysilane, and 2-norbornanetriethoxysilane;

when n is 2, the organosilicon compound represented by the formula (c-i) includes dialkoxysilanes such as dicyclopentyldiethoxysilane, t-butylmethyldimethoxysilane, t-butylmethyldiethoxysilane, t-amylmethyldiethoxysilane, dicyclohexyldimethoxysilane, cyclohexylmethyldimethoxysilane, cyclohexylmethyldiethoxysilane, and 2-norbornanemethyldimethoxysilane.

When n is 2, the organosilicon compound represented by the formula (c-i) is preferably dimethoxy compound represented by the following formula (c-ii);

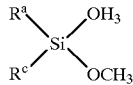

(c-ii)

wherein, $R^a$ and $R^c$ are each independently a cyclopentyl group, a substituted cyclopentenyl group, a cyclopentenyl group, a substituted cyclopentenyl group, a cyclopentadienyl group, a substituted cyclopentadienyl group or a hydrocarbon group whose carbon adjacent to Si is a secondary carbon or a tertiary carbon.

The organosilicon compound represented by the formula (c-ii) includes, for example, dicyclopentyldimethoxysilane, dicyclopentenyldimethoxyxilane, dicyclopentadienyldimethoxyxilane, di-t-butyldimethoxysilane, di-(2-methylcyclopentyl)dimethoxysilane, di-(3-methylcyclopentyl)dimethoxysilane, di-(2-ethylcyclopentyl)dimethoxysilane, di-(2,3-dimethylcyclopentyl)dimethoxysilane, di-(2,4-dimethylcyclopentyl)dimethoxysilane, di-(2,5-dimethylcyclopentyl)dimethoxysilane, di-(2,3-diethylcyclopentyl)dimethoxysilane, di-(2,3,4-trimethylcyclopentyl)dimethoxysilane, di-(2,3,5-trimethylcyclopentyl)dimethoxysilane, di-(2,3,4-triethylcyclopentyl)dimethoxysilane, di-(tetramethylcyclopentyl)dimethoxysilane, di-(tetraethylcyclopentyl)dimethoxysilane, di-(2-methylcyclopentenyl)dimethoxysilane, di-(3-methylcyclopentenyl)dimethoxysilane, di-(2-ethylcyclopentenyl) diethoxysilane, di-(2-n-butylcyclopentenyl)dimethoxysilane, di-(2,3-dimethylcyclopentenyl)dimethoxysilane, di-(2,4-dimethylcyclopentenyl)dimethoxysilane, di-(2,5-dimethylcyclopentenyl)dimethoxysilane, di-(2,3,4-trimethylcyclopentenyl)dimethoxysilane, di-(2,3,5-triethylcyclopentenyl)dimethoxysilane, di-(2,3,4-triethylcyclopentenyl)dimethoxysilane, di-(tetraethylcyclopentenyl)dimethoxysilane, di-(tetramethylcyclopentenyl)diethoxysilane, di-(2-methylcyclopentadienyl)dimethoxysilane, di-(3-methylcyclopentadienyl)dimethoxysilane, di-(2-ethylcyclopentadienyl)dimethoxysilane, di-(2-n-butylcyclopentadienyl)dimethoxysilane, di-(2,3-dimethylcyclopentadienyl)dimethoxysilane, di-(2,4-dimethylcyclopentadienyl)dimethoxysilane, di-(2,5-dimethylcyclopentadienyl)dimethoxysilane, di-(2,3-diethylcyclopentadienyl)dimethoxysilane, di-(2,3,4-trimethylcyclopentadienyl)dimethoxysilane, di-(2,3,5-trimethylcyclopentadienyl)dimethoxysilane, di-(2,3,4-triethylcyclopentadienyl)dimethoxysilane, di-(2,3,4,5-tetramethylcyclopentadienyl)dimethoxysilane, di-(2,3,4,5-tetraethylcyclopentadienyl)dimethoxysilane, di-(1,2,3,4,5-pentamethylcyclopentadienyl)dimethoxysilane, di-(1,2,3,4,5-pentaethylcyclopentadienyl)dimethoxysilane, di-t-amyldimethoxysilane, di-(α,α'-dimethylbenzyl)dimethoxysilane, di-(admantyl)dimethoxysilane, admantyl-t-butyldimethoxysilane, cyclopentyl-t-butyldimethoxysilane, di-isopropyldimethoxysilane, di-s-butyldimethoxysilane, di-s-amyldimethoxysilane, and isopropyl-s-butyldimethoxysilane.

When n is 3, the organosilicon compound represented by the formula (c-i) includes monoalkoxysilanes such as tricyclopentylmethoxysilane, tricyclopentylethoxysilane, dicyclopentylmethylmethoxysilane, dicyclopentylethylmethoxysilane, dicyclopentylmethylethoxysilane, dicyclopentyldimethylmethoxysilane, cyclopentyldiethylmethoxysilane, and cyclopentyldimethylethoxysilane.

Of these, preferred are dimethoxysilanes, particularly preferred are dimethoxysilanes represented by the formula (c-ii), to be concretely, preferably used is dicyclopentyldimethoxysilane, di-t-butyldimethoxysilane, di-(2-methylcyclopentyl)dimethoxysilane, di-(3-methylcyclopentyl)dimethoxysilane or do-t-amyldimethoxysilane.

(D) Polyether Compound

In the compound having at least two ether linkages spaced by plural atoms (hereinafter referred as "polyether compound") used in the present invention, the atoms between these ether linkages are at least one atom selected from the group consisting of carbon, silicon, oxygen, sulfur, phosphorus and boron, and the number of the atoms are not less than two. Of the polyether compounds, preferred are those in which a relatively bulky substituent attaches to the atom spacing the ether linkages. The relatively bulky substituent has desirably a linear, branched or cyclic structure contaning 2 or more, preferably 3 or more, of carbon atoms. Particularly preferred are those having a branched or cyclic structure. Further, preferred is a polyether compound containing a plurality of, particularly 3 to 20, more particularly 3 to 10, especially 3 to 7 carbon atoms as the atoms spacing at least two ether linkages.

The polyether compound as mentioned above can be represented, for example, by the following formula:

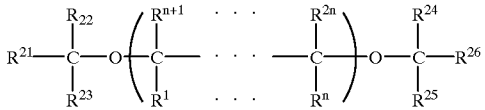

wherein n is an integer satisfying the condition of $2 \leq n \leq 10$; $R^1$ to $R^{26}$ are each a substituent having at least one atom selected from the group consisting of carbon, hydrogen, oxygen, halogen, nitrogen, sulfur, phosphorus, boron and silicon; any optional combination of from $R^1$ to $R^{26}$, preferably from $R^1$ to $R^{2n}$, may form together a ring other than a benzene ring; and the main chain of the compound may contain atoms other than carbon.

The polyether compound as illustrated above includes 2-(2-ethylhexyl)-1,3-dimethoxypropane, 2-isopropyl-1,3-dimethoxypropane, 2-butyl-1,3-dimethoxypropane, 2-s-butyl-1,3-dimethoxypropane, 2-cyclohexyl-1,3-dimethoxypropane, 2-phenyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2-(1-naphthyl)-1,3-dimethoxypropane, 2-(2-fluorophenyl)-1,3-dimethoxypropane, 2-(1-decahydronaphthyl)-1,3-dimethoxypropane, 2-(p-t-butylphenyl)-1,3-dimethoxypropane, 2,2-dicyclohexyl-1,3-dimethoxypropane, 2,2-dicyclopentyl-1,3-dimethoxypropane, 2,2-diethyl-1,3-dimethoxypropane, 2,2-dipropyl-1,3-dimethoxypropane, 2,2-diisopropyl-1,3- dimethoxypropane, 2,2-dibutyl-1,3-dimethoxypropane, 2-methyl-2-propyl-1,3-dimethoxypropane, 2-methyl-2-benzyl-1,3-dimethoxypropane, 2-methyl-2-ethyl-1,3-dimethoxypropane, 2-methyl-2-iso-propyl-1,3-dimethoxypropane, 2-methyl-2-phenyl-1,3-dimethoxypropane, 2-methyl-2-cyclohexyl-1,3-dimethoxypropane, 2,2-bis(p-chlorophenyl)-1,3-dimethoxypropane, 2,2-bis(2-cyclohexylethyl)-1,3-dimethoxypropane, 2-methyl-2-iso-butyl-1,3-dimethoxypropane, 2-methyl-2-(2-ethylhexyl)-1,3-dimethoxypropane, 2,2-di-iso-butyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2,2-di-iso-butyl-1,3-diethoxypropane, 2,2-di-iso-butyl-1,3-dibutoxypropane, 2-iso-butyl-2-iso-propyl-1,3-dimethoxypropane, 2-(1-methylbutyl)-2-isopropyl-1,3-dimethoxypropane, 2-(1-methylbutyl)-2-s-butyl-1,3-dimethoxypropane, 2,2-di-s-butyl-1,3-dimethoxypropane, 2,2-di-t-butyl-1,3-dimethoxypropane, 2,2-dineopentyl-1,3-dimethoxypropane, 2-iso-propyl-2-iso-pentyl-1,3-dimethoxypropane, 2-phenyl-2-isopropyl-1,3-dimethoxypropane, 2-phenyl-2-s-butyl-1,3-dimethoxypropane, 2-benzyl-2-isopropyl-1,3-dimethoxypropane, 2-benzyl-2-s-butyl-1,3-dimethoxypropane, 2-phenyl-2-benzyl-1,3-dimethoxypropane, 2-cyclopentyl-2-isopropyl-1,3-dimethoxypropane, 2-cyclopentyl-2-s-butyl-1,3-dimethoxypropane, 2-cyclohexyl-2-isopropyl-1,3-dimethoxypropane, 2-cyclohexyl-2-s-butyl-1,3-dimethoxypropane, 2-isopropyl-2-s-butyl-1,3-dimethoxypropane, 2-cyclohexyl-2-cyclohexylmethyl-1,3-dimethoxypropane, 2,3-diphenyl-1,4-diethoxybutane, 2,3-dicyclohexyl-1,4-diethoxybutane, 2,2-dibenzyl-1,4-diethoxybutane, 2,3-dicyclohexyl-1,4-diethoxybutane, 2,3-di-iso-propyl-1,4-diethoxybutane, 2,2-bis(p-methylphenyl)-1,4-dimethoxybutane, 2,3-bis(p-chlorophenyl)-1,4-dimethoxybutane, 2,3-bis(p-fluorophenyl)-1,4-dimethoxybutane, 2,4-diphenyl-1,5-dimethoxypentane, 2,5-diphenyl-1,5-dimethoxyhexane, 2,4-di-iso-propyl-1,5-dimethoxypentane, 2,4-di-iso-butyl-1,5-dimethoxypentane, 2,4-di-iso-amyl-1,5-dimethoxypentane, 3-methoxymethyltetrahydrofuran, 3-methoxymethyldioxane, 1,3-di-iso-butoxypropane, 1,2-di-iso-butoxypropane, 1,2-di-iso-butoxyethane, 1,3-di-iso-amyloxypropane, 1,3-di-iso-neopentyloxyethane, 1,3-dineopentyloxypropane, 2,2-tetramethylene-1,3-dimethoxypropane, 2,2-pentamethylene-1,3-dimethoxypropane, 2,2-hexamethylene-1,3-dimethoxypropane, 1,2-bis(methoxymethyl)cyclohexane, 2,8-dioxaspiro[5,5]undecane, 3,7-dioxabicyclo[3,3,1] nonane, 3,7-dioxabicyclo[3,3,0]octane, 3,3-di-iso-butyl-1,5-oxononane, 6,6-di-iso-butyldioxyheptane, 1,1-dimethoxymethylcyclopentane, 1,1-bis(dimethoxymethyl) cyclohexane, 1,1-bis(methoxymethyly)bicyclo[2,2,1] heptane, 1,1-dimethoxymethylcyclopentane, 2-methyl-2-methoxymethyl-1,3-dimethoxypropane, 2-cyclohexyl-2-ethoxymethyl-1,3-diethoxypropane, 2-cyclohexyl-2-methoxymethyl-1,3-dimethoxypropane, 2,2-di-iso-butyl-1,3-dimethoxycyclohexane, 2-iso-propyl-2-iso-amyl-1,3-dimethoxycyclohexane, 2-cyclohexyl-2-methoxymethyl-1,3-dimethoxycyclohexane, 2-iso-propyl-2-methoxymethyl-1,3-dimethoxycyclohexane, 2-iso-butyl-2-methoxymethyl-1,3-dimethoxycyclohexane, 2-cyclohexyl-2-ethoxymethy-1,3-diethoxycyclohexane, 2-cyclohexyl-2-ethoxymethyl-1,3-dimethoxycyclohexane, 2-iso-propyl-2-ethoxymethyl-1,3-diethoxycyclohexane, 2-iso-propyl-2-ethoxymethyl-1,3-diethoxycyclohexane, 2,-iso-buty-2-ethoxymethyl-1,3-diethoxycyclohexane, 2-iso-butyl-2-ethoxymethyl-1,3-dimethoxycyclohexane, tris(p-methoxyphenyl)phospine, methlphenylbis (methoxymethyl) silane, diphenylbis (methoxymethyl)silane, methylcyclohexylbis (methoxymethyl)silane, di-t-butylbis(methoxymethyl) silane, cyclohexyl-t-butylbis(methoxymethyl)silane and iso-propyl-t-butylbis(methoxymethyl)silane.

Of these compounds, preferred are 1,3-diethers, espesially, 2,2-di-iso-butyl-1,3-dimethoxypropane, 2-iso-propyl-2-iso-pentyl-1,3-dimethoxypropane, 2,2-dicyclohexyl-1,3 dimethoxypropane, 2-cyclohexyl-2-isopropyl-1,3-dimethoxypropane, 2-isopropyl-e-s-butyl-1, 3-dimethoxypropane, 2,2-diphenyl-1,3-dimethoxypropane, 2-cyclopentyl-2-isopropyl-1,3-dimethoxypropane and 2,2-bis(cyclohexylmethyl)1,3-dimethoxypropane. These compounds may be used either singly or in combination.

[III] Organometallic Compound Catalyst Component

In the present invention, the same component as the aforesaid organometallic compound catalyst component (B) can be used as the organometallic compound catalyst component [III].

The type of the organometallic compound catalyst component [III] may be the same as or different from that of the organometallic compound catalyst component (B) used in the preparation of the contact product [I-1 or the prepolymerized catalyst [Ia-1]. However, the catalyst (1) or (1a) can be formed with or without the organometallic compound catalyst component [III], i.e., the catalyst component [III] can be used optionally.

With regard to whether or not the organometallic compound catalyst component [III] is used for forming the catalysts (2), (2a), (3), (3a), (4), (4a) and (5a) which are described later, the above statement is also applied to.

Olefin Polymerization Catalysts (1) and (1a)

The olefin polymerization catalyst (1) according to the invention is formed from:

[I-1] the contact product obtained by contacting:
(A) the solid titanium catalyst component,
(B) the organometallic compound catalyst component, and optionally,
(C) the organosilicon compound represented by the formula (c-i);

[II-1](D) the polyether compound; and optionally,

[III] the organometallic compound catalyst component, as described above.

The olefin polymerization catalyst (1a) according to the invention is formed from:

[Ia-1] a prepolymerized catalyst component obtained by prepolymerizing an olefin of 2 or more carbon atoms in the presence of the catalyst components for forming the contact product [I-1] in such a way that the amount of the prepolymer formed is 0.01 to 2,000 g based on 1 g of the solid titanium catalyst component (A);

[II-1] (D) the polyether compound; and optionally,

[III] the organometallic compound catalyst component, as described above.

When the contact product [I-1] is prepared by contacting the solid titanium catalyst component (A), the organometallic compound catalyst component (B) and the specific organosilicon compound (C), the organometallic compound catalyst component (B) is used in an amount of usually 0.1 to 100 mmol, preferably 0.5 to 50 mmol, based on 1 mol of titanium atom contained in the solid titanium catalyst component (A), and the organosilicon compound (C) is used in an amount of usually 0.1 to 50 mol, preferably 0.5 to 30 mol, more preferably 1 to 10 mol, based on 1 mol of the titanium atom.

There is no limitation on the order of contacting these components (A), (B) and (C).

In the present invention, preferred is the prepolymerized catalyst [Ia-1] obtained by prepolymerizing an olefin or 2 or more carbon atoms in the presense of the contact product [I-1] of the catalyst components (A), (B) and (C).

Examples of the olefins of 2 or more carbon atoms which can be prepolymerized include:

linear α-olefins, such as ethylene, propylene, 1-butene, 1-pentene, 1-hexene, 1-octene, 1-decene, 1-dodecene, 1-tetradecene, 1-hexadecene, 1-octadecene and 1-eicosene;

cycloolefins, such as cyclopentene, cycloheptene, norbornene, 5-ethyl-2-norbornene, tetracyclododecene, 2-ethyl-1,4,5,8-dimethano-1,2,3,4,4a,5,8,8a-octahydronaphthalene; and olefins represented by the following formulas (i) and (ii):

  (i)

  (ii)

wherein X is a cycloalkyl group, an aryl group or

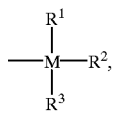

M is carbon or silicon, $R^1$ and $R^2$ are each a hydrocarbon group, and $R^3$ is hydrogen or a hydrocarbon group.

Examples of the cycloalkyl group X in the formula (i) include cyclopentyl, cyclohexyl and cycloheptyl. Examples of the aryl group X include phenyl, tolyl, xylyl and naphthyl.

Examples of the hydrocarbon groups indicated by $R^1$, $R^2$ and $R^3$ include an alkyl group such as methyl, ethyl, propyl and butyl; an aryl group such as phenyl and naphthyl; and a norbornyl group. The hydrocarbon groups $R^1$, $R^2$ and $R^3$ may contain silicon and halogen, respectively.

Examples of the olefins represented by the formulae (i) and (ii) include 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, allylnaphthalene, allylnorbornane, styrene, dimethylstyrenes, vinylnaphthalenes, allyltoluenes, allylbenzene, vinylcyclohexane, vinylcyclopentane, vinylcycloheptane and allytrialkylsilanes.

Of these, preferred are 3-methyl-1-butene, 3-methyl-1-pentene, 3-ethyl-1-hexene, vinylcyclohexane, allyltrimethylsilane, dimethylstyrene and propylene; more preferred are 3-methyl-1-butene, vinylcyclohexane and allyltrimethylsilane; and particularly preferred is 3-methyl-1-butene.

These olefins may be used in combination of two or more kinds.

The prepolymerized catalyst [Ia-1] for use in the invention is obtained by prepolymerizing the above-mentioned olefin in such a way that the amount of the prepolymer is 0.01 to 2,000 g, preferably 0.1 to 200 g, based on 1 g of the solid titanium catalyst component (A).

It is desired that a concentration of the solid titanium catalyst component (A) during the prepolymerization is in the range of usually about 0.01 to 200 mmol, preferably about 0.05 to 100 mmol, in terms of titanium atom, based on 1 liter of the polymerization volume.

In the preparation of the prepolymerized catalyst [Ia-1], the organometallic compound catalyst component (B) and the organosilicon compound (C) may be used in the same amounts as used for preparing the aforesaid contact product [I-1].

The prepolymerization can be carried out, for example, by adding the olefin to the catalyst components in the presence of a polymerization-inactive hydrocarbon medium to react them under mild conditions.

Examples of the inert hydrocarbon solvents used herein include aliphatic hydrocarbons such as propane, butane, pentane, hexane, heptane, octane, decane, dodecane and kerosine; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene; and mixtures of these hydrocarbons. Of these inert hydrocarbon solvents, particularly preferred are aliphatic hydrocarbons.

There is no limitation on the reaction temperature for the prepolymerization, so far as the resulting prepolymer is not substantially dissolved in the inert hydrocarbon solvent. In general, the temperature is in the range of about −20 to +100° C., preferably about −20 to +80° C., more preferably 0 to +40° C.

A molecular weight regulator such as hydrogen may be used in the prepolymerization.

The prepolymerization may be carried out either batchwise, semi-continuously or continuously.

In the preparation of the contact product [I-1] and the prepolymerized catalyst [Ia-1], other compounds useful for the catalyst formation may be used together with the above-mentioned components. For example, an electron donor (b) may be used together with the organosilicon compound (C).

Employable as the electron donor (b) are the electron donor (a) which is used for preparing the solid titanium catalyst component (A) and the following nitrogen-containing compounds, oxygen-containing compounds and phosphorus-containing compounds.

Examples of the nitrogen-containing compounds employable as the electron donor (b) include 2,6-substituted piperidines, 2,5-substituted piperidines, and substituted methylenediamines such as N,N,N',N'-tetramethylmethylenediamine, N,N,N',N'-tetraethylmethylenediamine, 1,3-dibenzylimidazoline and 1,3-dibenzyl-2-phenylimidazoline.

Examples of the phosphorus-containing compounds employable as the electron donor (b) include phosphites such as triethyl phosphite, tri-n-propyl phosphite, triisopropyl phosphite, tri-n-butyl phosphite, triisobutyl phosphite, diethyl-n-butyl phosphite and diethylphenyl phosphite.

Examples of the oxygen-containing compounds employable as the electron donor (b) include 2,6-substituted tetrahydropyrans and 2,5-substituted tetrahydropyrans.

Furthermore, an organosilicon compound (E) represented by the following formula (c-iii) may be used;

  (c-iii)

wherein each of R and R' is a hydrocarbon group, and n is a number satisfying the condition of 0<n<4.

Specific examples of the organosilicon compounds represented by the above formula (c-iii) include:

trimethylmethoxysilane, trimethylethoxysilane, dimethyldimethoxysilane, dimethyldiechoxysilane, diisopropyldimethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bis-ethylphenyldimethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, n-butyltriethoxysilane, phenyltriethoxysilane, γ-aminopropyltriethoxysilane, chlorotriethoxysilane, ethyltriisopropoxysilane, vinyltributoxysilane, ethyl silicate, butyl silicate, trimethylphenoxysilane, methyltriallyoxysilane, vinyltris(β-methoxyethoxysilane), vinyltriacetoxysilane and dimethyltetraethoxysiloxane.

The organosilicon compound (E) represented by the formula (c-iii) may be the same as the organosilicon compound (C) represented by the formula (c-i).

When preparing the olefin polymerization catalyst (1) (or (1a)) formed from:

[I-1] the contact product (or [Ia-1] the prepolymerized catalyst),

[II-1] the electron donor composed of the polyether compound (D), and optionally,

[III] the organometallic compound catalyst component, the polyether compound (D) as the electron donor [II-1] is used in an amount of 0.001 to 5,000 mol, preferably 0.01 to 1,000 mol, based on 1 mol of titanium atom contained in the contact product [I-1] or the prepolymerized catalyst [Ia-1].

The organometallic compound catalyst component [III] is used, optionally, in an amount of 1 to 2,000 mol, preferably 2 to 1,000 mol, based on 1 mol of the titanium atom.

When the olefin polymerization catalyst is formed from the contact product [I-1] (or the prepolymerized catalyst [Ia-1], the polyether compound (D) (electron donor [II-1]) and the organometallic compound catalyst component [III], other compounds useful for the catalyst formation, e.g., the aforesaid electron donors (a) and (b), can be used if desired.

By the use of the olefin polymerization catalyst (1) (or (1a)) of the invention which is formed from the contact product [I-1] (or the prepolymerized catalyst [Ia-1]) comprising the specific catalyst components and the electron donor composed of the specific polyether compound (D), there can be prepared a polypropylene having a higher isotacticity and a propylene block copolymer comprising a polypropylene component having a higher isotacticity and a rubber component having a higher molecular weight, as compared with those obtained using conventionally known olefin polymerization catalysts.

Olefin Polymerization Catalysts (2) and (2a)

The olefin polymerization catalyst according to the invention is formed from:

[I-2] the contact product obtained by contacting:
(A) the solid titanium catalyst component,
(B) the organometallic compound catalyst component, and
(D) the polyether compound;

[II-2](C) the organosilicon compound represented by the formula (c-i); and optionally,

[III] the organometallic compound catalyst component, as described above.

The olefin polymerization catalyst (2a) according to the invention is formed from:

[Ia-2] the prepolymerized catalyst obtained by prepolymerizing an olefin of 2 or more carbon atoms in the presence of the catalyst components for forming the contact product [I-1] in such a way that the amount of the prepolymer formed is 0.01 to 2,000 g based on 1 g of the solid titanium catalyst component (A);

[II-2] (C) the organosilicon compound represented by the formula (c-i); and optionally,

[III] the organometallic compound catalyst component, as described above.

When the contact product [I-2] is prepared by contacting the solid titanium catalyst component (A), the organometallic compound catalyst component (B) and the polyether compound (D), the organometallic compound catalyst component (B) is used in an amount of usually 0.1 to 100 mmol, preferably 0.5 to 50 mmol, based on 1 mol of titanium atom contained in the solid titanium catalyst component (A), and the polyether compound (D) is used in an amount of usually 0.1 to 50 mol, preferably 0.5 to 30 mol, more preferably 1 to 10 mol, based on 1 mol of the titanium atom.

There is no limitation on the order of contacting these components (A), (B) and (D).

The prepolymerized catalyst [1a-2] is prepared in the same manner as for the preparation of the prepolymerized catalyst [Ia-1] except that the polyether compound (D) is used in place of the organosilicon compound (C).

The same α-olefins of 2 or more carbon atoms as used for preparing the prepolymerized catalyst [1a-1] can be used for preparing the prepolymerized catalyst [1a-2]. Among those α-olefins, preferred are propylene, 1-butene, 1-pentene, 3-methyl-1-butene, 3-methyl-1-pentene, 3-ethyl-1-hexene, vinylcyclohexane, allyltrimethylsilane and dimethylstyrene, and of these, more preferred are propylene, 3-methyl-1-butene and vinylcyclohexane, allyltrimethylsilane. These α-olefins may be used in combination of two or more kinds.

This prepolymerization is desirably carried out in such a way that the amount of the prepolymer formed is 0.01 to 2,000 g, preferably 0.1 to 200 g, based on 1 g of the solid titanium catalyst component (A).

When the olefin polymerization catalyst (2) (or (2a)) is prepared from the contact product [I-2] (or prepolymerized catalyst [Ia-2]), the organosilicon compound (C) represented by the formula (c-i) (electron donor [II-2]) and, optionally, the organometallic compound catalyst component [III], the organosilicon compound (C) (electron donor [II-2]) is used in an amount of usually 0.001 to 5,000 mol, preferably 0.01 to 1,000 mol, based on 1 mol of titanium atom contained in the contact product [I-2] or the prepolymerized catalyst [Ia-2].

The organometallic compound catalyst component [III] is used, optionally, in an amount of 1 to 2,000 mol, preferably 2 to 1,000 mol, based on 1 mol of the titanium atom.

When the olefin polymerization catalyst is prepared from the contact product [I-2] (or prepolymerized catalyst [Ia-2]), the specific organosilicon compound (C) (electron donor [II-2]) and the organometallic compound catalyst component [III], other components useful for the catalyst formation may be used in combination with these components. For example, the aforesaid electron donors (a) and (b) can be used if desired.

By the use of the olefin polymerization catalyst (2) (or (2a)) of the invention which is formed from the contact product [I-2] (or the prepolymerized catalyst [Ia-2]) comprising the specific catalyst components and the specific organosilicon compound (C), there can be prepared a polypropylene having a higher isotacticity and a propylene block copolymer comprising a polypropylene component having a higher isotacticity and a rubber component having a higher molecular weight as compared with those obtained using conventionally known olefin polymerization catalysts.

Process for Preparing Homopolypropylene

In the first process for preparing homopolypropylene according to the invention, propylene is polymerized in the presence of the olefin polymerization catalyst (1) or (1a) to prepare homopolypropylene.

In the present invention, it is preferred to polymerize only propylene to prepare homopolypropylene, but propylene may be copolymerized with a small amount of an α-olefin other than propylene, with the proviso that the objects of the invention are not marred.

Examples of the other α-olefins copolymerizable with propylene include ethylene and α-olefins of 4 to 20 carbon atoms such as 1-butene, 1-pentene, 1-hexene, 1-octene, 1-decene, 1-dodecene, 1-tetradecene, 1-hexadecene, 1-octadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene and 3-ethyl-1-hexene.

Also employable are other olefins than α-olefins, such as those used for the prepolymerization, and diene compounds described later for preparing an ethylene/α-olefin copolymer component of the propylene block copolymer.

The olefin other than propylene is used in such an amount that the units derived therefrom are finally present in an amount of not more than 5% by mol, preferably not more than 4% by mol, in the resulting polypropylene.

In the present invention, the polymerization of propylene can be carried out in two or more steps under different reaction conditions.

The polymerization may be performed by a solvent suspension polymerization process, a suspension polymerization process using liquid propylene as a solvent, a gas phase polymerization process or the like.

In the solvent suspension polymerization process, a hydrocarbon which is polymerization-inactive can be used as a polymerization solvent. For example, hydrocarbons described with respect to the prepolymerization, particularly aliphatic hydrocarbons, can be employed.

In the polymerization system, the contact product [I-1] or the prepolymerized catalyst component [Ia-1] is used in an amount of usually about 0.0001 to 50 mmol, preferably about 0.001 to 10 mmol, in terms of titanium atom, based on 1 liter of the polymerization volume.

The electron donor [II-1] (polyether compound (D)) is used in an amount of usually 0.001 to 5,000 mol, preferably 0.01 to 1,000 mol, based on 1 mol of the titanium atom. The organometallic compound catalyst component [III] is used, optionally, in an amount of usually 1 to 2,000 mol, preferably 2 to 1,000 mol, based on 1 mol of the titanium atom in the polymerization system.

The polymerization of propylene is performed at a temperature of usually about −50 to 200° C., preferably about 50 to 100° C., and a pressure of usually atmospheric pressure to 100 kg/cm$^2$, preferably about 2 to 50 kg/cm.

The polymerization of propylene can be carried out either batchwise, semi-continuously or continuously.

In the polymerization of propylene, hydrogen (chain transfer agent) may be used to regulate a molecular weight of the resulting polypropylene. In this invention, it is desired to use hydrogen in an amount of not more than 0.5 mol, preferably not more than 0.4 mol, more preferably not more than 0.3 mol, based on 1 mol of propylene, although the amount varies depending on the molecular weight of the resulting polymer.

In the process for preparing homopolypropylene using the olefin polymerization catalyst (1) or (1a) according to the invention, homopolypropylene having a high melt flow rate and a high isotacticity can be prepared by the use of a small amount of hydrogen.

In the case where the aforesaid prepolymerized catalyst [Ia-1] is used in the process of the invention to prepare homopolypropylene, it is desired that the prepolymer formed by the prepolymerization is contained in the finally obtained homopolypropylene in an amount of 0.001 to 3% by weight, preferably 0.005 to 2% by weight.

In the second process for preparing homopolypropylene according to the invention, propylene is polymerized in the presence of the olefin polymerization catalyst (2) or (2a) to prepare homopolypropylene.

The second process for preparing homopolypropylene can be carried out in the same manner as that of the first process for preparing homopolypropylene except that the olefin polymerization catalyst (2) or (2a) is used.

In the polymerization system of the second process for preparing homopolypropylene, the contact product [I-2] or the prepolymerized catalyst component [Ia-2] is used in an amount of usually about 0.0001 to 50 mmol, preferably about 0.001 to 10 mmol, in terms of titanium atom, based on 1 liter of the polymerization volume.

The electron donor [II-2] (organosilicon compound (C)) is used in an amount of usually 0.001 to 5000 mol, preferably 0.01 to 1000 mol, based on 1 mol of the titanium atom. The organometallic compound catalyst component [III] is used, optionally, in an amount of usually 1 to 2,000 mol, preferably 2 to 1,000 mol, based on 1 mol of the titanium atom in the polymerization system.

In this invention, an yield of the homopolypropylene per unit amount of the solid titanium catalyst component (A) is high, so that the amount of the catalyst residue (particularly halogen content) in the resulting homopolypropylene can be relatively reduced. Accordingly, an operation for removing the catalyst residue contained in the product can be omitted, and moreover, a mold can be effectively prevented from occurrence of rust in the molding process of homopolypropylene.

Homopolypropylene

According to the processes of the invention, highly isotactic homopolypropylene can be obtained as described above.

Properties of the homopolypropylene obtained by the invention and a propylene block copolymer described later (hereinafter sometimes called generically "propylene polymer") are described with reference to their boiling heptane-insoluble component (i) and 23° C. n-decane-soluble component (ii). The boiling heptane-insoluble component (i) is mainly a crystalline portion of the propylene polymer, and the 23° C. n-decane-soluble component (ii) is mainly a non-crystalline or low-crystalline portion of the propylene polymer.

The amount of the boiling heptane-insoluble component (i) of the propylene polymer greatly depends on the amount of the 23° C. n-decane-soluble component (ii). The boiling heptane-insoluble component (i) is contained in a n-decane-insoluble component, that is a residue of the 23° C. n-decane-soluble component (ii), in an amount of usually not less than 80% by weight, preferably not less than 85% by weight, more preferably not less than 90% by weight, still more preferably not less than 93% by weight, particularly preferably not less than 94% by weight, though the amount thereof cannot be defined in general. The amount of the boiling heptane-insoluble component (i) is calculated on the assumption that the 23° C. n-decane-soluble component (ii) is soluble also in boiling heptane.

The boiling heptane-insoluble component (i) of the propylene polymer can be obtained in the following manner.

A 1-liter flask equipped with a stirrer is charged with 3 g of a polymer sample, 20 mg of 2,6-di-tert-butyl-4-methylphenol and 500 ml of n-decane, and heated at 145° C. in an oil bath to dissolve the polymer sample. After the polymer sample is dissolved, the resulting solution is cooled to room temperature over a period of about 8 hours, followed by keeping it for 8 hours in a water bath of 23° C. so as to precipitate a polymer. The resulting n-decane suspension containing the precipitated polymer (23° C. n-decane-insoluble component) is separated by filtration through a glass filter of G-4 (or G-2) and dried under reduced pressure. Then, 1.5 g of the polymer thus dried is extracted with heptane by Soxhlet extractor over a period of not shorter than 6 hours. Thus, a boiling heptane-insoluble component (i) is obtained as the extraction residue.

The homopolypropylene obtained by the invention contains such a boiling heptane-insoluble component (i) as mentioned above in an amount of not less than 80% by weight, preferably not less than 90% by weight, more preferably not less than 93% by weight, particularly preferably not less than 95% by weight.

This boiling heptane-insoluble component (i) essentially consists of units derived from propylene, but in some cases it contains a part of units derived from other olefins than propylene which are used in the preparation of homopolypropylene. The boiling heptane-insoluble component (i) of the homopolypropylene may contain the units derived from other olefin than propylene in an amount of not more than 5 % by mol, preferably not more than 4% by mol.

a pentad isotacticity $[M_g]$ of not less than 0.97, preferably 0.970 to 0.995, more preferably 0.980 to 0.995, particularly preferably 0.982 to 0.995.

A value of the pentad isotacticity $[M_g]$ of the boiling heptane-insoluble component (i) can be determined by the $^{13}$C-NMR spectrum and the following formula (1).

$$[M_5] = \frac{[Pmmmm]}{[Pw] - 2([S\alpha\gamma] + [S\alpha\delta^+]) + 3[T\delta^+\delta^+]} \quad (1)$$

wherein

[Pmmmm] is absorption intensity of methyl groups on a third propylene units in five propylene unit sequences where the five units are bonded isotactically to each other,

[Pw] is absorption intensity of all methyl groups in propylene units,

[Sαγ] is absorption intensity of secondary carbons in a main chain, with the proviso that one of two tertiary carbons nearest to each of said secondary carbons is situated at the α position and the other is situated at the γ position,

[Sαδ$^+$] is absorption intensity of secondary carbons in a main chain, with the proviso that one of two tertiary carbons nearest to each of said secondary carbons is situated at the α position and the other is situated at the δ or father position, and

[Tδ$^+$δ$^+$] is absorption intensity of tertiary carbons in a main chain, with the proviso that one of two tertiary carbons nearest to each of said tertiary carbons is situated at the δ or farther position and the other is also situated at the δ or farther position;

a pentad tacticity $[M_3]$ of the boiling heptane-insoluble component determined by the following formula (2) using a $^{13}$C-NMR spectrum is in the range of 0.0020 to 0.0050:

Details of the pentad isotacticity $[M_g]$ are described below.

When the boiling heptane-insoluble component (i) of the propylene polymer consists of only the propylene polymer units, it can be represented by the following structural formula (A).

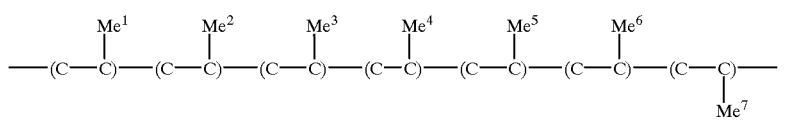

(A)

As described above, the crystalline portion of the homopolypropylene (propylene polymer) is evaluated by its boiling heptane-insoluble component (i), in other words, the crystalline portion can be evaluated by a pentad isotacticity $[M_g]$ and a pentad tacticity $[M_3]$ of the boiling heptane-insoluble component (i), details of which are described below.

(i-1) The boiling heptane-insoluble component (i) of the homopolypropylene obtained by the invention desirably has If a propylene unit

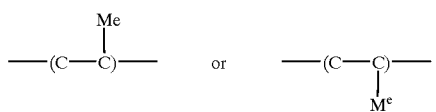

is symbolized by ⌋ or ⌉, ⌋ ⌉ is expressed by "m" (meso form), and ⌋ ⌉ is expressed by "r" (racemo form), five propylene isotactic unit sequences are expressed by ⌋m ⌋m ⌋m ⌋m ⌋. When absorption intensity, in a $^{13}$C-NMR spectrum, of methyl groups (e.g., $Me^3$, $Me^4$) on the third unit in the five propylene unit sequences where the five units are bonded isotacticaly to each other is expressed by [Pmmmm], and absorption intensity of the whole methyl groups (e.g., $Me^1$, $Me^2$, $Me^3$ . . . ) in the propylene units is expressed by [Pw], the stereoregularity of the boiling heptane-insoluble component (propylene polymer) represented by the above formula (A) can be evaluated by a value of the pentad isotacticity $[M_g]$ obtained from the following formula (1A):

$$[M_{5'}] = \frac{[Pmmmm]}{[Pw]} \tag{1A}$$

wherein [Pmmmm] and [Pw] have the meanings defined above.

Further, when the boiling heptane-insoluble component contains constituent units derived from other olefins than propylene, for example, ethylene units, in a small amount, said insoluble component can be expressed by the following formula (B-1) or (B-2). The formula (B-1) shows that one ethylene unit is contained in a propylene unit sequence, and the formula (B-2) shows that an ethylene unit chain composed of two or more ethylene units is contained in a propylene unit sequence.

ethylene unit and bonded to a tertiary carbon ($C^a$) in the propylene unit and absorption intensity (Sαγ) of a secondary carbon ($C^3$) which is in the propylene unit and bonded to the secondary carbon ($C^2$) in the ethylene unit are excluded.

In other words, the absorption intensity of other methyl groups ($Me^4$, $Me^5$, $Me^6$ and $Me^7$) than the methyl groups on the third propylene units in the five isotactic propylene unit sequences are excluded by subtracting, from Pw, a value of two times of absorption intensity (Sαγ) of a secondary carbon ($C^1$ or $C^3$) in the main chain wherein out of two tertiary carbons nearest to said secondary carbon, one ($C^a$ or $C^b$) is situated at the a position and the other ($C^b$ or $C^a$) is situated at the γ position.

When the stereoregularity of the boiling heptane-insoluble component represented by the formula (B-2) is evaluated, absorption intensity (Sαδ$^3$), in the $^{13}$C-NMR spectrum, of a secondary carbon ($C^4$) which is in the ethylene unit chain composed of two or more ethylene units and bonded to a tertiary carbon ($C_d$) in the propylene unit and absorption intensity (Sαδ$^+$) of a secondary carbon ($C^6$) which is in the propylene unit and bonded to a secondary carbon ($C^5$) in the ethylene unit chain composed of two or more ethylene units are excluded.

In other words, the absorption intensity of other methyl groups ($Me^4$, $Me^5$, $Me^6$ and $Me^7$) than the methyl groups in the third propylene unit in the five isotactic propylene unit sequences are excluded by subtracting, from Pw, two times value of the absorption intensity [Sαδ$^+$] of a secondary carbon ($C^4$ or $C^6$) in the main chain wherein out of two tertiary carbons nearest to said secondary carbon, one ($C^d$ or

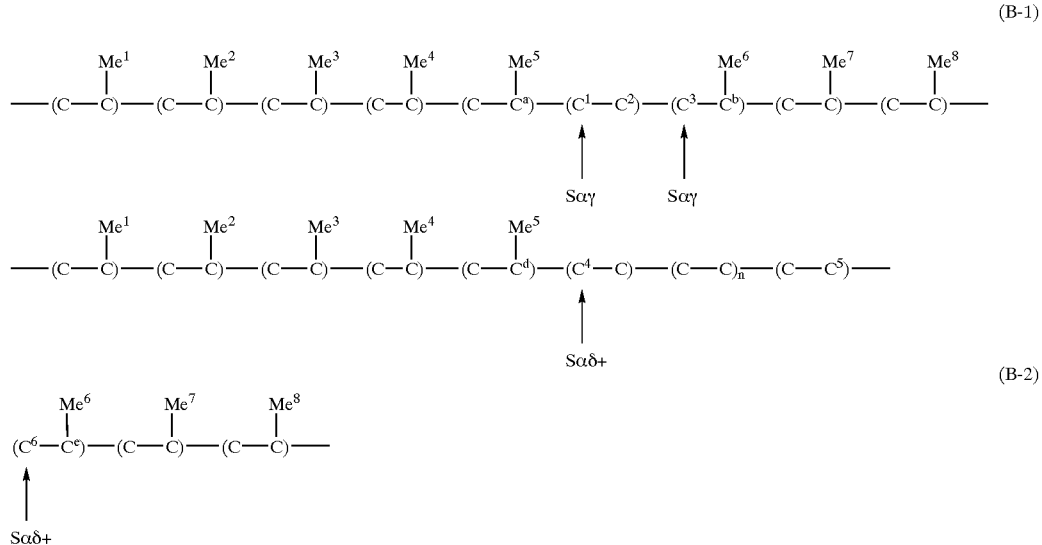

(n is 0 or a positive integer)

In the above cases, for measurement of the pentad isotacticity, the absorption intensity of other methyl groups ($Me^4$, $Me^5$, $Me^6$ and $Me^7$ in the formulas (B-1) and (B-2), respectively) than the methyl group on the third unit in the five isotactic propylene unit sequence should be theoretically excluded. However, absorption of these methyl groups are observed to be overlapped on absorption of other methyl groups, and hence it is difficult to quantitatively determine the absorption intensity of those methyl groups.

On that account, when the streoregularity of the boiling heptane-insoluble component represented by the formula (B-1) is evaluated, absorption intensity (Sαγ), in the $^{13}$C-NMR spectrum of a secondary carbon ($C^1$) which is in the $C^e$) is situated at the α position and the other ($C^e$ or $C^d$) is situated at the δ or farther position.

Accordingly, the stereoregularity of the boiling heptane-insoluble component represented by the above formula (B-1) or (B-2) can be evaluated by a value $[M_{5''}]$ obtained from the following formula (1B).

$$[M_{5''}] = \frac{[Pmmmm]}{[Pw] - 2([S\alpha\gamma] + [S\alpha\delta^+])} \tag{1B}$$

When the boiling heptane-insoluble component contains a small amount of ethylene units and the ethylene unit chain contains one propylene unit, this insoluble component can be represented by the following formula (C).

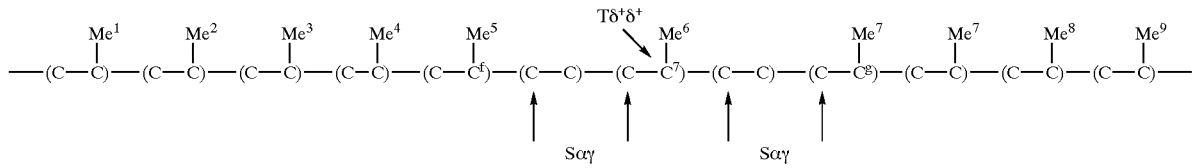

(C)

If the formula (lB) is applied to evaluation of the stereoregularity of the boiling heptane-insoluble component represented by the formula (C), a further correction should be made. The reason is that there are four methyl groups corresponding to Sαγ or Sαδ+ in spite that the number of the methyl groups to be excluded is five ($Me^4$, $Me^5$, $Me^6$, $Me^7$ and $Me^8$), and if the formula (1B) is applied, the number of the excluded methyl groups is larger by three than the number of methyl groups other than those on the third propylene units in the five propylene unit sequences.

Accordingly, a further correction is made by using absorption intensity, in the $^{13}$C-NMR spectrum, of a tertiary carbon in the propylene unit contained in the ethylene unit chain. In other words, the correction is made by adding, to Pw, a value of three times of absorption intensity [Tδ+δ+] of a tertiary carbon ($C^7$) in the main chain wherein out of two tertiary carbons ($C^f$, $C^g$) nearest to said tertiary carbon, one ($C^f$) is situated at the δ or farther position and the other ($C^g$) is also situated at the δ or farther position.

Thus, the stereoregularity of the boiled heptane-insoluble component can be evaluated by a value of the pentad isotacticity [$M_g$] obtained from the above formula (1).

Accordingly, the stereoregularity of the boiled heptane-insoluble component in the propylene block copolymer of the invention can be evaluated by a value of the pentad isotacticity [$M_g$] obtained from the following formula (1A).

The formula (1A) and the formula (1B) are included in the formula (1A), and they can be said to be special cases of the formula (1A). Further, if the boiling heptane-insoluble component contains units other than prpylene units, the correction as mentioned obove may be unnecessary depending on the kind of the other units.

(i-2) The boiling heptan-insoluble component of the homopolypropylene obtained by the invention desirably has a pentad tacticity [$M^3$] obtained from the following formula (2) using absorption intensity in a $^{13}$C-NMR spectrum of 0.0020 to 0.0050, preferably 0.0023 to 0.0045, more preferably 0.0025 to 0.0040.

$$[M_3] = \frac{[Pmmrm] + [Pmrmr] + [Pmrrr] + [Prmrr] + [Prmmr] + [Prrrr]}{[Pw] - 2([S\alpha\gamma] + [S\alpha\delta^+]) + 3[T\delta^+\delta^+]} \quad (2)$$

wherein
  [Pw], [Sαγ], Sα[α+] and [Tδ+δ+] have the meanings as defined in the formula (1),
  [Pmmrm] is absorption intensity of methyl groups on third propylene units in five propylene unit sequences represented by ] ] ] ] ] in which ] and ] are each a propylene unit,
  [Pmrmr] is absorption intensity of methyl groups on third propylene units in five propylene unit sequences represented by ] ] ] ] ] in which ] and ] are each a propylene unit,
  [Pmrrr] is absorption intensity of methyl groups on third propylene units in five propylene unit sequences represented by ] ] ] ] ] in which ] and ] are each a propylene unit,
  [Prmrr] is absorption intensity of methyl groups on third propylene units in five propylene unit sequences represented by ] ] ] ] ] in which ] and ] are each a propylene unit,
  [Prmmr] is absorption intensity of methyl groups on third propylene units in five propylene unit sequences represented by ] ] ] ] ] in which ] and ] are each a propylene unit, and
  [Prrrr] is absorption intensity of methyl groups on third propylene units in five propylene unit sequences represented by ] ] ] ] ] in which ] and ] are each a propylene unit.

In the formula (2), each of [Pmmrm], [Pmrmr], [Pmrrr], [Prmrr], [Prmmr] and [Prrrr] shows absorption intensity of the methyl group on third propylene unit in each of five propylene unit sequences which has such a structure that three out of five methyl groups in the five propylene unit sequence are the same in the direction and the residual two are different in the direction (such structures are referred to as "$M_3$ structure" hereinafter). That is, the value of the pentad tacticity [$M_3$] obtained from the formula (2) exhibits a proportion of the $M_3$ structure in the propylene unit sequences.

When the boiling heptane-insoluble component of the propylene polymer consists of only the propylene polymer units, the stereoregurality thereof can be evaluated by a value of the pentad tacticity [M3'] obtained from the following formula (2A):

$$[M_{3'}] = \frac{[Pmmrm] + [Pmrmr] + [Pmrrr] + [Prmrr] + [Prmmr] + [Prrrr]}{[Pw]} \quad (2A)$$

wherein [Pmmrm], [Pmrmr], [Pmrrr], [Prmrr], [Prmmr], [Prrrr] and [Pw] have the meanings as defined in the formula (2).

The pentad isotacticity [$M_5$] and the pentad tacticity [$M_3$] of such propylene polymer are described in more detail below.

As described above, the boiling heptane-insoluble component of the homopolypropylene obtained by the invention desirably has the pentad isotacticity ($M_5$) obtained from the formula (1) of not less than 0.974, and the pentad tacticity [$M_3$] obtained from the formula (2) of 0.0020 to 0.0050.

Such boiling heptane-insoluble component has an extremely long mesochain (i.e., propylene unit sequence in which directions of α-methyl carbons are the same as each other).

In general, polypropylene has a longer mesochain, as the value of the pentad tacticity [$M_3$] is smaller. However, when the value of the pentad isotacticity [$M_5$] is extremely large and the value of the pentad tacticity [$M_3$] is extremely small, polypropylene having a larger value of the pentad tacticity

[$M_3$] may have a longer mesochain with the proviso that the value of the pentad isotacticity [$M_5$] is almost the same.

For example, when a polypropylene having the following structure (a) is compared with a polypropylene having the following structure (b), the polypropylene represented by the structure (a) has the $M_3$ structure and a longer mesochain than the polypropylene represented by the structure (b) not having the $M_3$ structure. (In this example, it is presumed that each of the structures (a) and (b) is composed of 1,003 propylene units.)

into a NMR tube having an inner diameter of 10 mm, followed by measuring the $^{13}$C-NMR spectrum at 120° C. by the use of an NMR measuring apparatus (GX-500 type) produced by Japan Electron Optics Laboratory Co., Ltd. The number of integration times is 10,000 or more.

(i-3) The boiling heptane-insoluble component of the homopolypropylene obtained by the invention has a crystallinity, as measured by X-ray diffractometry, of usually not less than 60%, preferably not less than 65%, more preferably 65 to 95%, particularly preferably 65 to 90%.

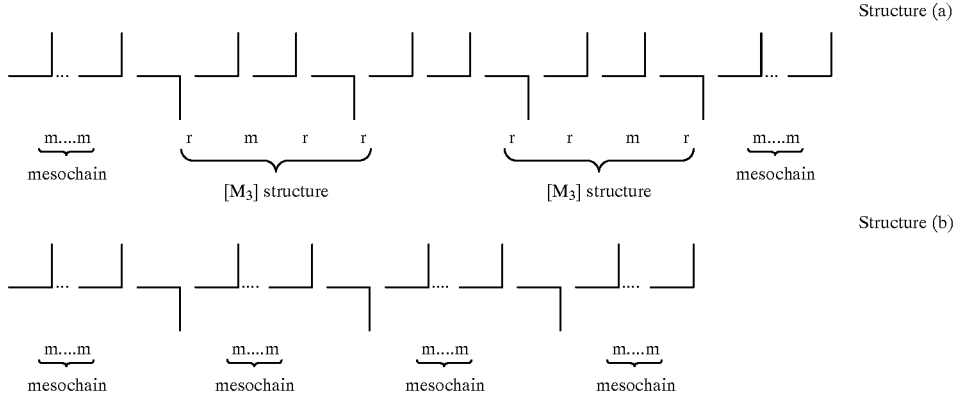

The pentad isotacticity [$M_5$] of the polypropylene represented by the structure (a) is 0.986, and the pentad isotacticity [$M_g$] of the polypropylene represented by the structure (b) is 0.985, both values being almost the same. However, in the polypropylene represented by the structure (a) having the $M_3$ structure, the mesochains contain 497 propylene units on an average, while in the polypropylene represented by the structure (b) not having the $M_3$ structure, the mesochains contain 250 propylene units on an average. That is, in the polypropylene having an extremely large value of the pentad isotacticity [$M_g$] a proportion of the structure represented by "r" (racemo) contained in the propylene unit sequence is extremely small. Hence, such polypropylene containing a large number of structures "r" (racemo), i.e., polypropylene having the $M_3$ structure, has longer mesochains as compared with the polypropylene containing only few structures "r" (racemo), i.e., polypropylene not having the $M_3$ structures.

The propylene polymer of the invention is a highly crystalline polypropylene having the $M_3$ structures as represented by the above structure (a), and in this polymer, the pentad isotacticity [$M_g$] of the boiling heptane-insoluble component is in the range of 0.97 to 0.995, and the pentad tactically [$M_3$] of the boiling heptane-insoluble component is in the range of 0.0020 to 0.0050. Such propylene polymer of the invention has higher rigidity, heat resistance and moisture resistance than those of the conventional highly crystalline polypropylenes.

If the pentad tacticity [$M_3$] of the boiling heptane-insoluble component is out of the range of 0.0020 to 0.0050, the propylene polymer may be deteriorated in the rigidity and the heat resistance.

In the present invention, the $^{13}$C-NMR measurement of the boiling heptane-insoluble component is carried out, for example, in the following manner. That is, 0.35 g of the insoluble component is dissolved in 2.0 ml of hexachlorobutadiene, and the resulting solution is filtered through a glass filter (G2). To the filtrate is added 0.5 ml of deuterated benzene, and the resulting mixture is introduced The X-ray diffractometry is carried out as follows. A sample (of the boiling heptane-insoluble component) is molded into a square plate having a thickness of 1 mm by the use of a pressure molding machine of 180° C., and immediately the plate is water cooled to obtain a pressed sheet. The pressed sheet is measured on its crystallinity by the use of a Rotor Flex RU300 measuring machine produced by Rigaku Denki K.K. (output: 50 kV, 250 mA). In this measurement, a transmission method is utilized, and the measurement is conducted with rotating the sample.

As described above, the homopolypropylene obtained by the invention desirably contains the highly isotactic boiling heptane-insoluble component (i) having the above-mentioned properties.

(ii) The amount of the 23° C. n-decane-soluble component contained in the homopolypropylene obtained by the invention is desired to be not more than 5% by weight.

The homopolypropylene obtained by the invention desirably has a melt flow rate (MFR), as measured in accordance with ASTM D-1238 at 230° C. under a load of 2.16 kg, of 0.001 to 1,000 g/10 min, preferably 0.01 to 500 g/10 min, more preferably 0.05 to 300 g/10 min, particularly preferably 0.08 to 200 g/10 min.

The homopolypropylene desirably has an intrinsic viscosity [η], as measured in decahydronaphthalene at 135° C., of 0.1 to 20 dl/g, preferably 0.5 to 15 dl/g, more preferably 0.7 to 12 dl/g.

The homopolypropylene obtained by the invention may be used, if desired, in combination with various additives such as nucleating agent, rubber ingredient, heat stabilizer, weathering stabilizer, antistatic agent, anti-slip agent, anti-blocking agent, anti-fogging agent, lubricant, dye, pigment, natural oil, synthetic oil, wax and filler.

Process for Preparing Propylene Block Copolymer

The first process for preparing a propylene block copolymer according to the invention comprises the steps of polymerizing propylene to form a polypropylene component and copolymerizing ethylene and an α-olefin of 3 to 20 carbon atoms to form an ethylene/α-olefin copolymer component, in an optional order, wherein both of the polymerizing and copolymerizing steps are carried out in the presence of the olefin polymerization catalyst (1) formed from:

[I-1] the contact product obtained by contacting:
(A) the solid titanium catalyst component,
(B) the organometallic compound catalyst component, and
(C) the organosilicon compound;

[II-1](D) the compound having at least two ether linkages present through plural atoms; and optionally,

[III] the organometallic compound catalyst component, as described above.

In the first process for preparing a propylene block copolymer according to the invention, in place of the olefin polymerization catalyst (1), there can be used the olefin polymerization catalyst (1a) formed from:

[Ia-1] the prepolymerized catalyst component obtained by prepolymerizing an olefin of 2 or more carbon atoms in the presence of the catalyst components for forming the contact product [I-1] in such a way that the amount of the prepolymer formed is 0.01 to 2,000 g based on 1 g of the solid titanium catalyst component (A);

[II-1] (D) the compound having at least two ether linkages present through plural atoms; and optionally,

[III] the organometallic compound catalyst component.

In the first process for preparing a propylene block copolymer according to the invention, a propylene block copolymer having properties as described later can be prepared.

An example of the process for preparing a propylene block copolymer according to the invention is a process comprising initially polymerizing propylene to form a polypropylene component and then copolymerizing ethylene and an α-olefin of 3 to 20 carbon atoms to form an ethylene/α-olefin copolymer component, in the presence of the olefin polymerization catalyst.

Another example thereof is a process comprising initially copolymerizing ethylene and an α-olefin of 3 to 20 carbon atoms to form an ethylene/α-olefin copolymer component and then polymerizing propylene to form a polypropylene component, in the presence of the olefin polymerization catalyst.

In this invention, preferred is the process comprising initially forming a polypropylene component and then forming an ethylene/α-olefin copolymer component, and this process will be mainly described hereinafter.

Preparation of Polypropylene Component

In the process for preparing a propylene block copolymer according to the invention, propylene is polymerized in the presence of the olefin polymerization catalyst (1) or (1a) to prepare polypropylene component.

In the present invention, it is preferred to polymerize only propylene in the preparation of polypropylene component, but propylene may be copolymerized with a small amount of other α-olefin than propylene, with the proviso that the objects of the invention are not marred.

Examples of the other α-olefins copolymerizable with propylene include ethylene and α-olefins of 4 to 20 carbon atoms such as 1-butene, 1-pentene, 1-hexene, 1-octene, 1-decene, 1-dodecene, 1-tetradecene, 1-hexadecene, 1-octadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene and 3-ethyl-1-hexene.

Also employable are other olefins than α-olefins, such as those used for the prepolymerization, and diene compounds described later for preparing an ethylene/α-olefin copolymer component of the propylene block copolymer.

The olefin other than propylene is used in such an amount that the units derived therefrom are finally present in an amount of not more than 5% by mol, preferably not more than 4% by mol, in the resulting polypropylene.

In the present invention, the polymerization of propylene can be carried out in two or more steps under different reaction conditions.

The polymerization may be performed by a solvent suspension polymerization process, a suspension polymerization process using liquid propylene as a solvent, a gas phase polymerization process or the like.

In the solvent suspension polymerization process, a hydrocarbon which is polymerization-inactive can be used as a polymerization solvent. For example, hydrocarbons described with respect to the prepolymerization, particularly aliphatic hydrocarbons, can be employed.

In the polymerization system, the contact product [I-1] or the prepolymerized catalyst component [Ia-1] is used in an amount of usually about 0.0001 to 50 mmol, preferably about 0.001 to 10 mmol, in terms of titanium atom, based on 1 liter of the polymerization volume. The electron donor [II-1] (polyether compound (D)) is used in an amount of usually 0.001 to 5,000 mol, preferably 0.01 to 1,000 mol, based on 1 mol of the titanium atom. The organometallic compound catalyst component [III] is used, optionally, in an amount of usually 1 to 2;000 mol, preferably 2 to 1,000 mol, based on 1 mol of the titanium atom in the polymerization system.

The polymerization of propylene may be carried out at a temperature of usually about −50 to 200° C., preferably about 50 to 100° C., and a pressure of usually atmospheric pressure to 100 kg/cm$^2$, preferably about 2 to 50 kg/cm.

The polymerization of propylene can be carried out either batchwise, semi-continuously or continuously.

In the polymerization of propylene, hydrogen (chain transfer agent) may be used to regulate a molecular weight of the resulting polypropylene. In this invention, it is desired to use hydrogen in an amount of not more than 0.5 mol, preferably not more than 0.4 mol, more preferably not more than 0.3 mol, based on 1 mol of propylene, although the amount varies depending on the molecular weight of the resulting polymer.

In the process for preparing polypropylene component using the olefin polymerization catalyst (1) or (1a) according to the invention, polypropylene component having a high melt flow rate and a high isotacticity can be prepared by the use of a small amount of hydrogen.

The polypropylene component obtained desirably has a melt flow rate (MFR), as measured in accordance with ASTM D-1238 at 230° C. under a load of 2.16 kg, of 0.001 to 1,000 g/10 min, preferably 0.01 to 500 g/10 min, more preferably 0.08 to 200 g/10 min.

The polypropylene component desirably has an intrinsic viscosity [η], as measured in decahydronaphthalene at 135° C., of 0.1 to 20 dl/g, preferably 0.5 to 15 dl/g, more preferably 0.7 to 12 dl/g.

The polypropylene component desirably contains the 23° C. n-decane-soluble component in an amount of usually not more than 5% by weight, preferably not more than 3% by weight, more preferably not more than 2% by weight, particularly preferably not more than 1.5% by weight.

Preparation of Ethylene/α-olefin Copolymer Component

In the present invention, after preparing the polypropylene component as described above, ethylene and an α-olefin of 3 to 20 carbon atoms are copolymerized in the presence of the polypropylene component obtained and without deactivation of the catalyst used for preparing the polypropylene component, to prepare an ethylene/α-olefin copolymer component.

Examples of the α-olefins of 3 to 20 carbon atoms copolymerizable with ethylene include propylene, 1-butene, 1-pentene, 1-hexene, 1-octene, 1-decene, 1-dodecene, 1-tetradecene, 1-hexadecene, 1-octadecene, 1-eicosene, 3-methyl-1-butene, 3-methyl-1-pentene, 3-ethyl-1-pentene, 4-methyl-1-pentene, 4-methyl-1-hexene, 4,4-diemthyl-1-hexene, 4,4-dimethyl-1-pentene, 4-ethyl-1-hexene and 3-ethyl-1-hexene.

Preferred as the α-olefins copolymerizable with ethylene are propylene, 1-butene and 1-pentene. These α-olefins may be used in combination of two or more kinds.

In this copolymerization, in addition to the above α-olefins, the olefins which are described before with respect to the prepolymerization and diene compounds can be employed.

Examples of the diene compounds include 1,3-butadiene, 1,3-pentadiene, 1,4-pentadiene, 1,3-hexadiene, 1,4-hexadiene, 1,5-hexadiene, 4-methyl-1,4-hexadiene, 5-methyl-1,4-hexadiene, 6-methyl-1,6-octadiene, 7 methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-decadiene, 1,7-octadiene, 1,9-decadiene, isoprene, butadiene, ethylidenenorbornene, vinylnorbornene and dicyclopentadiene. These diene compounds may be used in combination of two or more kinds.

In the copolymerization system, the polypropylene component is used in an amount of 10 to 1,000 g, preferably 10 to 800 g, particularly preferably 30 to 500 g, based on 1 liter of the polymerization volume. This polypropylene is desirably present in the system in an amount of usually 0.0001 to 1 mmol, preferably about 0.001 to 0.5 mmol, in terms of titanium atom of the solid titanium catalyst component (A) contained in the polypropylene, based on 1 liter of the polymerization volume.

After the propylene component is prepared as described above, in the copolymerising ethylene and the α-olefin of 3 to 20 carbon atoms, the catalyst components may be further added to the copolymerization system.

For example, in the first process for preparing a propylene block copolymer, the solid titanium catalyst component (A), the electron donor [II-1] (polyether compound (D)) and the organometallic compound catalyst component [III] can be added. In this case, the solid titanium catalyst component (A) can be used in an amount of 0.0001 to 20 mmol, preferably 0.001 to 20 mmol, based on 1 liter of the polymerization volume. The electron donor [II-1] can be used in an amount of 0.001 to 5,000 mol, preferably 0.01 to 1,000 mol, based on 1 mol of the titanium atom in the polymerization system. The organometallic compound catalyst component [III] can be used in an amount of 1 to 2,000 mol, preferably about 2 to 1,000 mol, based on 1 mol of the titanium atom in the polymerization system.

The copolymerization of ethylene and the α-olefin can be carried out in a gas phase or a liquid phase.

In the case where the copolymerization is performed by a solvent suspension polymerization process, the aforesaid inert hydrocarbon can be used as a polymerization solvent.

In the copolymerization, hydrogen (chain transfer agent) can be added, if desired, to regulate the molecular weight of the resulting copolymer.

The copolymerization can be carried out at a temperature of usually about −50 to 200° C., preferably about 20 to 100° C., and a pressure of usually atmospheric pressure to 100 kg/cm$^2$, preferably about 2 to 50 kg/cm$^2$.

The copolymerization may be carried out either batchwise, semi-continuously or continuously. Further, the copolymerization can be conducted in two or more stages under different reaction conditions.

In the ethylene/α-olefin copolymerization step described above, an ethylene/α-olefin copolymer component having a high molecular weight can be easily obtained.

According to the first process for preparing a propylene block copolymer as mentioned above, a propylene block copolymer containing a highly isotactic polypropylene component and containing a rubber component of high molecular weight (high intrinsic viscosity [η]) can be easily prepared.

Next, the second to fifth processes for preparing a propylene block copolymer using a specific olefin polymerization catalyst are described. Properties of the propylene block copolymer which can be obtained by these processes are described later.

The solid titanium catalyst component (A), the organometallic compound catalyst component (B) (or (III)), the organosilicon compound (C) represented by the formula (c-i), and the compound (D) having at least two ether linkages spaced by plural atoms (polyether compound)(D), and the organosilicon compound (E) represented by the formula (c-iii) are the same as those used for preparing the olefin polymerization catalyst (1).

The second process for preparing a propylene block copolymer according to the invention comprises the steps of polymerizing propylene to form a polypropylene component and copolymerizing ethylene and an α-olefin of 3 to 20 carbon atoms to form an ethylene/α-olefin copolymer component, in an optional order, wherein both of the polymerization and copolymerization steps are carried out in the presence of an olefin polymerization catalyst (2) formed from:

[I-2] a contact product obtained by contacting:
    (A) the solid titanium catalyst component,
    (B) the organometallic compound catalyst component, and
    (D) the compound having at least two ether linkages spaced by plural atoms;

[II-2] (C) the organosilicon compound represented by the formula (c-i); and optionally,

[III] the organometallic compound catalyst component.

Through this process, a specific propylene block copolymer described later is prepared.

In the second process for preparing a propylene block copolymer according to the invention, in place of the olefin polymerization catalyst (2), there can be used an olefin polymerization catalyst (2a) formed from:

[Ia-2] a prepolymerized catalyst component obtained by prepolymerizing an olefin of 2 or more carbon atoms in the presence of the catalyst components for forming the contact product [I-1] in such a way that the amount of the prepolymer formed is 0.01 to 2,000 g based on 1 g of the solid titanium catalyst component (A);

[II-2] (C) the organosilicon compound represented by the formula (c-i); and optionally,

[III] the organometallic compound catalyst component.

In the propylene polymerization step of the second process for preparing a propylene block copolymer, the contact product [I-2] or the prepolymerized catalyst component [Ia-2] is used in an amount of usually about 0.0001 to 50 mmol, preferably about 0.001 to 10 mmol, in terms of titanium atom, based on 1 liter of the polymerization volume.

The electron donor [II-2] (organosilicon compound (C)) is used in an amount of usually 0.001 to 5,000 mol, preferably 0.01 to 1,000 mol, based on 1 mol of the titanium atom. The organometallic compound catalyst component [III] is used, optionally, in an amount of usually 1 to 2,000 mol, preferably 2 to 1,000 mol, based on 1 mol of the titanium atom in the polymerization system.

In this propylene polymerization step, the same copolymerizable monomers as used for the first process for preparing a propylene block copolymer can be employed. The polymerization conditions such as a temperature, a pressure and a procedure may be the same as those for the first process for preparing a propylene block copolymer.

If propylene is polymerized in the presence of the olefin polymerization catalyst (2) or (2a), a highly isotactic polypropylene component can be prepared. Moreover, molecular weight regulation by means of hydrogen can be easily made, and hence a polypropylene component having a high melt flow rate can be prepared by the use of a small amount of hydrogen.

The polypropylene component prepared in the propylene polymerization step has the same properties (MRF, intrinsic viscosity $[\eta]$, 23° C. n-decane-soluble component, etc.) as those of the polypropylene component prepared in the first process for preparing a propylene block copolymer.

In the ethylene/α-olefin copolymerization step, the polypropylene component is used in an amount of 10 to 1,000 g, preferably 10 to 800 g, particularly preferably 30 to 500 g, based on 1 liter of the polymerization volume. This polypropylene is desirably present in an amount of usually 0.0001 to 1 mmol, preferably about 0.001 to 0.5 mmol, in terms of titanium atom of the solid titanium catalyst component (A) contained in the polypropylene, based on 1 liter of the polymerization volume.

To the ethylene/α-olefin copolymerization system, the solid titanium catalyst component (A), the electron donor [II-2] (organosilicon compound (C)) and the organometallic compound catalyst component [III] can be further added. In this case, the solid titanium catalyst component (A) can be used in an amount of 0.0001 to 20 mmol, preferably 0.001 to 20 mmol, based on 1 liter of the polymerization volume. The electron donor [II-2] can be used in an amount of 0.001 to 5,000 mol, preferably 0.01 to 1,000 mol, based on 1 mol of the titanium atom in the polymerization system. The organometallic compound catalyst component [III] can be used in an amount of 1 to 2,000 mol, preferably about 2 to 1,000 mol, based on 1 mol of the titanium atom in the polymerization system.

In the ethylene/α-olefin copolymerization step described above, an ethylene/α-olefin copolymer component having a high molecular weight can be easily obtained.

According to the second process for preparing a propylene block copolymer as mentioned above, a propylene block copolymer containing a highly isotactic polypropylene component and containing a rubber component of high molecular weight (high intrinsic viscosity $[\eta]$) can be easily prepared.

The third process for preparing a propylene block copolymer according to the invention comprises the steps of polymerizing propylene to form a polypropylene component and copolymerizing ethylene and an α-olefin of 3 to 20 carbon atoms to form an ethylene/α-olefin copolymer component, in an optional order, wherein both of the polymerization and copolymerization steps are carried out in the presence of an olefin polymerization catalyst (3) formed from:

[I-3] a contact product obtained by contacting:
(A) the solid titanium catalyst component,
(B) the organometallic compound catalyst component, and
(D) the compound having at least two ether linkages present through plural atoms;

[II-3] (D) the compound having at least two ether linkages present through plural atoms; and optionally,

[III] the organometallic compound catalyst component.

Through this process, a specific propylene block copolymer described later is prepared.

In the third process for preparing a propylene block copolymer according to the invention, in place of the olefin polymerization catalyst (3), there can be used an olefin polymerization catalyst (3a) formed from:

[Ia-3] a prepolymerized catalyst obtained by prepolymerizing an olefin of 2 or more carbon atoms in the presence of the catalyst components for forming the contact product [I-3] in such a way that the amount of the prepoymer formed is 0.01 to 2,000 g based on 1 g of the solid titanium catalyst component (A);

[II-3] (D) the compound having at least two ether linkages present through plural atoms; and optionally,

[III] the organometallic compound catalyst component.

This prepolymerized catalyst component [Ia-3] for forming the olefin polymerization catalyst (3a) is the same as the prepolymerized catalyst component [Ia-2] for forming the olefin polymerization catalyst (2a).

When the prepolymerized catalyst or the olefin polymerization catalyst for use in the third process for preparing a propylene block copolymer is formed from the above components, other components useful for the catalyst formation may be used. For example, the electron donors (a) and (b) described before with respect to the preparation of the olefin polymerization catalyst (1) can be used.

In the propylene polymerization step of the third process for preparing a propylene block copolymer, the contact product [I-3] or the prepolymerized catalyst component [Ia-3] is used in an amount of usually about 0.0001 to 50 mmol, preferably about 0.001 to 10 mmol, in terms of titanium atom, based on 1 liter of the polymerization volume. The electron donor [II-3] (polyether compound (D)) is used in an amount of usually 0.001 to 5,000 mol, preferably 0.01 to 1,000 mol, based on 1 mol of the titanium atom. The organometallic compound catalyst component [III] is used, optionally, in an amount of usually 1 to 2,000 mol, preferably 2 to 1,000 mol, based on 1 mol of the titanium atom in the polymerization system.

In this propylene polymerization step, the same copolymerizable monomers as used for the first process for preparing a propylene block copolymer can be employed. The polymerization conditions such as a temperature, a pressure and a procedure may be the same as those for the first process for preparing a propylene block copolymer.

If propylene is polymerized in the presence of the olefin polymerization catalyst (3) or (3a), a highly isotactic polypropylene component can be prepared. Moreover, molecular weight regulation by means of hydrogen can be easily made, and hence a polypropylene component having a high melt flow rate can be prepared by the use of a small amount of hydrogen.

The polypropylene component prepared in this propylene polymerization step has the same properties as those of the polypropylene component prepared in the first process for preparing a propylene block copolymer.

In the ethylene/α-olefin copolymerization step, the polypropylene component is used in an amount of 10 to 1,000 g, preferably 10 to 800 g, particularly preferably 30 to 500 g, based on 1 liter of the polymerization volume. This polypropylene is desirably present in an amount of usually 0.0001 to 1 mmol, preferably about 0.001 to 0.5 mmol, in terms of titanium atom of the solid titanium catalyst component (A) contained in the polypropylene, based on 1 liter of the polymerization volume.

To the ethylene/α-olefin copolymerization system, the solid titanium catalyst component (A), the electron donor [II-3] (polyether compound (D)) and the organometallic compound catalyst component [III] can be further added. In this case, the solid titanium catalyst component (A) can be used in an amount of 0.0001 to 20 mmol, preferably 0.001 to 20 mmol, based on 1 liter of the polymerization volume. The electron donor [II-3] (polyether compound (D)) can be used in an amount of 0.001 to 2,000 mol, preferably 0.01 to 1,000 mol, based on 1 mol of the titanium atom in the polymerization system. The organometallic compound catalyst component [III] can be used in an amount of 1 to 2,000 mol, preferably about 2 to 1,000 mol, based on 1 mol of the titanium atom in the polymerization system.

In the ethylene/α-olefin copolymerization step described above, an ethylene/α-olefin copolymer component having a high molecular weight can be easily obtained.

According to the third process for preparing a propylene block copolymer as mentioned above, a propylene block copolymer containing a highly isotactic polypropylene component and containing a rubber component of high molecular weight (high intrinsic viscosity [η]) can be easily prepared.

The fourth process for preparing a propylene block copolymer according to the invention comprises the steps of polymerizing propylene to form a polypropylene component and copolymerizing ethylene and an α-olefin of 3 to 20 carbon atoms to form an ethylene/α-olefin copolymer component, in an optional order, wherein both of the polymerization and copolymerization steps are caarried out in the presence of an olefin polymerization catalyst (4) formed from:

[I-4] (A-2) a solid titanium catalyst component comprising magnesium, titanium, halogen and (D) a compound having at least two ether linkages spaced by plural atoms;

[II-4] (C) the organosilicon compound represented by the formula (c-i) and/or (D) the compound having at least two ether linkages spaced by plural atoms; and

[III] the organometallic compound catalyst component.

Through this process, a specific propylene block copolymer described later is prepared.

In the fourth process for preparing a propylene block copolymer according to the invention, in place of the olefin polymerization catalyst (4), there can be used an olefin polymerization catalyst (4a) formed from:

[Ia-4] a prepolymerized catalyst component obtained by prepolymerizing an olefin of 2 or more carbon atoms in the presence of the solid titanium catalyst component (A-2) and the organometallic compound catalyst component (B) in such a way that the amount of the prepolymer formed is 0.01 to 2,000 g based on 1 g of the solid titanium catalyst component (A-2);

[II-4] (C) the organosilicon compound represented by the formula (c-i) and/or (D) the compound having at least two ether linkages spaced by plural atoms; and optionally,

[III] the organometallic compound catalyst component.

The solid titanium catalyst component (A-2) used for preparing the olefin polymerization catalyst (4) or (4a) can be prepared in the same manner as described in the preparation of the solid titanium catalyst component (A) except that the polyether compound (D) (electron donor) is used as the essential component. In more detail, the solid titanium catalyst component (A-2) can be prepared by bringing the magnesium compound, the titanium compound (both described before with respect to the preparation of the solid titanium catalyst component (A)) and the polyether compound (D) into contact with each other. In the preparation of the solid titanium catalyst component (A-2), other compounds than the polyether compound (D) among the compounds exemplified as the electron donor (a) can be used in combination with the polyether compound(D).

The amount of each of the components used for forming the solid titanium catalyst component (A-2) varies depending on the process used, and cannot be defined in general. However, for example, the polyether compound (D) is used in an amount of 0.01 to 5 mol, preferably 0.1 to 1 mol, based on 1 mol of the magnesium compound, and other electron donor is used, if desired, in an amount of 0.01 to 1,000 mol, preferably 0.1 to 200 mol, based on 1 mol of the magnesium compound.

The solid titanium catalyst component (A-2) contains magnesium, titanium, halogen and the polyether compound (D), and in this solid titanium catalyst component (A-2), an atomic ratio of halogen/titanium is in the range of about 2 to 200, preferably about 4 to 100; a molar ratio of the polyether compound (D)/titanium is in the range of about 0.01 to 100, preferably about 0.2 to 10; and an atomic ratio of magnesium/titanium is in the range of about 1 to 100, preferably about 2 to 50.

The prepolymerized catalyst component [Ia-4] can be prepared in the same manner as described in the preparation of the prepolymerized catalyst [Ia-1] except that the organosilicon compound (C) is not used.

In the preparation of the prepolymerized catalyst [Ia-4], the solid titanium catalyst component (A-2) is used in an amount of usually about 0.0001 to 200 mmol, preferably about 0.001 to 100 mmol, in terms of titanium atom, based on 1 liter of the polymerization volume. The organometallic compound catalyst component (B) is used in an amount of usually 0.01 to 100 mol, preferably 0.5 to 50 mol, based on 1 mol of the titanium atom.

The same olefins of 2 or more carbon atoms as used for preparing the prepolymerized catalyst [Ia-1] can be used for preparing the prepolymerized catalyst [Ia-4]. Among those olefins, preferred are ethylene, propylene, 1-butene, 1-pentene, 3-methyl-1-butene, 3-methyl-1-pentene, 3-ethyl-1-hexene, vinylcyclohexane, allyltrimethylsilane and dimethylstyrene, and of these, more preferred are propylene, 3-methyl-1-butene, vinylcyclohexane and allyltrimethylsilane. These olefins may be used in combination of two or more kinds.

The prepolymerization is desirably carried out in such a manner that a prepolymer is produced in an amount of 0.01 to 2,000 g, preferably 0.1 to 200 g, based on 1 g of the solid titanium catalyst component (A-2).

When the prepolymerized catalyst or the olefin polymerization catalyst for use in the fourth process for preparing a propylene block copolymer is formed from the above components, other components useful for the catalyst formation may be used in combination with the above components. For example, the electron donors (a) and (b) described before with respect to the preparation of the olefin polymerization catalyst (1) can be used, if desired.

In the propylene polymerization step using the olefin polymerization catalyst (4), the solid titanium catalyst component (A-2) ([I-4]) is used in an amount of usually about 0.0001 to 50 mmol, preferably about 0.001 to 10 mmol, in terms of titanium atom, based on 1 liter of the polymerization volume. The electron donor [II-4] (organosilicon compound (C) and/or polyether compound (D)) is used in an amount of usually 0.001 to 5,000 mol, preferably 0.01 to 1,000 mol, based on 1 mol of the titanium atom in the polymerization system. The organometallic compound catalyst component [III] is used in an amount of usually 1 to 2,000 mol, preferably 2 to 1,000 mol, based on 1 mol of the titanium atom.

In the propylene polymerization step using the olefin polymerization catalyst (4a), the prepolymerized catalyst [Ia-4] is used in an amount of usually about 0.0001 to 50 mmol, preferably about 0.001 to 10 mmol, in terms of titanium atom, based on 1 liter of the polymerization volume. The electron donor [II-4] (organosilicon compound (C) and/or polyether compound (D)) is used in an amount of usually 0.001 to 5,000 mol, preferably 0.001 to 1,000 mol, based on 1 mol of the titanium atom in the polymerization system. The organometallic compound catalyst component [III] is used in an amount of usually 1 to 2,000 mol, preferably 2 to 1,000 mol, based on 1 mol of the titanium atom.

In this propylene polymerization step, the same copolymerizable monomers as used for the first process for preparing a propylene block copolymer can be employed. The polymerization conditions such as a temperature, a pressure and a procedure may be the same as those for the first process for preparing a propylene block copolymer.

If propylene is polymerized in the presence of the olefin polymerization catalyst (4) or (4a), a highly isotactic polypropylene component can be prepared. Moreover, molecular weight regulation by means of hydrogen can be easily made, and hence a polypropylene component having a high melt flow rate can be prepared by the use of a small amount of hydrogen.

In the propylene polymerization step of the fourth process for preparing a propylene block copolymer, a polypropylene component can be obtained in an amount of 5,000 to 300,000 g, preferably 10,000 to 200,000 g, based on 1 g of the solid titanium catalyst component (A-2), though the amount varies depending on the polymerization conditions.

The polypropylene component prepared in this propylene polymerization step has the same properties as those of the polypropylene component prepared in the first process for preparing a propylene block copolymer.

In the ethylene/α-olefin copolymerization step, the polypropylene component is used in an amount of 10 to 1,000 g, preferably 10 to 800 g, particularly preferably 30 to 500 g, based on 1 liter of the polymerization volume. This polypropylene is desirably present in an amount of usually 0.0001 to 1 mmol, preferably about 0.001 to 0.5 mmol, in terms of titanium atom of the solid titanium catalyst component (A-2) contained in the polypropylene, based on 1 liter of the polymerization volume.

To the ethylene/α-olefin copolymerization system, the solid titanium catalyst component (A-2), the electron donor [II-4] (organosilicon compound (C) and/or polyether compound (D)) and the organometallic compound catalyst component [III] can be further added. In this case, the solid titanium catalyst component (A-2) can be used in an amount of 0.0001 to 30 mmol, preferably 0.001 to 5 mmol, based on 1 liter of the polymerization volume. The electron donor [II-4] (organosilicon compound (C) and/or polyether compound (D)) can be used in an amount of 0.001 to 5,000 mol, preferably 0.01 to 1,000 mol, based on 1 mol of the titanium atom in the polymerization system. The organometallic compound catalyst component [III] can be used in an amount of 1 to 2,000 mol, preferably about 2 to 1,000 mol, based on 1 mol of the titanium atom in the polymerization system.

In the ethylene/α-olefin copolymerization step described above, an ethylene/α-olefin copolymer component having a high molecular weight can be easily obtained.

According to the fourth process for preparing a propylene block copolymer as mentioned above, a propylene block copolymer containing a highly isotactic polypropylene component and containing a rubber component of high molecular weight (high intrinsic viscosity [η]) can be easily prepared.

The fifth process for preparing a propylene block copolymer according to the invention comprises the steps of polymerizing propylene to form a polypropylene component and copolymerizing ethylene and an α-olefin of 3 to 20 carbon atoms to form an ethylene/α-olefin copolymer component, in an optional order, wherein both of the polymerizing and copolymerizing steps are carried out in the presence of an olefin polymerization catalyst (5a) formed from:

[Ia-5] a prepolymerized catalyst component obtained by prepolymerizing an olefin of 2 or more carbon atoms in the presence of
(A) the solid titanium catalyst component,
(B) the organometallic compound catalyst component, and
(E) an organosilicon compound represented by the following formula (c-iii)

wherein R and R' are each a hydrocarbon group, and n is a number satisfying the condition of 0<n<4, in such a way that the amount of the prepolymer formed is 0.01 to 2,000 g based on 1 g of the solid titanium catalyst component (A);

[II-5] (C) the organosilicon compound represented by the formula (c-i); and optionally,

[III] the organometallic compound catalyst component.

Through this process, a specific propylene block copolymer described later is prepared.

The organosilicon compound (E) represented by the above formula (c-iii) may be the same as the organosilicon compound (C) represented by the formula (c-i) described before with respect to the polymerized catalyst [Ia-1], but the compound (E) is preferably the same as the compound (C).

The prepolymerized catalyst [Ia-5] can be prepared in the same manner as described in the preparation of the prepolymerized catalyst [Ia-1] except that the organosilicon compound (E) represented by the formula (c-iii) is used in place of the organosilicon compound (C) represented by the formula (c-i).

The same olefins of 2 or more carbon atoms as used for preparing the prepolymerized catalyst [Ia-1] can be used for preparing the prepolymerized catalyst [Ia-5].

Among those olefins, preferred as the prepolymerizable monomers for preparing the prepolymerized catalyst [Ia-5] are propylene, 1-butene, 1-pentene, 3-methyl-1-butene, 3-methyl-1-pentene, 3-ethyl-1-hexene, vinylcyclohexane, allyltrimethylsilane and dimethylstyrene, and of these, more preferred are propylene, 3-methyl-1-butene and vinylcyclohexane, allyltrimethylsilane. These olefins may be used in combination of two or more kinds.

When a linear olefin is used as the prepolymerizable monomer, the organosilicon compound (C) represented by the formula (c-i) is preferably used as the organosilicon compound (E) represented by the formula (c-iii). When a branched olefin is used as the prepolymerizable monomer, an organosilicon compound having a lower alkyl group or a lower alkoxy group is preferably used as the organosilicon compound (E) represented by the formula (c-iii).

Specific examples of the organosilicon compounds having a lower alkyl group or a lower alkoxy group include: trimethylmethoxysilane, trimethylethoxysilane, dimethyldimethoxysilane, dimethyldiethoxysilane, diisopropyldimethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bis-ethylphenyldimethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, n-butyltriethoxysilane, phenyltriethoxysilane, γ-aminopropyltriethoxysilane, chlorotriethoxysilane, ethyltriisopropoxysilane, vinyltributoxysilane, ethyl silicate, butyl silicate, trimethylphenoxysilane, methyltriallyoxysilane, vinyltris(β-methoxyethoxysilane), vinyltriacetoxysilane and dimethyltetraethoxysiloxane.

The prepolymerization is desirably carried out in such a manner that a prepolymer is produced in an amount of 0.01 to 2,000 g, preferably 0.1 to 500 g, based on 1 g of the solid titanium catalyst component (A).

When the prepolymerized catalyst or the olefin polymerization catalyst for use in the fifth process for preparing a propylene block copolymer is formed from the above components, other components useful for the catalyst formation may be used in combination with the above components. For example, the electron donors (a) and (b) described before with respect to the preparation of the olefin polymerization catalyst (1) can be used, if desired. In the propylene polymerization step using the olefin polymerization catalyst (5a), the prepolymerized catalyst [Ia-5] is used in an amount of usually about 0.0001 to 2 mmol, preferably about 0.001 to 1 mmol, in terms of titanium atom, based on 1 liter of the polymerization volume. The electron donor [II-5] (organosilicon compound (C)) is used in an amount of usually 0.001 to 5,000 mol, preferably 0.01 to 1,000 mol, based on 1 mol of the titanium atom. The organometallic compound catalyst component [III] is used, optionally, in an amount of usually 1 to 2,000 mol, preferably 2 to 1,000 mol, based on 1 mol of the titanium atom in the polymerization system.

In this propylene polymerization step, the same copolymerizable monomers as used for the first process for preparing a propylene block copolymer can be employed. The polymerization conditions such as a temperature, a pressure and a procedure may be the same as those for the first process for preparing a propylene block copolymer.

If propylene is polymerized in the presence of the olefin polymerization catalyst (5a), a highly isotactic polypropylene component can be prepared.

The polypropylene component prepared in this propylene polymerization step has the same properties as those of the polypropylene component prepared in the first process for preparing a propylene block copolymer.

In the ethylene/α-olefin copolymerization step, the polypropylene component is used in an amount of 10 to 1,000 g, preferably 10 to 800 g, particularly preferably 30 to 500 g, based on 1 liter of the polymerization volume. This polypropylene is desirably present in an amount of usually 0.0001 to 1 mmol, preferably about 0.001 to 0.5 mmol, in terms of titanium atom of the solid titanium catalyst component (A) contained in the polypropylene, based on 1 liter of the polymerization volume.

To the ethylene/α-olefin copolymerization system, the solid titanium catalyst component (A), the electron donor [II-5] (organosilicon compound (C)) and the organometallic compound catalyst component [III] can be further added. In this case, the solid titanium catalyst component (A) can be used in an amount of 0.0001 to 20 mmol, preferably 0.001 to 20 mmol, based on 1 liter of the polymerization volume. The electron donor [II-5] (organosilicon compound (C)) can be used in an amount of 0.001 to 5,000 mol, preferably 0.01 to 1,000 mol, based on 1 mol of the titanium atom in the polymerization system. The organometallic compound catalyst component [III] can be used in an amount of 1 to 2,000 mol, preferably about 2 to 1,000 mol, based on 1 mol of the titanium atom in the polymerization system.

In the ethylene/α-olefin copolymerization step described above, an ethylene/α-olefin copolymer component having a high molecular weight can be easily obtained.

According to the fifth process for preparing a propylene block copolymer as mentioned above, a propylene block copolymer containing a highly isotactic polypropylene component and containing a rubber component of high molecular weight (high intrinsic viscosity [η]) can be easily prepared.

In the first to fifth processes for preparing a propylene block copolymer according to the invention, an yield of the propylene block copolymer per unit amount of the solid titanium catalyst component is high, and hence the amount of the catalyst residue (particularly halogen content) in the product can be relatively reduced. Accordingly, an operation for removing the catalyst residue contained in the product can be omitted, and moreover, a mold can be effectively prevented from occurrence of rust in the molding process of the resulting propylene block copolymer.

Propylene Block Copolymer

According to the processes for preparing a propylene block copolymer as mentioned above, a propylene block copolymer having the following properties can be obtained.

The propylene block copolymer obtained by the invention desirably contains a boiling heptane-insoluble component (i) in an amount of 50 to 95% by weight, preferably 70 to 93% by weight, particularly preferably 75 to 90% by weight.

This boiling heptane-insoluble component (i) essentially consists of units derived from propylene, but in some cases, it contains units derived from other olefins than propylene which are used in the preparation of the polypropylene component and a part of the ethylene/α-olefin copolymer component. For example, the boiling heptane-insoluble component of the propylene block copolymer may contain the units derived from other olefin than propylene in an amount of not more than 5% by mol, preferably not more than 4% by mol.

The boiling heptane-insoluble component of the propylene block copolymer obtained by the invention desirably has the following properties.

(i-1) The boiling heptane-insoluble component has a pentad isotacticity [$M_5$] of not less than 0.97, preferably 0.970 to 0.995, more preferably 0.980 to 0.995, particularly preferably 0.982 to 0.995.

(i-2) The boiling heptane-insoluble component has a pentad tacticity [$M_3$] of 0.0020 to 0.0050, preferably 0.0023 to 0.0045, more preferably 0.0025 to 0.0040.

(i-3) The boiling heptane-insoluble component of the propylene block copolymer obtained by the invention has a crystallinity, as measured by X-ray diffractometry, of usually not less than 60%, preferably not less than 65%, more preferably 65 to 95%, particularly preferably 65 to 90%.

The pentad isotacticity [$M_5$] and the pentad tacticity [$M_3$] of the propylene block copolymer can be determined in the same manner as described before with respect to the pentad isotacticity [$M_5$] and the pentad tacticity [$M_3$] of the homopolypropylene.

The boiling heptane-insoluble component of the propylene block copolymer obtained by the invention is highly isotactic.

(ii-1) The propylene block copolymer obtained by the invention desirably contains a 24° C. n-decane-soluble component in an amount of 60 to 3% by weight, preferably 50 to 3% by weight, more preferably 40 to 3% by weight, particularly preferably 30 to 3% by weight.

(ii-2) The 23° C. n-decane-soluble component desirably has an intrinsic viscosity [η], as measured in decahydronaphthalene at 135° C., of not less than 2 dl/g when the copolymer is prepared using the catalyst (1), (1a), (2) or (2a); and of not less than 4 dl/g when the copolymer is prepared using the catalyst (3), (3a), (4), (4a) or (5a); preferably 4 to 20 dl/g, more preferably 5 to 15 dl/g, particularly preferably 6 to 12 dl/g.

Thus, the propylene block copolymer has a higher intrinsic viscosity [η] of 23° C. n-decane-soluble component as compared with those prepared by the use of the conventional catalysts.

(ii-3) The 23° C. n-decane-soluble component of the propylene block copolymer desirably contains units derived from ethylene in an amount of 30 to 60% by mol, preferably 35 to 50% by mol.

In this specification, the amount of the 23° C. n-decane-soluble component (rubber component) contained in the propylene polymer is determined as follows.

A 1-liter flask equipped with a stirrer is charged with 3 g of a polymer sample, 20 mg of 2,6-di-tert-butyl-4-methylphenol and 500 ml of n-decane, and heated at 145° C. in an oil bath to dissolve the polymer sample. After the polymer sample is dissolved, the resulting solution is cooled to room temperature over a period of about 8 hours, followed by keeping it for 8 hours in a water bath of 23° C. so as to precipitate a polymer. The resulting n-decane solution containing the precipitated polymer and the dissolved polymer is separated by filtration through a glass filter of G-4 (or G-2). The resulting solution is dried at 150° C. and 10 mmHg until the weight becomes unvaried, and the weight is measured. The weight thus measured is the weight of the polymer which is soluble in the above-mentioned mixed solvent, and a percentage of the weight to the weight of the sample polymer is calculated.

As described above, it is desired that the propylene block copolymer obtained by the invention contains a highly isotactic boiling heptane-insoluble component (i) and a 23° C. n-decane-soluble component (ii) having a high intrinsic viscosity [η].

In the case where the propylene block copolymer is prepared by the use of the prepolymerized catalyst, it is desired that the prepolymer formed by the prepolymerization is contained in the propylene block copolymer in an amount of 0.001 to 3% by weight, preferably 0.005 to 2% by weight.

The propylene block copolymer obtained by the invention desirably has a melt flow rate (MFR, as measured in accordance with ASTM D-1238 at 230° C. under a load of 2.16 kg) of 0.01 to 500 g/10 min, preferably 0.05 to 300 g/10 min, more preferably 0.08 to 200 g/10 min.

The propylene block copolymer obtained by the invention may be used, if desired, in combination with various additives such as nucleating agent, rubber ingredient, heat stabilizer, weathering stabilizer, antistatic agent, anti-slip agent, anti-blocking agent, anti-fogging agent, lubricant, dye, pigment, natural oil, synthetic oil, wax and filler.

EFFECT OF THE INVENTION

By the use of the novel olefin polymerization catalysts according to the invention, extremely highly isotactic homopolypropylene can be prepared using a small amount of hydrogen in the preparation thereof as compared with polymerization systems using the conventional catalysts.

The processes for preparing a propylene block copolymer using the novel olefin polymerization catalysts and other processes according to the invention, provide a propylene block copolymer containing an extremely highly isotactic polypropylene component and a high molecular weight rubber component.

EXAMPLE

The present invention is further described with reference to the following examples, but it should be construed that the invention is in no way limited to those examples.

Physical properties of the polymers prepared in the following examples were measured by the methods described below.

Measurement of Physical Properties

100 Parts by weight of the polymer obtained in each of Examples was mixed with 0.05 part by weight of tetrakis [methylene(3,5-di-t-butyl-4-hydroxy)hydrocinnamate] methane, 0.05 part by weight of tris(mixed mono- and dinonylphenylphosphite) and 0.1 part by weight of calcium stearate, and the mixture was granulated at 250° C. by an extrusion granulator having a screw diameter of 20 mm (produced by Thermo Plastic Co.).

The granulate thus obtained is molded at 200° C. into ASTM standard specimens for the following tests using an injection molding machine (produced by Toshiba Machine Co., Ltd.). The specimens were measured on flexural modulus (FM), heat distortion temperature (HDT) and Izod impact strength (IZ) in accordance with the ASTM standard measuring methods.

Flexural Modulus (FM):

The flexural modulus was measured in accordance with ASTM D-790.

Specimen: 12.7 cm×12.7 mm×3.0 mm

Heat Distortion Temperature (HDT):

The heat distortion temperature was measured in accordance with ASTM D-648.

Specimen: 12.7 cm×12.7 mm×6.0 mm

Izod Impact Strength (IZ):

The Izod impact strength was measured in accordance with ASTM D-256.

Specimen: 12.7 cm×12.7 mm×6.0 mm, (notched)

EXAMPLE 1

Preparation of Homopolypropylene

[Preparation of Solid Titanium Catalyst Component (A)]

A mixture of 95.2 g of anhydrous magnesium chloride, 442 ml of decane and 390.6 g of 2-ethylhexyl alcohol was reacted under heating at 130° C. for 2 hours to give a homogeneous solution. To the solution was added 21.3 g of phthalic anhydride, and the mixture was stirred at 130° C. for 1 hour to dissolve the phthalic anhydride.

After the resulting homogeneous solution was cooled to room temperature, 75 ml of this solution was dropwise added to 200 ml of titanium tetrachloride kept at −20° C. over a period of 1 hour. After the addition was completed, the temperature of the resulting mixture was elevated to 110° C. over a period of 4 hours. When the temperature reached 110° C., 5.22 g of diisobutyl phthalate (DIBP) was added to the solution, followed by stirring at the same temperature for 2 hours.

After the end of the 2-hour reaction, the mixture was hot filtered to separate a solid which was resuspended in 275 ml of titanium tetrachloride, and the resulting suspension was heated at 110° C. for 2 hours.

After the end of the reaction, the mixture was hot filtered to separate a solid which was thoroughly washed with decane and hexane at 110° C. until any titanium compound liberating in the filtrate was not detected.

The solid titanium catalyst component (A) prepared as above was stored in the form of a slurry in decane, but a part thereof was dried for the purpose of examining the catalyst composition.

The solid titanium catalyst component (A) thus obtained had a composition comprising 2.3% by weight of titanium, 61% by weight of chlorine, 19% by weight of magnesium and 12.5% by weight of DIBP.

[Preparation of Prepolymerized Catalyst [I]]

A 400 ml four-necked glass reactor equipped with a stirrer was charged with 100 ml of purified hexane, 10 mmol of triethylaluminum, 2.0 mmol of dicyclopentyldimethoxysilane (DCPMS) and 1.0 mmol (in terms of titanium atom) of the solid titanium catalyst component (A) obtained above in a nitrogen atmosphere. Then, propylene was fed to the reactor at a rate of 3.2 /hr for 1 hour, The polymerization temperature was kept at 20° C.

After the end of the propylene feeding, the reactor was purged with nitrogen, and washing operation consisting of removal of a supernatant and addition of purified hexane was carried out twice, to obtain a prepolymerized catalyst [I], which was resuspended in purified hexane, and the whole suspension was stored in a catalyst bottle.

[Polymerization]

Into a 17-liter autoclave were introduced 3 kg of propylene and 45 liters of hydrogen, and the temperature of the system was raised to 60° C. Then, 15 mmol of triethylaluminum, 15 mmol of 2-isopentyl-2-isopropyl-1,3-dimethoxypropane (IPAMP) and 0.05 mmol (in terms of titanium atom) of the prepolymerized catalyst [I] were added to the autoclave. The temperature of the system was raised to 70° C., and the same temperature was kept for 40 minutes to perform homopolymerization of propylene.

The results are shown in Table 1.

EXAMPLE 2

Preparation of Homopolypropylene

[Polymerization]

Into a 17-liter autoclave were introduced 3 kg of propylene and 20 liters of hydrogen, and the temperature of the system was raised to 60° C. Then, 15 mmol of triethylaluminum, 15 mmol of IPAMP and 0.05 mmol (in terms of titanium atom) of the prepolymerized catalyst [I] obtained in Example 1 were added to the autoclave. The temperature of the system was raised to 70° C., and the same temperature was kept for 50 minutes to perform homopolymerization of propylene.

The results are shown in Table 1.

EXAMPLE 3

Preparation of Homopolypropylene

[Polymerization]

Homopolymerization of propylene was carried out in the same manner as in Example 2 except that hydrogen was added in an amount of 8 liters.

The results are shown in Table 1.

EXAMPLE 4

Preparation of Propylene Block Copolymer

[Polymerization]

Into a 17-liter autoclave were introduced 3 kg of propylene and 50 liters of hydrogen, and the temperature of the system was raised to 60° C. Then, 15 mmol of triethylaluminum, 15 mmol of IPAMP and 0.05 mmol (in terms of titanium atom) of the prepolymerized catalyst [I] obtained in Example 1 were added to the autoclave. The temperature of the system was raised to 70° C., and the same temperature was kept for 40 minutes to perform homopolymerization of propylene.

After the end of the homopolymerization of propylene, the vent valve was opened to release the autoclave until the pressure reached atmospheric pressure.

After the end of the release of pressure, copolymerization of ethylene and propylene was carried out in the following manner. Ethylene and propylene were fed to the polymerization reactor at rates of 240 Nl/hr and 960 Nl/hr, respectively. The vent was adjusted on its opening degree so that the pressure in the reactor became 10 kg/cm$^2$-G. The polymerization was carried out for 80 minutes with keeping the temperature at 70° C. To the reaction system was added a small amount of ethanol to terminate the polymerization reaction, and the unreacted gas was purged out from the reactor.

The results are shown in Table 1.

EXAMPLE 5

Preparation of Propylene Block Copolymer

[Polymerization]

Polymerization was carried out in the same manner as in Example 4 except that in the copolymerization of ethylene and propylene, ethylene and propylene were fed at rates of 450 Nl/hr and 750 Nl/hr, respectively.

The results are shown in Table 1.

EXAMPLE 6

Preparation of Propylene Block Copolymer

[Polymerization]

Polymerization was carried out in the same manner as in Example 4 except that hydrogen was added in an amount of 20 liters in the homopolymerization of propylene and the homopolymerization time was changed to 50 minutes.

The results are shown in Table 1.

EXAMPLE 7

Preparation of Propylene Block Copolymer

[Polymerization]

Polymerization was carried out in the same manner as in Example 5 except that hydrogen was added in an amount of 8 liters in the homopolymerization of propylene and the homopolymerization time was changed to 50 minutes.

The results are shown in Table 1.

COMPARATIVE EXAMPLE 1

[Preparation of Prepolymerized Catalyst [$I_{ref}$]]

A 400 ml four-necked glass reactor equipped with a stirrer was charged with 100 ml of purified hexane, 3.0 mmol of triethylaluminum and 1.0 mmol (in terms of titanium atom) of the solid titanium catalyst component (A) obtained in Example 1 in a nitrogen atmosphere. Then, propylene was was fed to the reactor at a rate of 3.2 /hr for 1 hour. The polymerization temperature was kept at 20° C.

After the end of the propylene feeding, the reactor was purged with nitrogen, and washing operation consisting of removal of a supernatant and addition of purified hexane was carried out twice, to obtain a prepolymerized catalyst [$I_{ref}$], which was resuspended in purified hexane, and the whole suspension was transferred into a catalyst bottle.

[Polymerization]

Into a 17-liter autoclave were introduced 3 kg of propylene and 40 liters of hydrogen, and the temperature of the system was raised to 60° C. Then, 15 mmol of triethylaluminum, 5 mmol of diphenyldimethoxysilane (DPMS) and 0.05 mmol (in terms of titanium atom) of the prepolymerized catalyst [$I_{ref}$] were added to the autoclave. The temperature of the system was raised to 70° C., and the same temperature was kept for 25 minutes to perform homopolymerization of propylene.

After the end of the homopolymerization of propylene, the vent valve was opened to release the autoclave until the pressure reached atmospheric pressure.

After the release of pressure, copolymerization of ethylene and propylene was carried out in the following manner. Ethylene, propylene and hydrogen were fed to the polymerization reactor at rates of 240 Nl/hr, 960 Nl/hr and 5 Nl/hr, respectively. The vent of the reactor was adjusted on its opening degree so that the pressure in the reactor became 10 kg/cm²-G. The polymerization was carried out for 50 minutes with keeping the temperature at 70° C. To the reaction system was added a small amount of ethanol to terminate the polymerization reaction, and the unreacted gas was purged out from the reactor to obtain a white powder, which was dried at 80° C. under reduced pressure.

The results are shown in Table 1.

COMPARATIVE EXAMPLE 2

Polymerization was carried out in the same manner as in Comparative Example 1 except that the copolymerization of ethylene and propylene was performed for 40 minutes.

The results are shown in Table 1.

COMPARATIVE EXAMPLE 3

[Polymerization]

Into a 17-liter autoclave were introduced 3 kg of propylene and 45 liters of hydrogen, and the temperature of the system was raised to 60° C. Then, 15 mmol of triethylaluminum, 5 mmol of DPMS and 0.05 mmol (in terms of titanium atom) of the prepolymerized catalyst [$I_{ref}$] were added to the autoclave. The temperature of the system was raised to 70° C., and the same temperature was kept for 25 minutes to perform homopolymerization of propylene.

After the end of the homopolymerization of propylene, the vent valve was opened to release the autoclave until the pressure reached atmospheric pressure.

After the release of pressure, copolymerization of ethylene and propylene was carried out in the following manner. Ethylene and propylene were fed to the polymerization reactor at rates of 240 Nl/hr and 960 Nl/hr, respectively. The vent of the reactor was adjusted on its opening degree so that the pressure in the reactor became 10 kg/cm²-G. The polymerization was carried out for 50 minutes with keeping the temperature at 70° C. To the reaction system was added a small amount of ethanol to terminate the polymerization reaction, and the unreacted gas was purged out from the reactor to obtain a white powder, which was dried at 80° C. under reduced pressure.

The results are shown in Table 1.

COMPARATIVE EXAMPLE 4

Polymerization was carried out in the same manner as in Comparative Example 3 except that the copolymerization of ethylene and propylene was performed for 40 minutes.

The results are shown in Table 1.

COMPARATIVE EXAMPLE 5

Polymerization was carried out in the same manner as in Comparative Example 1 except that the copolymerization of ethylene and propylene was not performed.

The results are shown in Table 1.

TABLE 1

| No. | Activity g/mol-Ti | MFR g/10 min | Bulk specific gravity g/ml | 23° C. n-Decane-soluble component | | [η] dl/g |
|---|---|---|---|---|---|---|
| | | | | Content wt % | Ethylene content mol % | |
| Ex. 1 | 30,200 | 105 | 0.46 | 0.7 | — | — |
| Ex. 2 | 31,900 | 51 | 0.47 | 0.6 | — | — |
| Ex. 3 | 31.100 | 25 | 0.47 | 0.6 | — | — |
| Ex. 4 | 36,200 | 48 | 0.46 | 8.9 | 40.2 | 6.8 |
| Ex. 5 | 36,700 | 45 | 0.45 | 10.2 | 46.2 | 7.2 |
| Ex. 6 | 37,400 | 24 | 0.46 | 9.1 | 36.2 | 6.8 |
| Ex. 7 | 36,400 | 9 | 0.45 | 9.5 | 38.2 | 7.0 |
| Comp. Ex. 1 | 51,500 | 46 | 0.43 | 12.0 | 40.5 | 2.2 |
| Comp. Ex. 2 | 47,600 | 50 | 0.43 | 8.7 | 38.8 | 2.1 |
| Comp. Ex. 3 | 50,000 | 43 | 0.43 | 10.6 | 39.4 | 4.8 |
| Comp. Ex. 4 | 47,200 | 46 | 0.43 | 8.3 | 38.6 | 4.5 |
| Comp. Ex. 5 | 40,000 | 96 | 0.46 | 2.2 | — | — |

TABLE 1-continued

| | | 23° C. n-Decane-insoluble component | | | | | |
|---|---|---|---|---|---|---|---|
| | Ethylene | Boiling heptane-insoluble component | | | | | IZ |
| No. | content mol % | Content wt % | [M$_5$] (%) | [M$_3$] (%) | FM kg/cm$^2$ | HDT ° C. | kg · cm/cm |
| Ex. 1 | — | 96.0 | 98.9 | 0.25 | — | — | — |
| Ex. 2 | — | 96.4 | 98.3 | 0.27 | — | — | — |
| Ex. 3 | — | 96.9 | 98.3 | 0.25 | — | — | — |
| Ex. 4 | 0.8 | 94.4 | 98.8 | 0.32 | 17,100 | 118 | 7.0 |
| Ex. 5 | 1.2 | 94.3 | 98.6 | 0.31 | 16,600 | 115 | 7.6 |
| Ex. 6 | 0.8 | 94.7 | 98.8 | 0.28 | 16,300 | 115 | 7.7 |
| Ex. 7 | 0.9 | 94.9 | 98.8 | 0.30 | 16,000 | 114 | 8.0 |
| Comp. Ex. 1 | 2.4 | 89.8 | 96.2 | 0.35 | 14,000 | 108 | 3.5 |
| Comp. Ex. 2 | 2.2 | 89.6 | 96.8 | 0.35 | 14,300 | 110 | 2.7 |
| Comp. Ex. 3 | 2.7 | 89.6 | 96.2 | 0.37 | 14,600 | 110 | 4.8 |
| Comp. Ex. 4 | 2.5 | 89.7 | 96.7 | 0.34 | 14,900 | 111 | 4.3 |
| Comp. Ex. 5 | — | 90.5 | 96.8 | 0.27 | — | — | — |

EXAMPLE 8

Preparation of Propylene Block Copolymer
[Preparation of Prepolymerized Catalyst [I-2]]

A 400 ml four-necked glass reactor equipped with a stirrer was charged with 100 ml of purified hexane, 10 mmol of triethylaluminum, 2.0 mmol of 2-isopentyl-2-isopropyl-1,3-dimethoxypropane (IPAMP) and 1.0 mmol (in terms of titanium atom) of the solid titanium catalyst component (A) obtained as above in a nitrogen atmosphere. Then, propylene was fed to the reactor at a rate of 3.2 /hr for 1 hour. The polymerization temperature was kept at 20° C.

After the end of propylene feeding, the reactor was purged with nitrogen, and washing operation consisting of removal of a supernatant and addition of purified hexane was carried out twice, to obtain a prepolymerized catalyst [I-2], which was resuspended in purified hexane, and the whole suspension was stored in a catalyst bottle.

[Polymerization]

Into a 17-liter autoclave were introduced 3 kg of propylene and 50 liters of hydrogen, and the temperature of the system was raised to 60° C. Then, 15 mmol of triethylaluminum, 15 mmol of dicyclopentyldimethoxysilane (DCPMS) and 0.05 mmol (in terms of titanium atom) of the prepolymerized catalyst [I-2] were added to the autoclave. The temperature of the system was raised to 70° C., and the same temperature was kept for 40 minutes to perform homopolymerization of propylene.

After the end of the homopolymerization, the vent valve was opened to release the autoclave until the pressure reached atmospheric pressure.

After the release of pressure, copolymerization of ethylene and propylene was carried out in the following manner. Ethylene and propylene were fed to the polymeriation reactor at rates of 240 Nl/hr and 960 Nl/hr, respectively. The vent of the reactor was adjusted on its opening degree so that the pressure in the polymerizer became 10 kg/cm$^2$-G. The polymerization was carried out for 80 minutes with keeping the temperature at 70° C. To the reaction system was added a small amount of ethanol to terminate the polymerization reaction, and the unreacted gas was purged out from the reactor.

The results are shown in Table 2.

EXAMPLE 9

Preparation of Propylene Block Copolymer

Polymerization was carried out in the same manner as in Example 8 except that in the copolymerization of ethylene and propylene, ethylene and propylene were fed at rates of 450 Nl/hr and 750 Nl/hr, respectively.

The results are shown in Table 2.

EXAMPLE 10

Preparation of Propylene Block Copolymer

Polymerization was carried out in the same manner as in Example 8 except that hydrogen was added in an amount of 20 liters in the homopolymerization of propylene and the homopolymerization time was changed to 50 minutes.

The results are shown in Table 2.

EXAMPLE 11

Preparation of Propylene Block Copolymer

Polymerization was carried out in the same manner as in Example 8 except that hydrogen was added in an amount of 8 liters in the homopolymerization of propylene and the homopolymerization time was changed to 50 minutes.

The results are shown in Table 2.

TABLE 2

| | | | | 23° C. n-Decane-soluble component | | |
|---|---|---|---|---|---|---|
| No. | Activity g/mol-Ti | MFR g/10 min | Bulk specific gravity g/ml | Content wt % | Ethylene content mol % | [η] dl/g |
| Ex. 8 | 34,700 | 50 | 0.45 | 8.4 | 40.1 | 6.6 |
| Ex. 9 | 35,100 | 48 | 0.44 | 10.0 | 46.2 | 7.0 |
| Ex. 10 | 34,700 | 27 | 0.46 | 8.5 | 37.0 | 6.8 |
| Ex. 11 | 35,000 | 11 | 0.44 | 8.9 | 40.3 | 7.0 |

| | | 23° C. n-Decane-insoluble component | | | | | |
|---|---|---|---|---|---|---|---|
| | Ethylene | Boiling heptane-insoluble component | | | | | IZ |
| No. | content mol % | Content wt % | [M$_5$] (%) | [M$_3$] (%) | FM kg/cm$^2$ | HDT ° C. | kg · cm/cm |
| Ex. 8 | 0.8 | 94.5 | 99.0 | 0.27 | 17,000 | 117 | 7.2 |
| Ex. 9 | 1.4 | 94.2 | 99.1 | 0.31 | 16,700 | 115 | 7.5 |
| Ex. 10 | 0.8 | 94.8 | 99.1 | 0.30 | 16,500 | 117 | 7.8 |
| Ex. 11 | 1.0 | 94.9 | 99.1 | 0.29 | 16,400 | 116 | 7.9 |

EXAMPLE 12

Preparation of Propylene Block Copolymer
[Polymerization]

Into a 17-liter autoclave were introduced 3 kg of propylene and 40 liters of hydrogen, and the temperature of the system was raised to 60° C. Then, 15 mmol of triethylaluminum, 15 mmol of IPAMP and 0.05 mmol (in terms of titanium atom) of the prepolymerized catalyst [I-2] were added to the autoclave. The temperature of the system was raised to 70° C., and the same temperature was kept for 40 minutes to perform homopolymerization of propylene.

After the end of the homopolymerization of propylene, the vent valve was opened to release the autoclave until the pressure reached atmospheric pressure.

After the release of pressure, copolymerization of ethylene and propylene was carried out in the following manner. Ethylene and propylene were fed to the polymerization reactor at rates of 240 Nl/hr and 960 Nl/hr, respectively. The vent of the reactor was adjusted on its opening degree so that the pressure in the reactor became 10 kg/cm$^2$-G. The polymerization was carried out for 80 minutes with keeping the temperature at 70° C. To the reaction system was added a small amount of ethanol to terminate the polymerization reaction, and the unreacted gas was purged out from the reactor.

The results are shown in Table 3.

EXAMPLE 13

Preparation of Propylene Block Copolymer

Polymerization was carried out in the same manner as in Example 12 except that in the copolymerization of ethylene and propylene, ethylene and propylene were fed to the polymerization reactor at rates of 450 Nl/hr and 750 Nl/hr, respectively.

The results are shown in Table 3.

EXAMPLE 14

Preparation of Propylene Block Copolymer

Polymerization was carried out in the same manner as in Example 12 except that hydrogen was added in an amount of 17 liters in the homopolymerization of propylene and the homopolymerization time was changed to 50 minutes.

The results are shown in Table 3.

EXAMPLE 15

Preparation of Propylene Block Copolymer

Polymerization was carried out in the same manner as in Example 12 except that hydrogen is added in an amount of 7 liters in the homopolymerization of propylene and the homopolymerization time was changed to 50 minutes.

The results are shown in Table 3.

TABLE 3

| No. | Activity g/mol-Ti | MFR g/10 min | Bulk specific gravity g/ml | 23° C. n-Decane-soluble component Content wt % | 23° C. n-Decane-soluble component Ethylene content mol % | [η] dl/g |
|---|---|---|---|---|---|---|
| Ex. 12 | 35,200 | 49 | 0.45 | 8.1 | 39.5 | 6.7 |
| Ex. 13 | 36,200 | 45 | 0.45 | 10.3 | 45.8 | 7.0 |
| Ex. 14 | 35,300 | 25 | 0.47 | 9.0 | 36.8 | 6.8 |
| Ex. 15 | 36,200 | 13 | 0.45 | 9.3 | 40.0 | 7.1 |

| No. | 23° C. n-Decane-insoluble component Ethylene content mol % | Boiling heptane-insoluble component Content wt % | [M$_5$] (%) | [M$_3$] (%) | FM kg/cm$^2$ | HDT ° C. | IZ kg · cm/cm |
|---|---|---|---|---|---|---|---|
| Ex. 12 | 0.9 | 94.4 | 98.8 | 0.27 | 17,100 | 117 | 7.0 |
| Ex. 13 | 1.2 | 94.3 | 98.6 | 0.33 | 16,500 | 116 | 7.6 |
| Ex. 14 | 0.9 | 94.6 | 98.6 | 0.29 | 16,200 | 115 | 7.7 |
| Ex. 15 | 0.9 | 94.9 | 98.8 | 0.29 | 16,200 | 115 | 8.0 |

EXAMPLE 16

Preparation of Propylene Block Copolymer
[Preparation of Solid Titanium Catalyst Component (A-2)]

A mixture of 95.2 g of anhydrous magnesium chloride, 442 ml of decane and 390.6 g of 2-ethylhexyl alcohol was reacted under heating at 130° C. for 2 hours to give a homogeneous solution. To the solution was added 21.3 g of phthalic anhydride, and the mixture was stirred at 130° C. for 1 hour to dissolve the phthalic anhydride in the solution.

After the resulting homogeneous solution was cooled to room temperature, 75 ml of this solution was dropwise added to 200 ml of titanium tetrachloride kept at −20° C. over a period of 1 hour. After the addition was completed, the temperature of the resulting mixture was elevated to 110° C. over a period of 4 hours. When the temperature reached 110° C., 4.79 ml of 2-isopropyl-2-isopentyl-1,3-dimethoxysilane (IPAMP) was added to the solution, followed by stirring at the same temperature for 2 hours.

After the end of the 2-hour reaction, the mixture was hot filtered to separate a solid which was resuspended in 275 ml of titanium tetrachloride, and the resulting suspension was heated at 110° C. for 2 hours.

After the end of the reaction, the mixture was hot filtered to separate a solid which was thoroughly washed with decane and hexane at 110° C. until any titanium compound liberating in the filtrate was not detected.

The solid titanium catalyst component (A-2) prepared as above was stored in the form of a slurry in decane, but a part thereof was dried for the purpose of examining the catalyst composition.

The solid titanium catalyst component (A-2) thus obtained had a composition comprising 2.3% by weight of titanium, 62% by weight of chlorine, 22% by weight of magnesium and 9.2% by weight of IPAMP.

Preparation of Prepolymerized Catalyst [I-4]]

A 400 ml four-necked glass reactor equipped with a stirrer was charged with 100 ml of purified hexane, 3 mmol of triethylaluminum and 1.0 mmol (in terms of titanium atom) of the solid titanium catalyst component (A-2) obtained as above in a nitrogen atmosphere. Then, propylene was fed to the reactor at a rate of 3.2 /hr for 1 hour. The polymerization temperature was kept at 20° C.

After the end of propylene feeding, the reactor was purged with nitrogen, and washing operation consisting of removal of a supernatant and addition of purified hexane was carried out twice, to obtain a prepolymerized catalyst [I-4], which was resuspended in purified hexane, and the whole suspension was stored in a catalyst bottle.

[Polymerization]

Into a 17-liter autoclave were introduced 3 kg of propylene and 50 liters of hydrogen, and the temperature of the system was raised to 60° C. Then, 15 mmol of triethylaluminum, 15 mmol of 2-isopentyl-2-isopropyl-1,3-dimethoxypropane (IPAMP) and 0.03 mmol (in terms of titanium atom) of the prepolymerized catalyst [I-4] were added to the autoclave. The temperature of the system was raised to 70° C., and the same temperature was kept for 40 minutes to perform homopolymerization of propylene.

After the end of the homopolymerization of propylene, the vent valve was opened to release the autoclave until the pressure reached atmospheric pressure.

After the release of pressure, copolymerization of ethylene and propylene was carried out in the follwoing manner. Ethylene and propylene were fed to the polymerization reactor at rates of 240 Nl/hr and 960 Nl/hr, respectively. The vent of the polymerizer was adjusted on its opening degree so that the pressure in the reactor became 10 kg/cm$^2$-G. The polymerization was carried out for 80 minutes with keeping the temperature at 70° C. To the reaction system was added a small amount of ethanol to terminate the polymerization reaction, and the unreacted gas was purged out from the reactor.

The results are shown in Table 4.

EXAMPLE 17

Preparation of Propylene Block Copolymer

Polymerization was carried out in the same manner as in Example 16 except that dicyclopentyldimethoxysilane (DCPMS) was used in place of IPAMP.

The results are shown in Table 4.

EXAMPLE 18

Preparation of Propylene Block Copolymer

Polymerization was carried out in the same manner as in Example 16 except that in the copolymerization of ethylene and propylene, ethylene and propylene were fed to the polymerization reactor at rates of 450 Nl/hr and 750 Nl/hr, respectively.

The results are shown in Table 4.

EXAMPLE 19

Preparation of Propylene Block Copolymer

Polymerization was carried out in the same manner as in Example 16 except that hydrogen was added in an amount of 20 liters in the homopolymerization of propylene and the homopolymerization time was changed to 50 minutes.

The results are shown in Table 4.

EXAMPLE 20

Preparation of Propylene Block Copolymer

Polymerization was carried out in the same manner as in Example 16 except that hydrogen was added in an amount of 8 liters in the homopolymerization of propylene and the homopolymerization time was changed to 50 minutes.

The results are shown in Table 4.

TABLE 4

| No. | Activity g/mol-Ti | MFR g/10 min | Bulk specific gravity g/ml | 23° C. n-Decane-soluble component | | [η] dl/g |
|---|---|---|---|---|---|---|
| | | | | Content wt % | Ethylene content mol % | |
| Ex. 16 | 77,600 | 44 | 0.46 | 8.3 | 38.2 | 6.7 |
| Ex. 17 | 77,200 | 40 | 0.47 | 8.0 | 37.6 | 6.9 |
| Ex. 18 | 80,200 | 43 | 0.45 | 10.2 | 45.2 | 7.4 |
| Ex. 19 | 72,400 | 22 | 0.46 | 8.8 | 38.0 | 6.7 |
| Ex. 20 | 70,000 | 10 | 0.45 | 8.4 | 39.6 | 7.0 |

| No. | 23° C. n-Decane-insoluble component | | | | | | IZ |
|---|---|---|---|---|---|---|---|
| | Ethylene content mol % | Boiling heptane-insoluble component Content wt % | [M$_5$] (%) | [M$_3$] (%) | FM kg/cm$^2$ | HDT ° C. | kg · cm/cm |
| Ex. 16 | 0.9 | 94.2 | 98.6 | 0.32 | 16,900 | 117 | 6.9 |
| Ex. 17 | 1.0 | 94.0 | 98.9 | 0.31 | 17,200 | 119 | 6.7 |
| Ex. 18 | 1.4 | 94.1 | 98.6 | 0.31 | 16,500 | 116 | 7.5 |
| Ex. 19 | 0.8 | 94.6 | 98.6 | 0.30 | 16,000 | 114 | 7.6 |
| Ex. 20 | 1.0 | 94.9 | 98.6 | 0.30 | 16,000 | 114 | 7.8 |

EXAMPLE 21

Preparation of Propylene Block Copolymer

[Polymerization]

Into a 17-liter autoclave were introduced 3 kg of propylene and 120 liters of hydrogen, and the temperature of the system was raised to 60° C. Then, 15 mmol of triethylaluminum, 15 mmol of dicyclopentyldimethoxysilane (DCPMS) and 0.05 mmol (in terms of titanium atom) of the prepolymerized catalyst [I] were added to the autoclave. The temperature of the system was raised to 70° C., and the same temperature was kept for 35 minutes to perform homopolymerization of propylene.

After the end of the homopolymerization of propylene, the vent valve was opened to release the autoclave until the pressure reached atmospheric pressure.

After the release of pressure, copolymerization of ethylene and propylene was carried out in the following manner. Ethylene and propylene were fed to the polymerization reactor at rates of 240 Nl/hr and 960 Nl/hr, respectively. The vent of the polymerizer was adjusted on its opening degree so that the pressure in the reactor became 10 kg/cm$^2$-G. The polymerization was carried out for 80 minutes with keeping the temperature at 70° C. To the reaction system was added a small amount of ethanol to terminate the polymerization reaction, and the unreacted gas was purged out from the reactor.

The results are shown in Table 5.

EXAMPLE 22

Preparation of Propylene Block Copolymer

Polymerization was carried out in the same manner as in Example 21 except that in the copolymerization of ethylene and propylene, ethylene and propylene were fed to the polymerization reactor at rates of 480 Nl/hr and 720 Nl/hr, respectively.

The results are shown in Table 5.

EXAMPLE 23

Preparation of Propylene Block Copolymer

Polymerization was carried out in the same manner as in Example 21 except that hydrogen was added in an amount of 50 liters in the homopolymerization of propylene and the homopolymerization time was changed to 40 minutes.

The results are shown in Table 5.

EXAMPLE 24

Preparation of Propylene Block Copolymer

Polymerization was carried out in the same manner as in Example 21 except that hydrogen is added in an amount of 20 liters in the homopolymerization of propylene and the homopolymerization time was changed to 40 minutes.

The results are shown in Table 5.

TABLE 5

| No. | Activity g/mol-Ti | MFR g/10 min | Bulk specific gravity g/ml | 23° C. n-Decane-soluble component | | [η] dl/g |
|---|---|---|---|---|---|---|
| | | | | Content wt % | Ethylene content mol % | |
| Ex. 21 | 47,600 | 44 | 0.45 | 8.1 | 40.9 | 6.1 |
| Ex. 22 | 49,400 | 46 | 0.45 | 9.0 | 45.0 | 6.8 |
| Ex. 23 | 50,600 | 25 | 0.46 | 9.2 | 37.0 | 6.2 |
| Ex. 24 | 51,100 | 13 | 0.45 | 8.5 | 39.2 | 6.6 |

TABLE 5-continued

| | 23° C. n-Decane-insoluble component | | | | | | IZ |
|---|---|---|---|---|---|---|---|
| | Ethylene | Boiling heptane-insoluble component | | | | | |
| No. | content mol % | Content wt % | $[M_5]$ (%) | $[M_3]$ (%) | FM $kg/cm^2$ | HDT ° C. | kg · cm/cm |
| Ex. 21 | 1.0 | 94.5 | 99.2 | 0.29 | 17,300 | 118 | 7.0 |
| Ex. 22 | 1.4 | 94.7 | 99.0 | 0.34 | 17,000 | 116 | 7.2 |
| Ex. 23 | 0.8 | 95.0 | 99.0 | 0.30 | 16,800 | 116 | 7.5 |
| Ex. 24 | 0.8 | 95.3 | 99.1 | 0.34 | 16,500 | 116 | 7.6 |

EXAMPLE 25

[Preparation of prepolymerized catalyst [I-5]]

Into a 400 ml glass reactor purged with nitrogen was introduced 200 ml of purified hexane. Then, to the reactor were added 20 mmol of triethylaluminum, 4 mmol of dicyclopentyldimethoxysilane (DCPMS) and 2 mmol (in terms of titanium atom) of the solid titanium catalyst component (A) prepared in Example 1. Thereafter, propylene was fed to the reactor at a rate of 7.3 Nl/hr for 1 hour to perform prepolymerization. The amount of propylene prepolymerized was 3 g per 1 g of the solid titanium catalyst component (A).

After the end of the prepolymerization, the mixture was filtered to separate a solid. The resulting solid, a prepolymerized catalyst [I-5], was resuspended in decane.

[Polymerization]

Into a 2-liter autoclave, 800 ml of purified decane was introduced and then 0.75 ml of triethylaluminum, 0.15 mmol of dicyclopentyldimethoxysilane (DCPMS) and 0.015 mmol (in terms of titanium atom) of the prepolymerized catalyst [I-5] as obtained above were further introduced at room temperature in a propylene atmosphere. After 1.8 Nl of hydrogen was fed to the autoclave, the temperature of the system was raised to 80° C. with feeding propylene. The polymerization pressure was kept at 7 $kg/cm^2$-G by feeding propylene to the autoclave.

After the polymerization of propylene was carried out for 30 minutes, the system was cooled to 60° C. and the autoclave was released. Then, the unreacted propylene was purged out for 20 minutes with nitrogen.

The polypropylene component prepared by the above polymerization contained a 23° C. n-decane-soluble component in an amount of 1.0% by weight, and a 23° C. n-decane-insoluble component thereof had a pentad isotacticity $[M_5]$ of 0.980.

Subsequently, 20 Nml of hydrogen was added at a time to the system in a nitrogen atmosphere. Then, a gas mixture composed of 68% by mol of propylene and 32% by mol of ethylene was introduced into the system to perform polymerization for 40 minutes under constant conditions of a temperature of 60° C. and a pressure of 5 $kg/cm^2$-G.

After the end of the polymerization, the slurry containing the polymer produced was filtered at 60° C. to remove a liquid portion, thereby obtaining a white powdery polymer which was washed twice with 1 liter of hexane at room temperature.

An yield of the dry propylene block copolymer was 210 g, so that the activity of the catalyst was 14,000 g/mmol-Ti. This propylene block copolymer had an MFR of 2.2 g/10 min.

The propylene block copolymer contained 31% by weight of a 23° C. n-decane soluble component and 69% by weight of 23° C. n-decane insoluble component.

The 23° C. n-decane-soluble component had an ethylene content of 37% by mel and an intrinsic viscosity [η] of 7.3 dl/g. The 23° C. n-decane-insoluble component had an MFR of 130 g/10 min and a pentad isotacticity $[M_5]$ of 0.985.

EXAMPLE 26

Preparation of Propylene Block Copolymer

[Preparation of Precontact Product [Ib]]

A 400 ml four-necked glass reactor equipped with a stirrer was charged with 100 ml of purified hexane, 10 mmol of triethylaluminum, 2.0 mmol of dicyclopentyldimethoxysilane (DCPMS) and 1.0 mmol (in terms of titanium atom) of the solid titanium catalyst component (A) obtained in Example 1 in a nitrogen atmosphere, and then the mixture was stirred at 20° C. for 1 hour.

Thereafter, washing operation consisting of removal of a supernatant and addition of purified hexane was carried out twice, to obtain a precontact product [Ib], which was resuspended in purified hexane, and the whole suspension was stored in a catalyst bottle.

[Polymerization]

Into a 17-liter autoclave were introduced 3 kg of propylene and 45 liters of hydrogen, and then at room temperature, 15 mmol of triethylaluminum, 15 mmol of 2-isopentyl-2-isopropyl-1,3-dimethoxypropane (IRAMP) and 0.05 mmol (in terms of titanium atom) of the precontact product [Ib] were added to the autoclave. The temperature of the system was raised to 70° C., and the same temperature was kept for 40 minutes to perform homopolymerization of propylene.

After the end of the homopolymerization of propylene, the vent valve was opened to release the autoclave until the pressure reached atmospheric pressure.

After the end of the release of pressure, copolymerization of ethylene and propylene was carried out in the following manner. Ethylene and propylene were fed to the polymerization reactor at rates of 240 Nl/hr and 960 Nl/hr, respectively. The vent was adjusted on its opening degree so that the pressure in the reactor became 10 $kg/cm^2$-G. The polymerization was carried out for 80 minutes with keeping the temperature at 70° C. To the reaction system was added a small amount of ethanol to terminate the polymerization reaction, and the unreacted gas was purged out from the reactor. The resulting white powder was dried at 80° C. under reduced pressure.

EXAMPLE 27

Preparation of Propylene Block Copolymer

[Preparation of Prepolymerized Catalyst [Ic]]

A 400 ml four-necked glass reactor equipped with a stirrer was charged with 100 ml of purified hexane, 10 mmol of triethylaluminum, 2.0 mmol of di-t-butyldimethoxysilane (DTBMS) and 1.0 mmol (in terms of titanium atom) of the solid titanium catalyst component (A) obtained in Example 1 in a nitrogen atmosphere. Then, propylene was fed to the reactor at a rate of 3.2 /hr for 1 hour. The polymerization temperature was kept at 20° C.

After the end of the propylene feeding, the reactor was purged with nitrogen, and washing operation consisting of removal of a supernatant and addition of purified hexane was carried out twice, to obtain a prepolymerized catalyst [Ic], which was resuspended in purified hexane, and the whole suspension was stored in a catalyst bottle.

[Polymerization]

Into a 17-liter autoclave were introduced 3 kg of propylene and 45 liters of hydrogen, and the temperature of the system was raised to 60° C. Then, 15 mmol of triethylaluminum, 15 mmol of 2-isopentyl-2-isopropyl-1,3-dimethoxypropane (IPAMP) and 0.05 mmol (in terms of titanium atom) of the prepolymerized catalyst [Ic] were added to the autoclave. The temperature of the system was raised to 70° C., and the same temperature was kept for 40 minutes to perform homopolymerization of propylene.

After the end of the homopolymerization of propylene, the vent valve was opened to release the autoclave until the pressure reached atmospheric pressure.

After the end of the release of pressure, copolymerization of ethylene and propylene was carried out in the following manner. Ethylene and propylene were fed to the polymerization reactor at rates of 240 Nl/hr and 960 Nl/hr, respectively. The vent was adjusted on its opening degree so that the pressure in the reactor became 10 kg/cm$^2$-G. The polymerization was carried out for 50 minutes with keeping the temperature at 70° C. To the reaction system was added a small amount of ethanol to terminate the polymerization reaction, and the unreacted gas was purged out from the reactor. The resulting white powder was dried at 80° C. under reduced pressure.

The results are shown in Table 6.

EXAMPLE 28

Preparation of Propylene Block Copolymer
[Preparation of Prepolymerized Catalyst [Id]]

Prepolymerization was carried out in the same manner as in Example 27 except that DCPMS is used in place of DTBMS, to obtain a prepolymerized catalyst [Id].
[Polymerization]

Polymerization was carried out in the same manner as in Example 27 except that the prepolymerized catalyst [Id] was used in place of the prepolymerized catalyst [Ic], and 2-isopropyl-2-isobutyl-1,3-dimethoxypropane was used in place of IPAMP.

The results are shown in Table 6.

EXAMPLE 29

Preparation of Propylene Block Copolymer
[Preparation of Precontact Product [Ie]]

The procedures for the preparation of the precontact product [Ib] in Example 26 were repeated except that IPAMP was used in place of DCPMS, to obtain a precontact product [Ie].

[Polymerization]

Polymerization was carried out in the same manner as in Example 26 except that the precontact product [Ie] was used in place of the precontact product [Ib], and DCPMS was used in place of IPAMP.

The results are shown in Table 7.

EXAMPLE 30

Preparation of Propylene Block Copolymer
[Preparation of Prepolymerized Catalyst [If]]

Prepolymerization was carried out in the same manner as in Example 27 except that IPAMP was used in place of DCPMS, to obtain a prepolymerized catalyst [If].
[Polymerization]

Polymerization was carried out in the same manner as in Example 27 except that the prepolymerized catalyst [If] was used in place of the prepolymerized catalyst [Ic], and DTBMS was used in place of IPAMP.

The results are shown in Table 7.

EXAMPLE 31

Preparation of Propylene Block Copolymer
[Preparation of Prepolymerized Catalyst [Ig]]

Prepolymerization was carried out in the same manner as in Example 27 except that 2-isopropyl-2-isobutyl-1,3-dimethoxypropane was used in place of DCPMS, to obtain a prepolymerized catalyst [Ig].
[Polymerization]

Polymerization was carried out in the same manner as in Example 27 except that the prepolymerized catalyst [Ig] was used in place of the prepolymerized catalyst [Ic], and DCPMS was used in place of IPAMP.

The results are shown in Table 7.

TABLE 6

| No. | Activity g/mol-Ti | MFR g/10 min | Bulk specific gravity g/ml | 23° C. n-Decane-soluble component | | |
|---|---|---|---|---|---|---|
| | | | | Content wt % | Ethylene content mol % | [η] dl/g |
| Ex. 26 | 35,000 | 54 | 0.43 | 9.6 | 38.9 | 6.2 |
| Ex. 27 | 35,900 | 46 | 0.47 | 8.5 | 40.5 | 6.8 |
| Ex. 28 | 35,200 | 51 | 0.47 | 9.3 | 39.4 | 6.5 |

| No. | 23° C. n-Decane-insoluble component | | | | | | IZ kg · cm/cm |
|---|---|---|---|---|---|---|---|
| | Ethylene content mol % | Boiling heptane-insoluble component | | | FM kg/cm$^2$ | HDT ° C. | |
| | | Content wt % | [M$_5$] (%) | [M$_3$] (%) | | | |
| Ex. 26 | 1.0 | 94.1 | 98.6 | 0.32 | 16,800 | 115 | 6.7 |
| Ex. 27 | 0.9 | 94.0 | 98.7 | 0.30 | 16,800 | 116 | 6.8 |
| Ex. 28 | 0.8 | 94.7 | 98.1 | 0.30 | 15,600 | 113 | 6.8 |

TABLE 7

| No. | Activity g/mol-Ti | MFR g/10 min | Bulk specific gravity g/ml | 23° C. n-Decane-soluble component | | |
|---|---|---|---|---|---|---|
| | | | | Content wt % | Ethylene content mol % | [η] dl/g |
| Ex. 29 | 33,800 | 55 | 0.43 | 8.9 | 39.4 | 6.4 |
| Ex. 30 | 34,800 | 48 | 0.45 | 8.0 | 40.7 | 6.6 |
| Ex. 31 | 35,200 | 47 | 0.45 | 8.7 | 40.5 | 6.8 |

| No. | 23° C. n-Decane-insoluble component | | | | | | IZ kg · cm/cm |
|---|---|---|---|---|---|---|---|
| | Ethylene content mol % | Boiling heptane-insoluble component | | | FM kg/cm$^2$ | HDT ° C. | |
| | | Content wt % | [M$_5$] (%) | [M$_3$] (%) | | | |
| Ex. 29 | 0.7 | 94.1 | 98.8 | 0.30 | 16,500 | 116 | 6.9 |
| Ex. 30 | 0.9 | 94.3 | 98.8 | 0.30 | 16,900 | 117 | 6.4 |
| Ex. 31 | 0.7 | 94.5 | 98.1 | 0.32 | 15,700 | 113 | 7.0 |

EXAMPLE 32

Preparation of Propylene Block Copolymer
[Polymerization]

Polymerization was carried out in the same manner as in Example 26 except that the precontact product [Ie] was used in place of the precontact product [Ib].

The results are shown in Table 8.

EXAMPLE 33

Preparation of Propylene Block Copolymer

[Polymerization]

Polymerization was carried out in the same manner as in Example 27 except that the prepolymerized catalyst [Ig] was used in place of the prepolymerized catalyst [Ic], and 2-isopropyl-2-isobutyl-1,3-dimethoxysilane was used in place of IPAMP.

The results are shown in Table 8.

TABLE 8

| No. | Activity g/mol-Ti | MFR g/10 min | Bulk specific gravity g/ml | 23° C. n-Decane-soluble component | | |
|---|---|---|---|---|---|---|
| | | | | Content wt % | Ethylene content mol % | [η] dl/g |
| Ex. 32 | 34,500 | 55 | 0.43 | 8.6 | 37.4 | 6.5 |
| Ex. 33 | 35,400 | 48 | 0.46 | 8.4 | 40.3 | 6.2 |

| No. | 23° C. n-Decane-insoluble component | | | | | | |
|---|---|---|---|---|---|---|---|
| | Ethylene content mol % | Boiling heptane-insoluble component | | | FM kg/cm² | HDT ° C. | IZ kg · cm/cm |
| | | Content wt % | [M₅] (%) | [M₃] (%) | | | |
| Ex. 32 | 0.8 | 94.0 | 98.7 | 0.26 | 16,600 | 115 | 6.7 |
| Ex. 33 | 1.0 | 94.0 | 98.2 | 0.29 | 15,700 | 112 | 6.5 |

EXAMPLE 34

Preparation of Propylene Block Copolymer

[Prepolymerization]

Prepolymerization was carried out in the same manner as in Example 27 except that diphenyldimethoxysilane was used in place of DTBMS, to obtain a prepolymerized catalyst [Ih].

[Polymerization]

Polymerization was carried out in the same manner as in Example 27 except that the prepolymerized catalyst [Ih] was used in place of the prepolymerized catalyst [Ic], and the polymerization time was changed to 35 minutes.

The results are shown in Table 9.

TABLE 9

| No. | Activity g/mol-Ti | MFR g/10 min | Bulk specific gravity g/ml | 23° C. n-Decane-soluble component | | |
|---|---|---|---|---|---|---|
| | | | | Content wt % | Ethylene content mol % | [η] dl/g |
| Ex. 34 | 45,300 | 49 | 0.47 | 9.0 | 40.2 | 6.0 |

| No. | 23° C. n-Decane-insoluble component | | | | | | |
|---|---|---|---|---|---|---|---|
| | Ethylene content mol % | Boiling heptane-insoluble component | | | FM kg/cm² | HDT ° C. | IZ kg · cm/cm |
| | | Content wt % | [M₅] (%) | [M₃] (%) | | | |
| Ex. 34 | 1.0 | 94.2 | 99.0 | 0.30 | 17,000 | 114 | 7.0 |

EXAMPLE 35

Preparation of Propylene Block Copolymer

[Polymerization]

Into a 17-liter autoclave were introduced 3 kg of propylene and 50 liters of hydrogen, and the temperature of the system was raised to 60° C. Then, 15 mmol of triethylaluminum, 15 mmol of DTBMS and 0.03 mmol (in terms of titanium atom) of the prepolymerized catalyst [I-4] obtained in Example 16 were added to the autoclave. The temperature of the system was raised to 70° C., and the same temperature was kept for 40 minutes to perform homopolymerization of propylene.

After the end of the homopolymerization of propylene, the vent valve was opened to release the autoclave until the pressure reached atmospheric pressure.

After the release of pressure, copolymerization of ethylene and propylene was carried out in the following manner. Ethylene and propylene were fed to the polymerization reactor at rates of 240 Nl/hr and 960 Nl/hr, respectively. The vent of the polymerizer was adjusted on its opening degree so that the pressure in the reactor became 10 kg/cm²-G. The polymerization was carried out for 80 minutes with keeping the temperature at 70° C. To the reaction system was added a small amount of ethanol to terminate the polymerization reaction, and the unreacted gas was purged out from the reactor. The resulting white powder was dried at 80° C. under reduced pressure.

The results are shown in Table 10.

EXAMPLE 36

Preparation of Propylene Block Copolymer

[Preparation of Solid Titanium Catalyst Component (A-2k)]

The procedure of the preparation of the solid titanium catalyst component (A-2) was repeated except that 4.48 ml of 2-isopropyl-2-isobutyl-1,3-dimethoxypropane was used in place of IPAMP, to obtain a solid titanium catalyst component (A-2k).

The solid titanium catalyst component (A-2k) thus obtained had a composition comprising 2.1% by weight of titanium, 63% by weight of chlorine, 20% by weight of magnesium and 7.9% by weight of 2-isopropyl-2-isobutyl-1,3-dimethoxypropane.

[Preparation of Prepolymerized Catalyst [Il]]

A 400 ml four-necked glass reactor equipped with a stirrer was charged with 100 ml of purified hexane, 3 mmol of triethylaluminum and 1.0 mmol (in terms of titanium atom) of the solid titanium catalyst component (A-2k) obtained as above in a nitrogen atmosphere. Then, propylene was fed to the reactor at a rate of 3.5 1/hr for 1 hour. The polymerization temperature was kept at 20° C.

After the end of propylene feeding, the reactor was purged with nitrogen, and washing operation consisting of removal of a supernatant and addition of purified hexane was carried out twice, to obtain a prepolymerized catalyst [Il], which was resuspended in purified hexane, and the whole suspension was stored in a catalyst bottle.

[Polymerization]

Polymerization was carried in the same manner as in Example 35 except that the prepolymerized catalyst [Il] was used in place of the prepolymerized catalyst [Ij], and 2-isopropyl-2-isobutyl-1,3-dimethoxypropane was used in place of DTBMS.

The results are shown in Table 10.

TABLE 10

| No. | Activity g/mol-Ti | MFR g/10 min | Bulk specific gravity g/ml | 23° C. n-Decane-soluble component | | |
|---|---|---|---|---|---|---|
| | | | | Content wt % | Ethylene content mol % | [η] dl/g |
| Ex. 35 | 75,000 | 43 | 0.46 | 8.7 | 37.2 | 6.7 |
| Ex. 36 | 73,900 | 48 | 0.45 | 9.0 | 39.2 | 6.4 |

| No. | 23° C. n-Decane-insoluble component | | | | | | |
|---|---|---|---|---|---|---|---|
| | Ethylene content mol % | Boiling heptane-insoluble component | | | FM kg/cm$^2$ | HDT ° C. | IZ kg · cm/cm |
| | | Content wt % | [M$_5$] (%) | [M$_3$] (%) | | | |
| Ex. 35 | 1.0 | 94.2 | 98.7 | 0.33 | 17,000 | 116 | 6.8 |
| Ex. 36 | 1.1 | 94.0 | 98.3 | 0.32 | 15,600 | 112 | 6.7 |

EXAMPLE 37

Preparation of Propylene Block Copolymer

[Polymerization]

Into a 17-liter autoclave were introduced 3 kg of propylene and 45 liters of hydrogen, and the temperature of the system was raised to 60° C. Then, 15 mmol of triethylaluminum, 15 mmol of 2-isopentyl-2-isopropyl-1,3-dimethoxypropane (IPAMP) and 0.05 mmol (in terms of titanium atom) of the prepolymerized catalyst [I] as obtained in Example 1 were added to the autoclave. The temperature of the system was raised to 70° C., and the same temperature was kept for 40 minutes to perform homopolymerization of propylene.

After the end of the homopolymerization, the vent valve was opened to release the autoclave until the pressure reached atmospheric pressure.

After the release of pressure, copolymerization of ethylene and propylene was carried out in the following manner. Ethylene and propylene were fed to the polymerization reactor at rates of 240 Nl/hr and 960 Nl/hr, respectively. The vent of the reactor was adjusted on its opening degree so that the pressure in the polymerizer became 10 kg/cm$^2$-G. The polymerization was carried out for 50 minutes with keeping the temperature at 70° C. To the reaction system was added a small amount of ethanol to terminate the polymerization reaction, and the unreacted gas was purged out from the reactor.

The results are shown in Table 11.

EXAMPLE 38

Preparation of Propytene Block Copolymer

[Polymerization]

Into a 17-liter autoclave were introduced 3 kg of propylene and 45 liters of hydrogen, and the temperature of the system was raised to 60° C. Then, 15 mmol of triethylaliuminum, 15 mmol of dicyclopentyldimethoxysilane (DCPMS) and 0.05 mml (in terms of titanium atom) of the prepolymerized catalyst [I-2] as obtained in Example 8 were added to the autoclave. The temperature of the system was raised to 70° C., and the same temperature was kept for 40 minutes to perform homopolymerization of propylene.

After the end of the homopolymerization, the vent valve was opened to release the autoclave until the pressure reached atmospheric pressure.

After the release of pressure, copolymerization of ethylene and propylene was carried out in the following manner. Ethylene and propylene were fed to the polymeriation reactor at rates of 240 Nl/hr and 960 Nl/hr, respectively. The vent of the reactor was adjusted on its opening degree so that the pressure in the polymerizer became 10 kg/cm2-G. The polymerization was carried out for 50 minutes with keeping the temperature at 70° C. To the reaction system was added a small amount of ethanol to terminate the polymerization reaction, and the unreacted gas was purged out from the reactor.

The results are shown in Table 11.

EXAMPLE 39

Preparation of Homopolypropylene

[Polymerization]

Polymerization was carried out in the same manner as in Example 1 except that the prepolymerized catalyst (I-2) as obtained in Example 8 was used. The results are shown in Table 11.

EXAMPLE 40

Preparation of Homopolypropylene

[Polymerization]

Polymerization was carried out in the same manner as in Example 2 except that the prepolymerized catalyst [I-2] as obtained in Example 8 was used. The results are shown in Table 11.

EXAMPLE 41

Preparation of Homopolypropylene

[Polymerization]

Polymerization was carried out in the same manner as in Example 2 except that the prepolymerized catalyst [I-2]as obtained in Example 8 was used, and 8 liters of hydrogen were used in place of 20 liters. The results are shown in Table 11.

TABLE 11

| No. | Activity g/mol-Ti | MFR g/10 min | 23° C. n-Decane-soluble component | | | | 23° C. n-Decane-insoluble component | | | | | | |
|---|---|---|---|---|---|---|---|---|---|---|---|---|---|
| | | | Bulk specific gravity g/ml | Content wt % | Ethylene content mol % | [η] dl/g | Ethylene content mol % | Boiling heptane-insoluble component | | | FM kg/cm$^2$ | HDT ° C. | IZ kg · cm/cm |
| | | | | | | | | Content wt % | [M$_5$] (%) | [M$_3$] (%) | | | |
| Ex.37 | 35,400 | 46 | 0.45 | 9.6 | 38.6 | 2.5 | 0.7 | 94.2 | 98.8 | 0.30 | 14,900 | 112 | 3.5 |
| Ex.38 | 36,400 | 52 | 0.45 | 9.1 | 37.0 | 2.3 | 0.8 | 94.4 | 99.2 | 0.27 | 15,100 | 113 | 3.4 |

TABLE 11-continued

| | | | 23° C. n-Decane-soluble component | | | | 23° C. n-Decane-insoluble component | | | | | |
|---|---|---|---|---|---|---|---|---|---|---|---|---|
| | | | Bulk specific | Ethylene | | | Ethylene | Boiling heptane-insoluble component | | | | |
| No. | Activity g/mol-Ti | MFR g/10 min | gravity g/ml | Content wt % | content mol % | [η] dl/g | content mol % | Content wt % | [$M_5$] (%) | [$M_3$] (%) | FM kg/cm² | HDT ° C. | IZ kg · cm/cm |
| Ex.39 | 31,100 | 112 | 0.46 | 1.0 | — | — | — | 96.9 | 99.4 | 0.27 | — | — | — |
| Ex.40 | 29,800 | 56 | 0.47 | 0.8 | — | — | — | 96.3 | 99.3 | 0.27 | — | — | — |
| Ex.41 | 29,900 | 29 | 0.47 | 0.8 | — | — | — | 96.8 | 99.3 | 0.25 | — | — | — |

What is claimed:

1. An olefin polymerization catalyst (2) formed from:
   (I-2) a contact product obtained by contacting in the absence of polymerizable olefin monomer:
   (A) a solid titanium catalyst component comprising magnesium, titanium, halogen and an organic ester as electron donor;
   (B) an organometallic compound catalyst component and
   (D) a compound having at least two ether linkages spaced by plural atoms;
   (II-2) (C) an organosilicon compound represented by the following formula (c-i)

$$R^a{}_2Si(OR^b)_2 \quad \text{(c-i)}$$

$R^a$ is a secondary or tertiary hydrocarbon group, and both $R^a$ may be the same or different,
$R^b$ is a hydrocarbon group of 1 to 4 carbon atoms and both $OR^b$ may be the same or different; and, optionally,
(III-2) an organometallic compound catalyst component.

2. The olefin polymerization catalyst as claimed in claim 1, wherein the organosilicon compound (C) is represented by the following formula (c-ii):

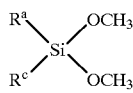

(c-ii)

wherein
$R^a$ and $R^c$ are each independently a cyclopentenyl group, a substituted cyclopentenyl group, a cyclopentenyl group, a substituted cyclopentenyl group, or a hydrocarbon group whose carbon adjacent to Si is secondary or tertiary carbon.

3. The olefin polymerization catalyst as claimed in claim 1, wherein the compound (D) having at least two ether linkages present through plural atoms is represented by the following formula:

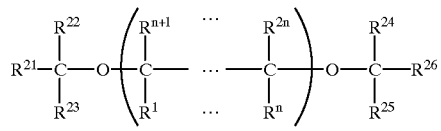

wherein
n is an integer satisfying the condition 2≦n≦10,
$R^1$ to $R^{26}$ are each a substituent having at least one atom selected from the group consisting of carbon, hydrogen, oxygen, halogen, nitrogen, sulfur, phosphorous, boron and silicon, any optional combination of $R^1$ to $R^{26}$ may form together a ring other than a benzene ring, and the main chain of the compound may contain atoms other than carbon.

4. An olefin polymerization catalyst (2a) formed from:
   (I-2a) a prepolymerized catalyst component obtained by prepolymerizing an olefin of 2 or more carbon atoms in the presence of
   (A) a solid titanium catalyst component comprising magnesium, titanium, halogen and a polycarboxylic ester selected from the group consisting of compounds of the formulas

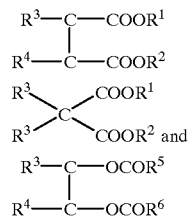

wherein $R^1$ is a hydrocarbon group which may have a substituent, $R^2$, $R^3$, $R^4$, $R^5$ and $R^6$ are hydrogen or hydrocarbon group which may be substituted, wherein any substituent group contains N, O or S atom, and $R^3$ and $R^4$ may be linked to each other to form a cyclic structure;
   (B) an organometallic compound catalyst component, and
   (D) a compound having at least two ether linkages spaced by plural atoms;
   (II-2a) (C) an organosilicon compound represented by the following formula (c-i)

$$R^{a2}Si(OR^b)_2 \quad \text{(c-i)}$$

wherein
$R^a$ is a secondary or tertiary hydrocarbon group, and both $R^a$ may be the same or different,
$R^b$ is a hydrocarbon group of 1 to 4 carbon atoms, and both $OR^b$ may be the same or different; and, optionally
(III-2a) an organometallic compound catalyst component.

5. The olefin polymerization catalyst as claimed in claim 4, wherein the organosilicon compound (C) is represented by the following formula

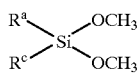 (c-ii)

wherein

R*a* and R*c* are each independently a cyclopentyl group, a substituted cyclopentyl group, a cyclopentenyl group, a substituted cyclopentenyl group, a cyclopentadienyl group, a substituted cyclopentadienyl group or a hydrocarbon group whose carbon adjacent to Si is secondary or tertiary carbon.

6. The olefin polymerization catalyst as claimed in claim 4, wherein the compound (D) having at least two ether linkages present through plural atoms is represented by the following formula:

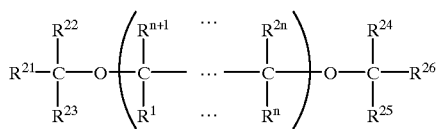

wherein n is an integer satisfying the condition $2 \leq n \leq 10$, $R^1$ to $R^{26}$ are each a substituent having at least one atom selected from the group consisting of carbon, hydrogen, oxygen, halogen, nitrogen, sulfur, phosphorus, boron and silicon, any optional combination of $R^1$ to $R^{26}$ may form together a ring other than a benzene ring, and the main chain of the compound may contain atoms other than carbon.

* * * * *